US012701398B2

(12) United States Patent
Ma et al.

(10) Patent No.: US 12,701,398 B2
(45) Date of Patent: Aug. 4, 2026

(54) NETWORK ACCESS METHOD AND APPARATUS

(71) Applicant: HUAWEI TECHNOLOGIES CO., LTD., Shenzhen (CN)

(72) Inventors: Chunyan Ma, Shenzhen (CN); Linjin Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/464,627

(22) Filed: Sep. 11, 2023

(65) Prior Publication Data

US 2023/0422016 A1      Dec. 28, 2023

Related U.S. Application Data

(63) Continuation of application No. PCT/CN2022/084931, filed on Apr. 1, 2022.

(30) Foreign Application Priority Data

Apr. 2, 2021    (CN) .......................... 202110362662.3
Jul. 31, 2021    (CN) .......................... 202110877210.9

(51) Int. Cl.
    *H04W 8/14*        (2009.01)
    *H04W 8/26*        (2009.01)
    *H04W 48/16*       (2009.01)
(52) U.S. Cl.
    CPC .............. *H04W 8/14* (2013.01); *H04W 8/26* (2013.01); *H04W 48/16* (2013.01)
(58) Field of Classification Search
    CPC ...................................................... H04W 8/14
    See application file for complete search history.

(56) References Cited

U.S. PATENT DOCUMENTS 10,206,155 B2 *    2/2019  Kim ....................... H04W 36/22
10,609,740 B2 *    3/2020  Stojanovski ...... H04W 36/0069
                        (Continued)

FOREIGN PATENT DOCUMENTS

CN        110351777  A      10/2019
CN        110972126  A      4/2020
                (Continued)

OTHER PUBLICATIONS

3GPP TS 23.501 V17.0.0 (Mar. 2021), 3rd Generation Partnership Project; Technical Specification Group Services and System Aspects; System architecture for the 5G System (5GS); Stage 2 (Release 17), 489 pages.

(Continued)

*Primary Examiner* — Vivek Srivastava
(74) *Attorney, Agent, or Firm* — HAUPTMAN HAM, LLC

(57)        ABSTRACT

An apparatus includes a processor and a memory having instructions stored thereon that, when executed by the processor, cause the apparatus to insert an uplink classifier user plane function network element at a home location. The uplink classifier user plane function network element is configured to offload a service flow of a terminal device. The apparatus is also caused to, in response to determining the terminal device moved to a visited location, send an address of the uplink classifier user plane function network element to an intermediate user plane function network element at the visited location to establish a tunnel between the intermediate user plane function network element and the uplink classifier user plane function network element.

19 Claims, 43 Drawing Sheets

(56) References Cited

U.S. PATENT DOCUMENTS

| | | | |
|---|---|---|---|
| 11,870,856 B2* | 1/2024 | Zong ..................... | H04W 36/13 |
| 2021/0058467 A1* | 2/2021 | Zhu ...................... | H04W 24/04 |
| 2022/0303751 A1* | 9/2022 | Wang ................... | H04W 76/11 |

FOREIGN PATENT DOCUMENTS

| | | | |
|---|---|---|---|
| EP | 2521414 A1 | 11/2012 |
| WO | 2019197426 A1 | 10/2019 |
| WO | 2020253551 A1 | 12/2020 |

OTHER PUBLICATIONS

C4-192081, Huawei, Update description of 5G UPF with redundant transmission, 3GPP TSG-CT WG4 Meeting #91, Reno, US; May 13-17, 2019, 3 pages.

International Search Report issued in corresponding International Application No. PCT/CN2022/084931, dated May 30, 2022, pp. 1-9.

Extended European Search Report issued in corresponding European Application No. 22779159.7, dated Jun. 18, 2024, pp. 1-10.

* cited by examiner

Scenario 1: A plurality of UPFs are within a
management range of a same SMF (for example, an
intra-province roaming scenario)

Scenario 2: A plurality of UPFs are not within a
management range of a same SMF (for example, an
inter-province roaming scenario)

Scenario 1: A plurality of UPFs are within a management range of a same SMF (for example, an intra-province roaming scenario)

Scenario 2: A plurality of UPFs are not within a management range of a same SMF (for example, an inter-province roaming scenario)

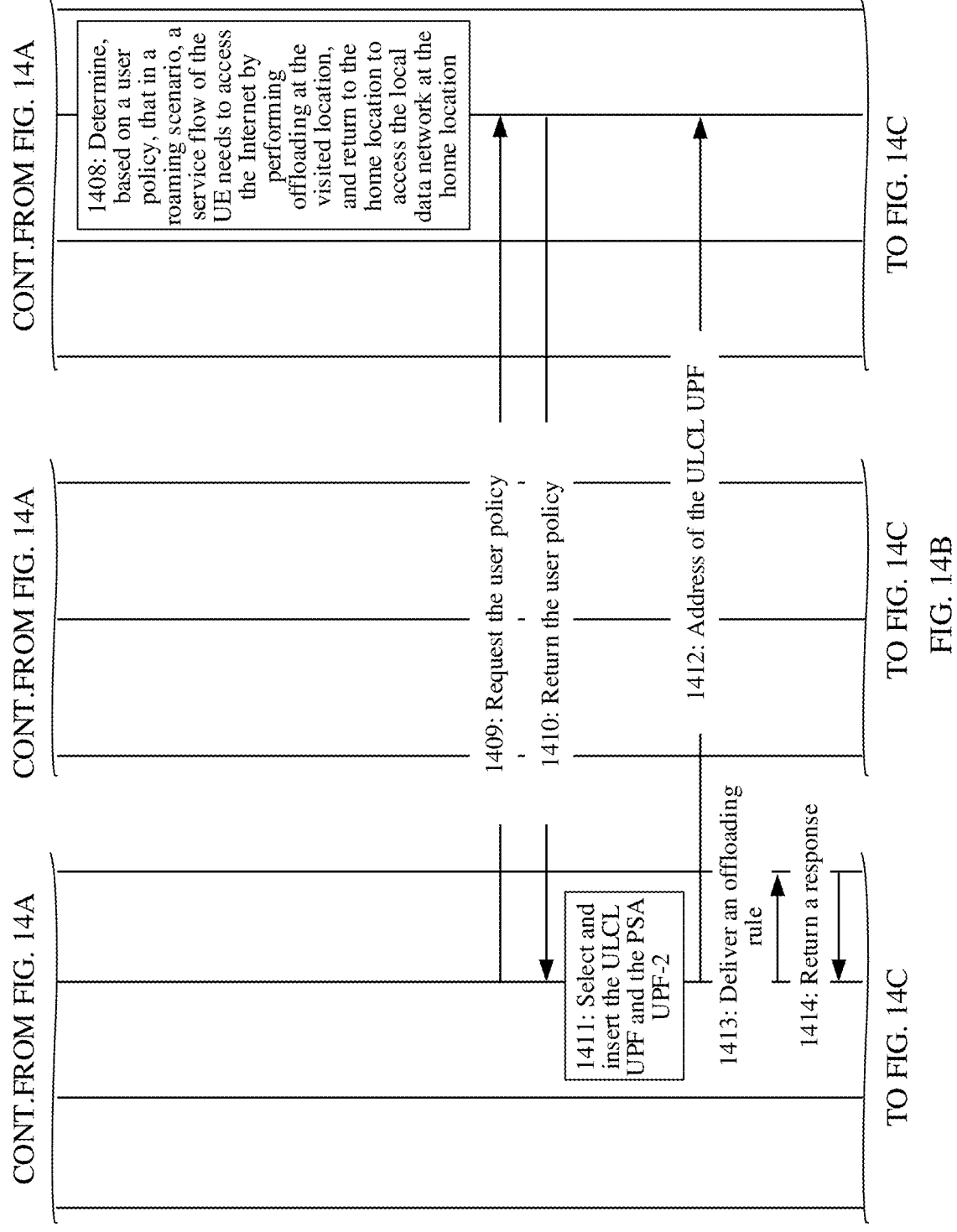

CONT.FROM FIG. 14A

1408: Determine, based on a user policy, that in a roaming scenario, a service flow of the UE needs to access the Internet by performing offloading at the visited location, and return to the home location to access the local data network at the home location

TO FIG. 14C

CONT.FROM FIG. 14A

1409: Request the user policy

1410: Return the user policy

1412: Address of the ULCL UPF

CONT.FROM FIG. 14A

1411: Select and insert the ULCL UPF and the PSA UPF-2

1413: Deliver an offloading rule

1414: Return a response

TO FIG. 14C

Scenario 1: A plurality of UPFs are within a management range of a same SMF (for example, an intra-province roaming scenario)

Scenario 2: A plurality of UPFs are not within a management range of a same SMF (for example, an inter-province roaming scenario)

Intra-campus access scenario

Inter-province access scenario

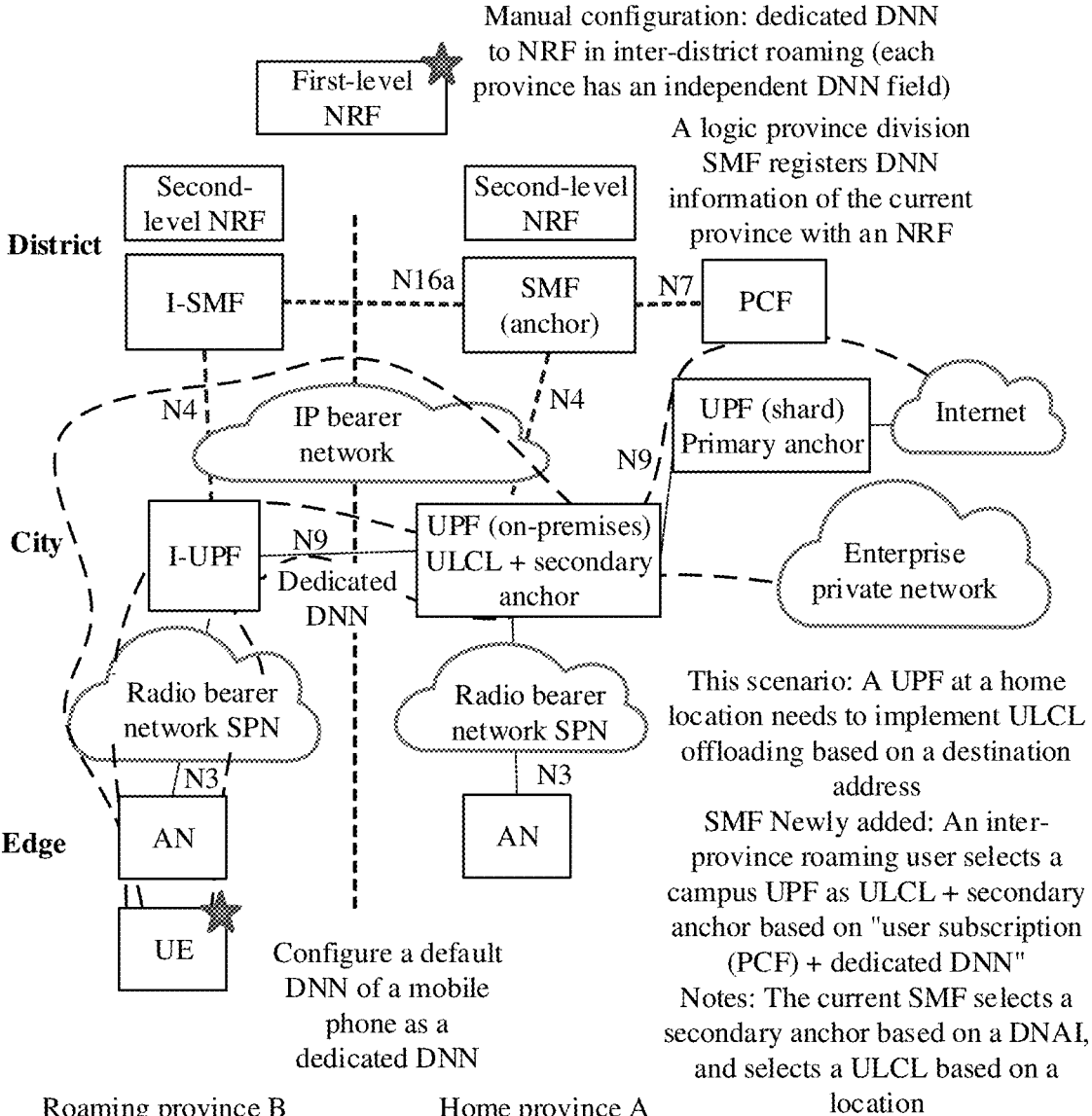

Manual configuration: dedicated DNN to NRF in inter-district roaming (each province has an independent DNN field)

A logic province division SMF registers DNN information of the current province with an NRF This scenario: A UPF at a home location needs to implement ULCL offloading based on a destination address SMF Newly added: An inter-province roaming user selects a campus UPF as ULCL + secondary anchor based on "user subscription (PCF) + dedicated DNN"

Notes: The current SMF selects a secondary anchor based on a DNAI, and selects a ULCL based on a location Configure a default DNN of a mobile phone as a dedicated DNN Roaming province B          Home province A

FIG. 22

Scenario 1: A plurality of UPFs are within a management range of a same SMF
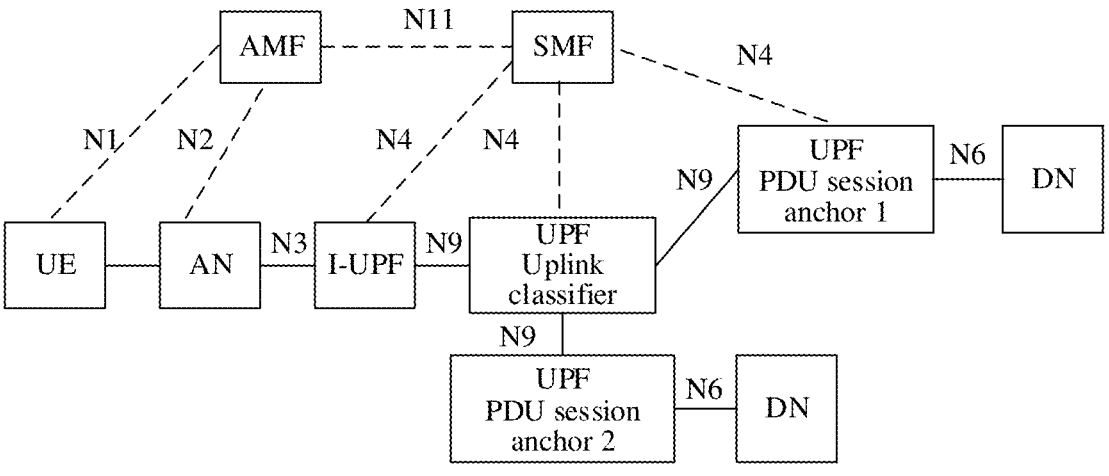
Scenario 2: A plurality of UPFs are not within a management range of a same SMF
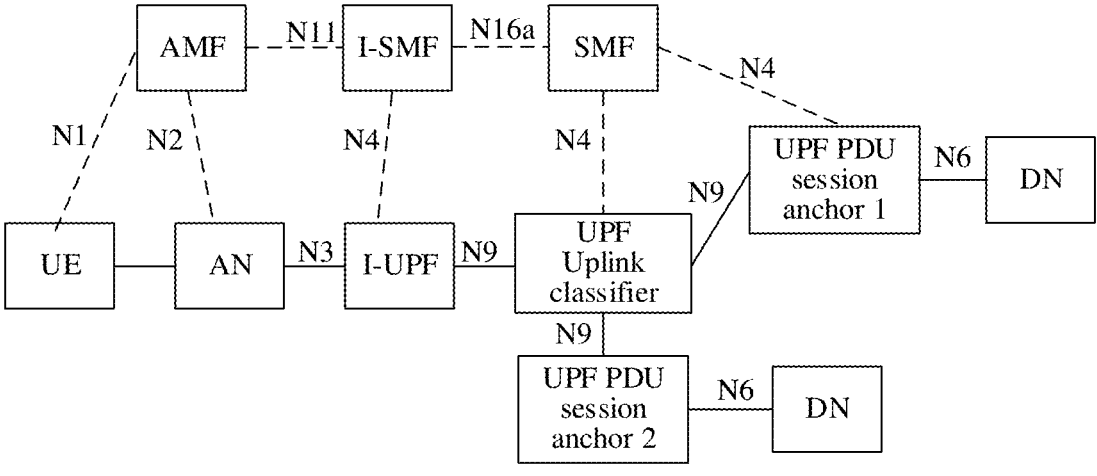
FIG. 23

Intra-province roaming scenario

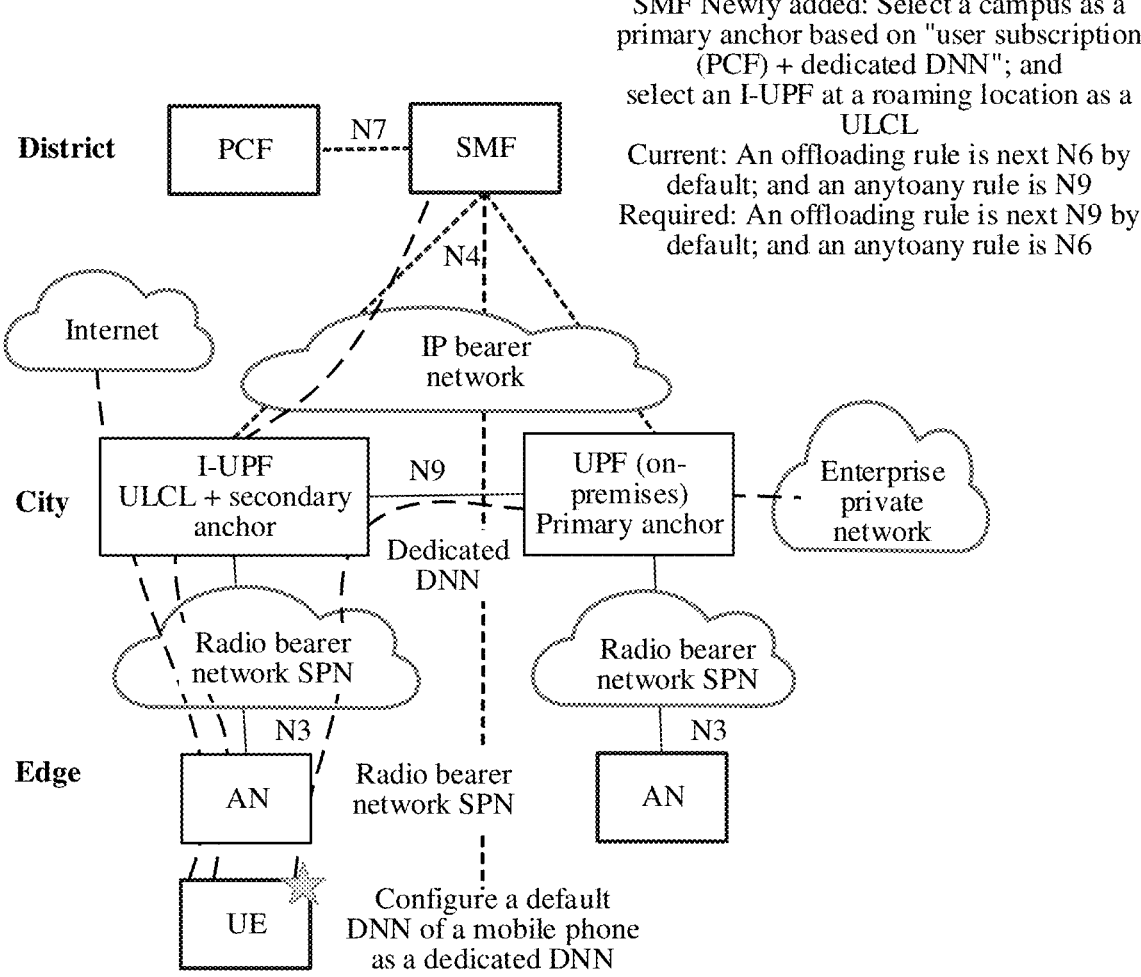

SMF Newly added: Select a campus as a
primary anchor based on "user subscription
(PCF) + dedicated DNN"; and
select an I-UPF at a roaming location as a
ULCL
Current: An offloading rule is next N6 by
default; and an anytoany rule is N9
Required: An offloading rule is next N9 by
default; and an anytoany rule is N6

Home province A-Roaming city 2     Home province A-Home city 1

FIG. 26

Scenario 1: A plurality of UPFs are within a management range of a same SMF
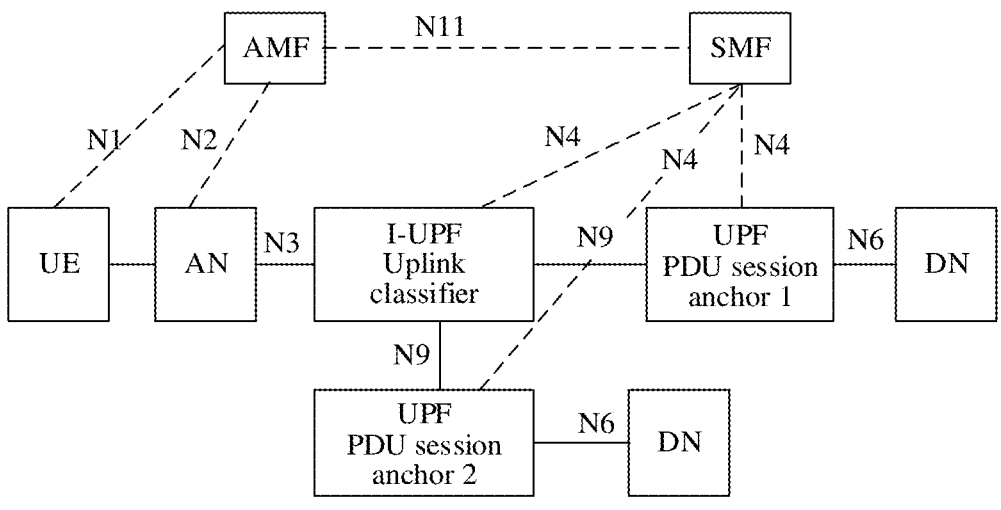
Scenario 2: A plurality of UPFs are not within a management range of a same SMF
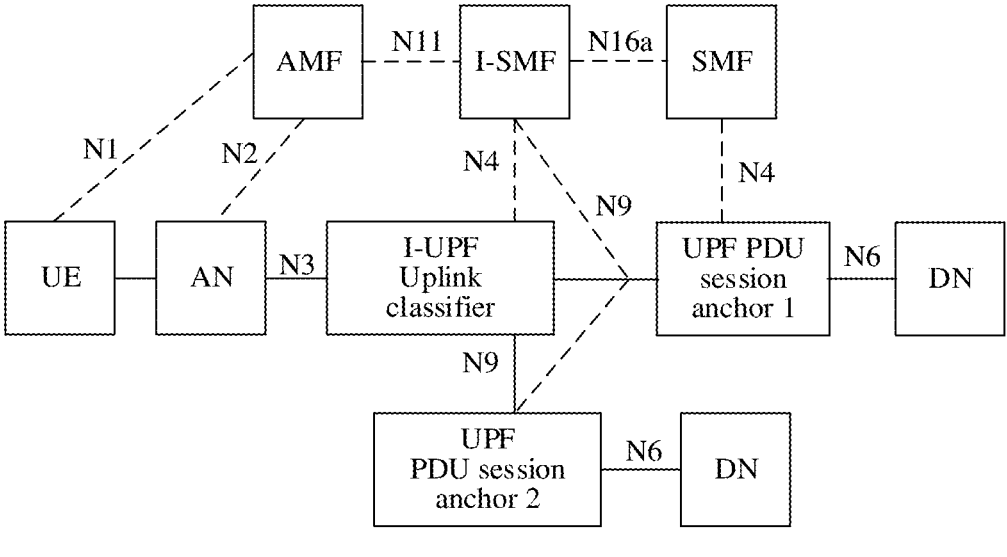
FIG. 28

**Scenario 1: A plurality of UPFs are within a management
range of a same SMF**
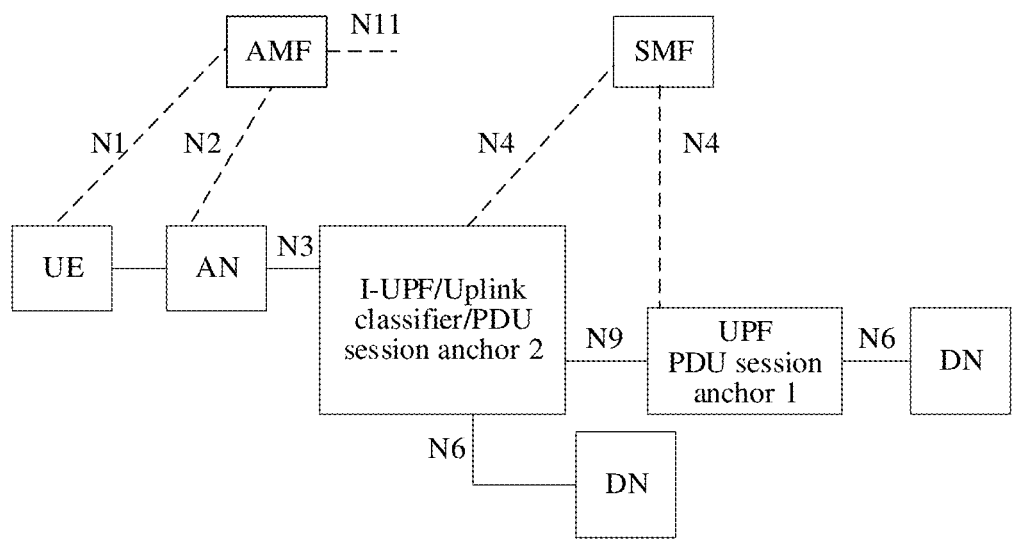
**Scenario 2: A plurality of UPFs are not within a
management range of a same SMF**
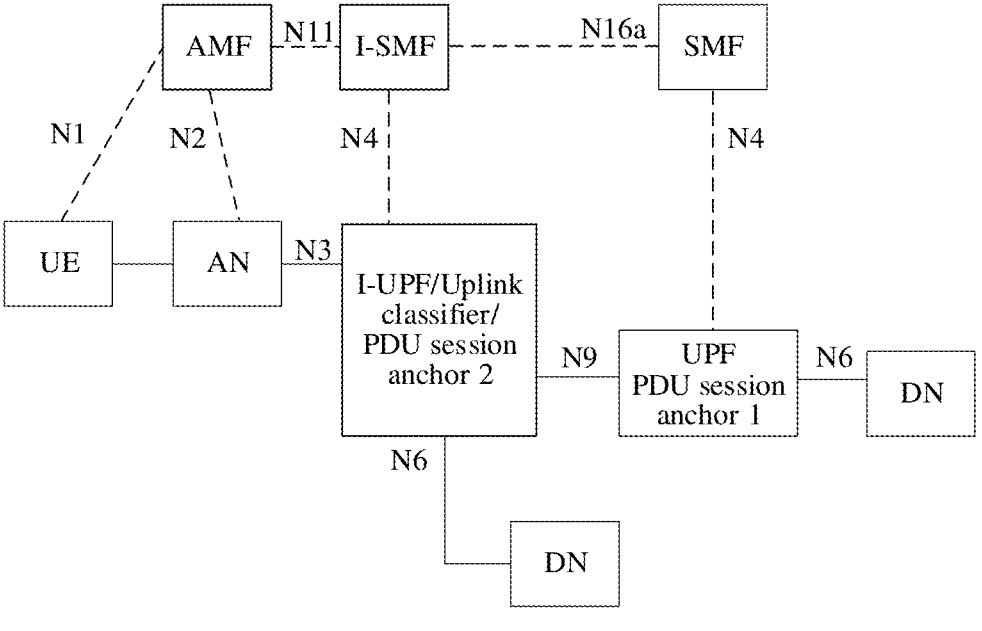
FIG. 30

NETWORK ACCESS METHOD AND APPARATUS

CROSS-REFERENCE TO RELATED APPLICATIONS

This application is a continuation of International Application No. PCT/CN2022/084931, filed on Apr. 1, 2022, which claims priority to Chinese Patent Application No. 202110362662.3, filed on Apr. 2, 2021 and Chinese Patent Application No. 202110877210.9, filed on Jul. 31, 2021. All of the aforementioned patent applications are hereby incorporated by reference in their entireties.

TECHNICAL FIELD

This application relates to the field of wireless communication technologies, and in particular, to a network access method and an apparatus.

BACKGROUND

A roaming scenario defined in an existing 3rd generation partnership project (3GPP) network architecture is directed mainly at an international roaming scenario. In China, when mobile edge computing (MEC) is deployed on a city or campus, a new roaming scenario emerges. A user can roam between provinces or between cities in a province.

When the user roams between the provinces or between the cities in the province, enabling the user to access a local data network at a home location is difficult.

SUMMARY

This application provides a network access method and an apparatus, to enable a terminal device to still access a local data network at a home location in a roaming scenario, thereby improving security of the local data network at the home location and satisfying diversified service requirements of a user. A service flow of the terminal device may return to the home location and be offloaded at the home location, or may be offloaded at a visited location based on a preset offloading rule, so that a part of the service flow returns to the home location, and a remaining part of the service flow is offloaded at the visited location.

According to a first aspect, an embodiment of this application provides a network access method. The method may be performed by a session management function network element at a home location, or may be performed by a component (for example, a chip or a circuit) configured in a session management function network element at a home location.

The method includes: A session management function network element at a home location inserts an uplink classifier user plane function network element at the home location, where the uplink classifier user plane function network element is configured to offload a service flow of a terminal device; and when the terminal device moves to a visited location, the session management function network element sends an address of the uplink classifier user plane function network element to an intermediate user plane function network element at the visited location, to establish a tunnel between the intermediate user plane function network element and the uplink classifier user plane function network element.

In the foregoing technical solution, the tunnel between the uplink classifier user plane function network element at the home location and the intermediate user plane function network element at the visited location may be established. When the terminal device roams at the visited location, the service flow of the terminal device may return to the home location through the tunnel and be offloaded under an action of the uplink classifier user plane function network element at the home location, so as to satisfy a service requirement of the terminal device.

In a possible design of the first aspect, that the session management function network element at the home location inserts the uplink classifier user plane function network element at the home location includes: The session management function network element at the home location inserts the uplink classifier user plane function network element based on a data network name DNN subscribed to by the terminal device.

In a possible design of the first aspect, that the session management function network element at the home location inserts the uplink classifier user plane function network element at the home location includes: The session management function network element receives a user policy of the terminal device from a policy control function network element, where the user policy indicates that the service flow of the terminal device needs to return to the home location and be offloaded in a roaming scenario; and the session management function network element inserts the uplink classifier user plane function network element based on the user policy.

In the foregoing technical solution, the session management function network element at the home location may insert the uplink classifier user plane function network element at the home location when the user policy of the terminal device indicates that the service flow of the terminal device needs to return to the home location and be offloaded in the roaming scenario. In this way, a requirement that all service traffic of the terminal device returns to the home location and is offloaded is satisfied, and security of a local data network at the home location is improved.

In a possible design of the first aspect, the method further includes: The session management function network element sends a first offloading rule to the uplink classifier user plane function network element, where the first offloading rule indicates to send a service flow that matches the first offloading rule to a secondary anchor user plane function network element at the home location, and the secondary anchor user plane function network element is connected to a local data network at the home location.

In a possible design of the first aspect, the method further includes: The session management function network element sends the address of the uplink classifier user plane function network element to the secondary anchor user plane function network element, to establish a tunnel between the secondary anchor user plane function network element and the uplink classifier user plane function network element.

In a possible design of the first aspect, the first offloading rule further indicates to send a service flow that does not match the first offloading rule to a primary anchor user plane function network element at the home location, where the primary anchor user plane function network element is connected to the Internet.

In a possible design of the first aspect, the method further includes: The session management function network element sends the address of the uplink classifier user plane function network element to the primary anchor user plane function network element, to establish a tunnel between the primary anchor user plane function network element and the uplink classifier user plane function network element.

In a possible design of the first aspect, the method further includes: The session management function network element sends the address of the uplink classifier user plane function network element to an access network device at the home location, to establish a tunnel between the access network device and the uplink classifier user plane function network element.

In the foregoing technical solution, the uplink classifier user plane function network element at the home location may perform offloading in a forward offloading manner, to offload, to the secondary anchor user plane function network element, the service flow that matches the first offloading rule, so as to enable the terminal device to access the local data network at the home location, and offload, to the primary anchor user plane function network element, the service flow that does not match the first offloading rule, so as to enable the terminal device to access the Internet.

Further, after the uplink classifier user plane function network element is inserted at the home location, the session management function network element at the home location may further separately update bearer rules of the primary anchor user plane function network element, the secondary anchor user plane function network element, and the access network device at the home location. In this way, transmission paths of uplink and downlink service flows of the terminal device are connected.

In a possible design of the first aspect, if the terminal device is still in a service area of the session management function network element after moving to the visited location, the method further includes: The session management function network element inserts the intermediate user plane function network element at the visited location; and the session management function network element sends an address of the intermediate user plane function network element to the uplink classifier user plane function network element, to establish a tunnel between the uplink classifier user plane function network element and the intermediate user plane function network element.

In a possible design of the first aspect, the method further includes: The session management function network element sends the address of the intermediate user plane function network element to an access network device at the visited location, to establish a tunnel between the access network device and the intermediate user plane function network element.

In a possible design of the first aspect, if the terminal device leaves a service area of the session management function network element after moving to the visited location, that the session management function network element sends the address of the uplink classifier user plane function network element to the intermediate user plane function network element at the visited location includes: The session management function network element sends the address of the uplink classifier user plane function network element to the intermediate user plane function network element by using an intermediate session management function network element at the visited location.

In a possible design of the first aspect, the method further includes: The session management function network element receives, by using the intermediate session management function network element, an address of the intermediate user plane function network element from the intermediate user plane function network element; and the session management function network element sends the address of the intermediate user plane function network element to the uplink classifier user plane function network element, to establish a tunnel between the uplink classifier user plane function network element and the intermediate user plane function network element.

The foregoing technical solution is applicable to two roaming scenarios in which the terminal device is still in the service area of the session management function network element at the home location after moving to the visited location, and the terminal device leaves the service area of the session management function network element at the home location after moving to the visited location. In the scenario in which the terminal device is still in the service area of the session management function network element at the home location after moving to the visited location, the session management function network element at the home location may insert the intermediate user plane function network element at the visited location. That is, the session management function network element at the home location is also a session management function network element at the visited location.

According to a second aspect, an embodiment of this application provides a network access method. The method may be performed by an intermediate session management function network element at a visited location, or may be performed by a component (for example, a chip or a circuit) configured in an intermediate session management function network element at a visited location.

The method includes: When a terminal device moves to a visited location, an intermediate session management function network element at the visited location inserts an intermediate user plane function network element at the visited location; and the intermediate session management function network element receives an address of an uplink classifier user plane function network element from a session management function network element at a home location, where the uplink classifier user plane function network element is configured to offload a service flow of the terminal device, and the address of the uplink classifier user plane function network element is used to establish a tunnel between the intermediate user plane function network element and the uplink classifier user plane function network element.

In the foregoing technical solution, the tunnel between the uplink classifier user plane function network element at the home location and the intermediate user plane function network element at the visited location may be established. When the terminal device roams at the visited location, the service flow of the terminal device may return to the home location through the tunnel and be offloaded under an action of the uplink classifier user plane function network element at the home location.

The foregoing technical solution is applicable to a roaming scenario in which the terminal device leaves a service area of the session management function network element at the home location after moving to the visited location. In this scenario, the intermediate session management function network element at the visited location may insert the intermediate user plane function network element at the visited location.

In a possible design of the second aspect, the method further includes: The intermediate session management function network element sends the address of the uplink classifier user plane function network element to the intermediate user plane function network element, to establish a tunnel between the intermediate user plane function network element and the uplink classifier user plane function network element.

In a possible design of the second aspect, the method further includes: The intermediate session management function network element sends an address of the intermediate user plane function network element to the session management function network element, to establish a tunnel between the uplink classifier user plane function network element and the intermediate user plane function network element.

In a possible design of the second aspect, the method further includes: The intermediate session management function network element sends the address of the intermediate user plane function network element to an access network device at the visited location, to establish a tunnel between the access network device and the intermediate user plane function network element.

In the foregoing technical solution, after the intermediate session management function network element is inserted at the visited location, the session management function network element at the visited location may further separately update bearer rules of the intermediate user plane function network element and the access network device at the visited location. In this way, transmission paths of uplink and downlink service flows of the terminal device are connected.

According to a third aspect, an embodiment of this application provides a network access method. The method may be performed by a session management function network element at a visited location, or may be performed by a component (for example, a chip or a circuit) configured in a session management function network element at a visited location.

The method includes: When a terminal device moves to a visited location, a session management function network element at the visited location inserts an uplink classifier user plane function network element at the visited location, where the uplink classifier user plane function network element is configured to offload a service flow of the terminal device; and the session management function network element at the visited location sends a second offloading rule to the uplink classifier user plane function network element, where the second offloading rule indicates to send a service flow that matches the second offloading rule to a primary anchor user plane function network element at the home location, and the primary anchor user plane function network element is connected to a local data network at the home location.

In the foregoing technical solution, the uplink classifier user plane function network element is inserted at the visited location, and the second offloading rule is delivered to the uplink classifier user plane function network element, so that when the terminal device roams at the visited location, the service flow of the terminal device may be offloaded to the primary anchor user plane function network element at the home location by using the uplink classifier user plane function network element, so as to satisfy a requirement that a part of the service flow of the terminal device returns to the home location.

In a possible design of the third aspect, that the session management function network element at the visited location inserts the uplink classifier user plane function network element at the visited location includes: The session management function network element at the visited location inserts the uplink classifier user plane function network element based on a data network name DNN subscribed to by the terminal device.

In a possible design of the third aspect, that the session management function network element at the visited location inserts the uplink classifier user plane function network element at the visited location includes: The session management function network element at the visited location inserts the uplink classifier user plane function network element based on a user policy of the terminal device, where the user policy indicates that a service flow of the terminal device is to be offloaded at the visited location in a roaming scenario and a service flow that accesses the local data network of the home location returns to the home location.

In the foregoing technical solution, when the user policy of the terminal device indicates that the service flow of the terminal device needs to be offloaded at the visited location in the roaming scenario, and the service flow that accesses the local data network of the home location returns to the home location, the session management function network element at the visited location may insert the uplink classifier user plane function network element at the visited location, so as to satisfy a requirement that some service traffic that is of the terminal device and that satisfies the rule returns to the home location and other traffic is offloaded locally at the visited location.

Further, the service flow that does not match the second offloading rule may be offloaded locally at the visited location, and all service flows of the terminal device do not need to be sent back to the home location. Therefore, in the foregoing technical solution, network resources can be fully utilized, and a delay of accessing the Internet by a user can be reduced.

In a possible design of the third aspect, if the session management function network element at the visited location is the same as a session management function network element at the home location, the method further includes: The session management function network element at the visited location sends an address of the uplink classifier user plane function network element to the primary anchor user plane function network element, to establish a tunnel between the primary anchor user plane function network element and the uplink classifier user plane function network element.

In a possible design of the third aspect, if the session management function network element at the visited location is different from a session management function network element at the home location, the method further includes: The session management function network element at the visited location sends, by using the session management function network element at the home location, an address of the uplink classifier user plane function network element to the primary anchor user plane function network element, to establish a tunnel between the primary anchor user plane function network element and the uplink classifier user plane function network element.

In a possible design of the third aspect, the second offloading rule indicates to send a service flow that does not match the second offloading rule to a secondary anchor user plane function network element at the visited location, where the secondary anchor user plane function network element is connected to the Internet.

In the foregoing technical solution, the uplink classifier user plane function network element at the visited location may perform offloading in a reverse offloading manner, to offload, to the primary anchor user plane function network element, the service flow that matches the second offloading rule, so that the terminal device can access the local data network at the home location, and offload, to the secondary anchor user plane function network element, the service flow that does not match the second offloading rule, so that the terminal device can access the Internet.

In a possible design of the third aspect, the method further includes: The session management function network element at the visited location sends the address of the uplink classifier user plane function network element to the secondary anchor user plane function network element, to establish a tunnel between the secondary anchor user plane function network element and the uplink classifier user plane function network element.

In a possible design of the third aspect, the method further includes: The session management function network element at the visited location sends the address of the uplink classifier user plane function network element to an access network device at the visited location, to establish a tunnel between the access network device and the uplink classifier user plane function network element.

According to a fourth aspect, an embodiment of this application provides a communication apparatus. The communication apparatus may have a function of implementing the session management function network element at the home location in any one of the foregoing aspects or the possible designs of the aspects, a function of implementing the intermediate session management function network element at the visited location in any one of the foregoing aspects or the possible designs of the aspects, or a function of implementing the session management function network element at the visited location in any one of the foregoing aspects or the possible designs of the aspects. The apparatus may be a network device, or may be a chip included in a network device.

Functions of the foregoing communication apparatus may be implemented by hardware, or may be implemented by hardware executing corresponding software. The hardware or software includes one or more modules, units, or means (means) corresponding to the foregoing functions.

In a possible design, a structure of the communication apparatus includes a processing module and a transceiver module. The processing module is configured to support the communication apparatus in performing a corresponding function of the first session management function network element in any one of the foregoing aspects or designs of the aspects, a corresponding function of the session management function network element at the home location in any one of the foregoing aspects or designs of the aspects, a corresponding function of the intermediate session management function network element at the visited location in any one of the foregoing aspects or designs of the aspects, or a corresponding function of the session management function network element at the visited location in any one of the foregoing aspects or designs of the aspects. The transceiver module is configured to support communication between the communication apparatus and another communication device. For example, when being the session management function network element at the home location, the communication apparatus may send an address of an uplink classifier user plane function network element to an intermediate user plane function network element at the visited location. The communication apparatus may further include a storage module. The storage module is coupled to the processing module, and stores program instructions and data for the apparatus. In an example, the processing module may be a processor, the communication module may be a transceiver, the storage module may be a memory, and the memory may be integrated with the processor, or may be disposed separately from the processor.

In another possible design, a structure of the communication apparatus includes a processor, and may further include a memory. The processor is coupled to the memory, and may be configured to execute the computer program instructions stored in the memory, to enable the apparatus to perform the method in any one of the foregoing aspects or the possible designs of the aspects. Optionally, the communication apparatus further includes a communication interface, and the processor is coupled to the communication interface. When the communication apparatus is a network device, the communication interface may be a transceiver or an input/output interface; or when the apparatus is a chip included in a network device, the communication interface may be an input/output interface of the chip. Optionally, the transceiver may be a transceiver circuit, and the input/output interface may be an input/output circuit.

According to a fifth aspect, an embodiment of this application provides a chip system, including: a processor, where the processor is coupled to a memory, the memory is configured to store a program or instructions, and when the program or the instructions are executed by the processor, the chip system is enabled to implement the method in any one of the foregoing aspects or the possible designs of the aspects.

Optionally, the chip system further includes an interface circuit, and the interface circuit is configured to exchange code instructions to the processor.

Optionally, there may be one or more processors in the chip system, and the processor may be implemented by using hardware or may be implemented by using software. When implemented by using hardware, the processor may be a logic circuit, an integrated circuit, or the like. When being implemented by using software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory. The memory and the processor may be integrated on a same chip, or may be separately disposed on different chips.

According to a sixth aspect, an embodiment of this application provides a communication system, where the communication system includes a session management function network element at a home location and/or an intermediate session management function network element at a visited location; and the session management function network element at the home location is configured to implement the method in the first aspect or any possible design of the first aspect, and the intermediate session management function network element at the visited location is configured to implement the method in the second aspect or any possible design of the second aspect.

Optionally, the communication system further includes an uplink classifier user plane function network element, a primary anchor user plane function network element, and a secondary anchor user plane function network element at the home location, and an intermediate user plane function network element at the visited location.

According to a seventh aspect, an embodiment of this application provides a communication system, where the communication system includes a session management function network element at a visited location; and the session management function network element at the visited location is configured to implement the method in any one of the third aspect or the possible designs of the third aspect.

Optionally, the communication system further includes an uplink classifier user plane function network element and a secondary anchor user plane function network element at the visited location, and a primary anchor user plane function network element at a home location.

According to an eighth aspect, an embodiment of this application provides a computer-readable storage medium. The computer-readable storage medium stores a computer program or instructions, and when the computer program or the instructions are executed, a computer is enabled to perform the method in any one of the foregoing aspects or the possible designs of the aspects.

According to a ninth aspect, an embodiment of this application provides a computer program product. When a computer reads and executes the computer program product, the computer is enabled to perform the method in any one of the foregoing aspects or the possible designs of the aspects.

This application provides a campus network access method and an apparatus, so that when roaming between provinces or between cities in a province, a user can still access a campus network at a home location, thereby improving security of a campus network.

A service flow of the user may be offloaded after returning to the home location, or may be partially offloaded at a visited location and partially return to the home location based on an offloading policy, so as to satisfy diversified service requirements of the campus network.

According to a tenth aspect, this application provides a campus network access method, where the method includes:

A session management function SMF at a home location inserts an uplink classifier user plane function ULCL UPF at the home location based on subscription data and a current location of a terminal device; the SMF at the home location determines that the service flow of the terminal device needs to return to the home location and be offloaded in a roaming scenario; and the SMF at the home location sends an address of the ULCL UPF, where the address of the ULCL UPF is used by a forwarding user plane function I-UPF at a visited location to forward the service flow of the terminal device to the ULCL UPF.

In a possible design, the method further includes:

The SMF at the home location receives an address of the I-UPF from a forwarding session management function I-SMF at the visited location; and the SMF at the home location sends the address of the I-UPF to the ULCL UPF, where the address of the I-UPF is used by the ULCL UPF to forward the service flow of the terminal device to the I-UPF.

In a possible design, the method further includes:

The SMF at the home location sends the address of the ULCL UPF to an SMF at the visited location.

In a possible design, the method further includes:

The SMF at the home location inserts the I-UPF at the visited location.

In a possible design, the method further includes:

The SMF at the home location sends the address of the ULCL UPF to the I-UPF at the visited location; and the SMF at the home location sends the address of the I-UPF to the ULCL UPF, where the address of the I-UPF is used by the ULCL UPF to forward the service flow of the terminal device to the I-UPF.

According to an eleventh aspect, this application provides a campus network access method, where the method includes:

A session management function SMF at a visited location inserts an uplink classifier user plane function ULCL UPF at the visited location based on subscription data and a current location of a terminal device; and the SMF at the visited location sends an offloading rule to the ULCL UPF, where the offloading rule includes sending a service flow matching a first address to a UPF at a home location, and sending a service flow matching a second address to a UPF at the visited location, where the service flow matching the first address is used to access a local network at the home location, and the service flow matching the second address is used to access the Internet.

In a possible design, the second address is an address other than the first address.

BRIEF DESCRIPTION OF THE DRAWINGS

FIG. 8a-1 and FIG. 8a-2 and FIG. 8b-1, FIG. 8b-2, and FIG. 8b-3 each are a specific example of Embodiment 1 of this application;

FIG. 14A, FIG. 14B, and FIG. 14C are a specific example of Embodiment 2 of this application;

FIG. 22 is a schematic diagram of an inter-province roaming scenario according to Embodiment 3 of this application;

FIG. 23 is a schematic diagram of a network architecture to which Embodiment 3 of this application is applicable;

FIG. 26 is a schematic diagram of an intra-province roaming scenario according to Embodiment 4 of this application;

FIG. 28 is a schematic diagram of a network architecture to which Embodiment 4 of this application is applicable;

FIG. 30 is a schematic diagram of a network architecture to which Embodiment 5 of this application is applicable.

DESCRIPTION OF EMBODIMENTS

To make objectives, technical solution, and advantages of embodiments of this application clearer, the following further describes embodiments of this application in detail with reference to accompanying drawings.

Technical solutions in embodiments of this application may be applied to various communication systems, for example, a long term evolution (LTE) system, an LTE frequency division duplex (FDD) system, an LTE time division duplex (TDD) system, or a 5th generation (5G) mobile communication system or new radio (NR) system, or applied to a future communication system or another similar communication system.

Figure 1:
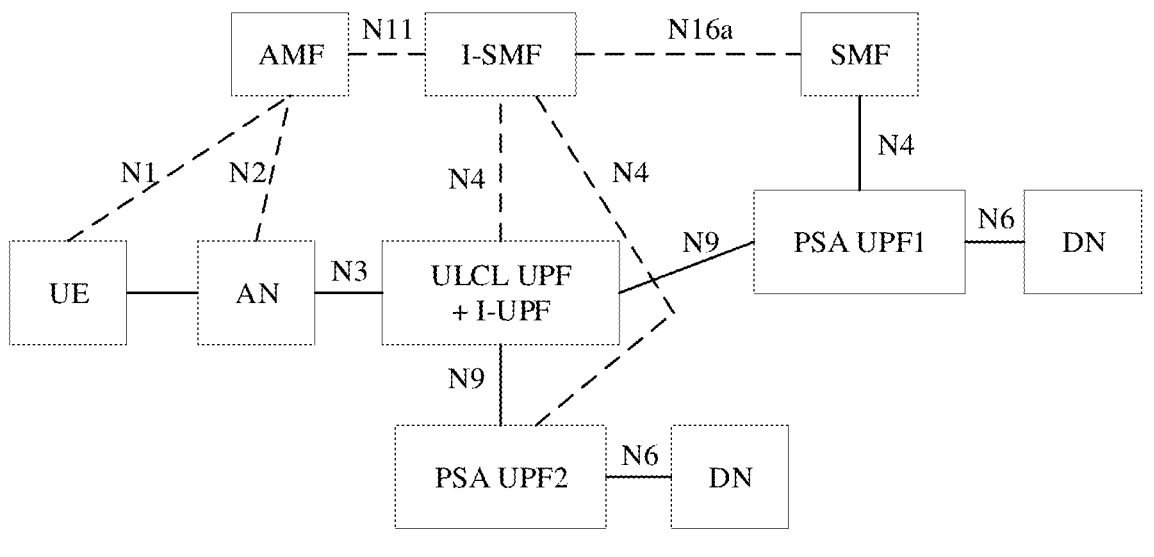
FIG. 1 is a schematic diagram of a network architecture in a roaming scenario to which this application is applicable.

Referring to FIG. 1, in this application, a 5G network architecture related to a roaming scenario and defined in a 3GPP standard is used as an example to describe a network architecture in a roaming scenario to which this application is applicable. The network architecture includes three parts: a terminal device, a data network (DN), and a carrier network.

The carrier network may include but is not limited to one or more of the following network elements or functional entities: an access and mobility management function (AMF) network element, a session management function (SMF) network element, an intermediate SMF (I-SMF) network element, a user plane function (UPF) network element, an intermediate UPF (I-UPF) network element, an uplink classifier UPF (ULCL UPF) network element, a protocol data unit (PDU) session anchor UPF (PSA UPF) network element, and a radio access network (RAN) device. Optionally, the network architecture may further include network elements or functional entities temporarily not shown in FIG. 1, such as a policy control function (PCF) network element, a unified data management (UDM) network element, a unified data repository (UDR) network element, and an application function (AF) network element.

In some embodiments, the terminal device is a device configured to implement a wireless communication function. The terminal device may be a user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. The terminal device may be mobile, or may be fixed. This is not limited.

The terminal device may establish a connection to the carrier network through an interface (for example, an N1 interface) provided by the carrier network, and use services such as data and/or voice provided by the carrier network. The terminal device may further access the DN by using the carrier network, and use a carrier service deployed on the DN and/or a service provided by a third party. The third party may be a service party other than the carrier network and the terminal device, and may provide another data and/or voice service for the terminal device. A representation form of the third party may be determined based on an actual application scenario, and is not limited herein.

The RAN is a subnet of the carrier network, and is an implementation system between a service node in the carrier network and the terminal device. To access the carrier network, the terminal device first accesses the RAN, and then may be connected to the service node in the carrier network via the RAN. The RAN device in this application is a device that provides a wireless communication function for the terminal device, and the RAN device is also referred to as an access network device. The RAN device in this application includes but is not limited to: a next-generation base station (g NodeB, gNB) in 5G, an evolved NodeB (eNB), a radio network controller (RNC), and a NodeB (NB), a base station controller (BSC), a base transceiver station (BTS), a home base station (for example, home evolved NodeB or home NodeB, HNB), a baseband unit (BBU), a transmitting and receiving point (TRP), a transmitting point (TP), a mobile switching center, and the like.

The AMF network element is mainly responsible for functions such as mobility management and access authentication/authorization, for example, registration, location update, and mobility state switching of the terminal device. In addition, the network element is responsible for transferring a user policy between the terminal device and the PCF.

The SMF network element is mainly responsible for functions such as session management, execution of a control policy delivered by the PCF, UPF selection, and UE Internet Protocol (IP) address allocation. In the roaming scenario, the SMF network element at a home location may also be referred to as an anchor SMF (A-SMF) network element of the terminal device.

The I-SMF network element is also referred to as a forwarding SMF network element, and is configured to forward a control plane message between a visited location and the home location. In the roaming scenario, after the terminal device moves to the visited location, if the location of the terminal device is no longer within a service area of the A-SMF network element, the AMF network element may insert the I-SMF network element at the visited location.

The UPF network element serves as an interface UPF for a data network and is mainly responsible for functions such as user plane data forwarding, session/flow-level based charging statistics, and bandwidth limiting.

The PSA UPF network element, also referred to as an anchor UPF network element, serves as an anchor connected to a PDU session, and is responsible for filtering, forwarding, rate control, charging, and the like of user plane data of the terminal device. In the roaming scenario, the PSA UPF network element at the home location is referred to as a primary PSA UPF network element (namely, a primary anchor UPF network element) of the terminal device. This application supports a case that one or more secondary PSA UPF network elements (that is, secondary anchor UPF network elements) are inserted into a user plane path of a PDU session of the terminal device, so that the terminal device can access a nearby local data network. The secondary PSA UPF network element may be deployed at the home location (for example, an edge area of the home location), or may be deployed at the visited location. This is not limited. In some embodiments, the primary PSA UPF network element (or the primary anchor UPF network element) is a UPF network element connected to the terminal device when the terminal device is initially activated to create a session, and is configured to allocate an IP address to the terminal device and forward the user plane data. The secondary PSA UPF network element (or the secondary anchor UPF network element) is a UPF network element inserted after the session of the terminal device is created, and is configured to forward the user plane data for the terminal device.

The I-UPF network element is also referred to as a forwarding UPF network element, and is configured to forward the user plane data between the visited location and the home location. In the roaming scenario, after the terminal device moves to the visited location, if the location of the terminal device is no longer in the service area of the primary PSA UPF network element, the A-SMF network element (corresponding to a case in which the location of the terminal device is still in the service area of the A-SMF network element) or the I-SMF network element (corresponding to a case in which the location of the terminal device is no longer within the service area of the A-SMF network element or a case in which the I-SMF network element exists) can insert the I-UPF network element at the visited location. The I-UPF network element and the ULCL UPF network element may be integrally deployed. For example, ULCL UPF+I-UPF network element in FIG. 1 indicates that the network element can also serve as an I-UPF network element to implement an N3 interface capability in the roaming scenario.

The ULCL UPF network element is a working form of the UPF network element, is used for service offloading, and may determine a data flow direction based on different destination addresses accessed by a user. In this application, the ULCL UPF network element may be inserted at the home location, or may be inserted at the visited location. This is not limited. Alternatively, the ULCL UPF network element and another UPF network element (for example, the I-UPF network element or the PSA UPF network element) may be integrally deployed. For example, ULCL UPF+I-UPF network element in FIG. 1 indicates that the network element may also serve as a ULCL UPF network element, to implement an offloading function.

The PCF network element is mainly responsible for policy control functions such as charging, quality of service QoS (quality of service) bandwidth guarantee, mobility management, and UE policy decision based on a session and a service flow level.

The UDM network element is mainly responsible for functions such as subscription data management and user access authorization.

The UDR network element is mainly responsible for a function of storing types of data such as subscription data, policy data, and application data.

The AF network element is mainly responsible for transmitting requirements of an application side on a network side, for example, QoS requirements or user status event subscription. The AF may be a third-party functional entity, or may be an application service deployed by an operator. The AF network element may also be referred to as an application server, a third-party device, or the like.

The DN is a data network that provides services for users. Generally, a client is located on the terminal device, and a server is located on the data network. The data network may be a private network such as a local area network, may be an external network that is not controlled by an operator, such as the Internet, or may be a dedicated network jointly deployed by operators, such as a configured IP multimedia core network subsystem (IMS) service. In the roaming scenario, a local data network deployed at the home location may be different from a local data network deployed at the visited location. For ease of understanding, the local data network deployed at the home location in this application may also be referred to as a campus network, an enterprise network, an enterprise private network, a local network, or the like. This is not limited.

Interfaces and functions between the foregoing network elements or functional entities are as follows:

An N1 interface is an interface between the AMF and the UE, and is configured to transmit a QoS control rule and the like to the UE.

An N2 interface is an interface between the AMF and the RAN, and is configured to transmit radio bearer control information from a core network side to the RAN.

An N3 interface is an interface between the (R)AN and a UPF, and is configured to transmit user plane data between the (R)AN and the UPF.

An N4 interface is an interface between the SMF and a UPF, and is configured to transmit information between a control plane and a user plane, including delivering of a control plane-to-user plane forwarding rule, a QoS control rule, a traffic statistics rule, and the like, and reporting of information about the user plane.

An N5 interface is an interface between the AF and the PCF, and is configured to deliver an application service request and report a network event. The interface is temporarily not shown in FIG. 1.

An N6 interface is an interface between the UPF and the DN, and is configured to transmit user plane data between a UPF and the DN.

An N7 interface is an interface between the PCF and the SMF, and is configured to deliver PDU session granularity and service data flow granularity control policies. The interface is temporarily not shown in FIG. 1.

An N8 interface is an interface between the AMF and the UDM, and is used by the AMF to obtain access and mobility management-related subscription data and authentication data from the UDM, and by the AMF to register current mobility management-related information of the UE with the UDM. The interface is temporarily not shown in FIG. 1.

An N9 interface is an interface between UPFs, for example, an interface between a UPF connected to the DN and a UPF connected to the (R)AN, and is configured to transmit user plane data between the UPFs.

An N10 interface is an interface between the SMF and the UDM, and is used by the SMF to obtain session management-related subscription data from the UDM, and by the SMF to register current session-related information of the UE with the UDM. The interface is temporarily not shown in FIG. 1.

An N11 interface is an interface between the SMF and the AMF, and is configured to transmit PDU session tunnel information between the RAN and a UPF, a control message sent to the UE, radio resource control information sent to the RAN, and the like.

An N15 interface is an interface between the PCF and the AMF, and is configured to deliver a UE policy and an access control-related policy. The interface is temporarily not shown in FIG. 1.

An N16a interface is an interface between the SMF and the I-SMF, and is used by the I-SMF at the visited location to obtain information about a UPF at the home location from the SMF at the home location.

An N22 interface is an interface between the AMF and a network slice selection function (NSSF), and is used by the AMF to query the NSSF for information such as allowed network slice selection assistance information (NSSAI) and configured NSSAI configured by a home network on the UE. The interface is temporarily not shown in FIG. 1.

An N35 interface is an interface between the UDM and the UDR, and is used by the UDM to obtain user subscription data information from the UDR. The interface is temporarily not shown in FIG. 1.

An N36 interface is an interface between the PCF and the UDR, and is used by the PCF to obtain policy-related subscription data and application data-related information from the UDR. The interface is temporarily not shown in FIG. 1.

The foregoing network element or functional entity may be a network element in a hardware device, may a software function run on dedicated hardware, or may be a virtualized function instantiated on a platform (for example, a cloud platform). Optionally, the foregoing network element or function may be implemented by one device, or may be jointly implemented by a plurality of devices, or may be a function module in one device. This is not specifically limited in embodiments of this application.

A general user registration process can be simply described as follows: The UE sends a registration request to the AMF through the RAN, the AMF obtains subscription data from the specified UDM based on a user identifier, and after receiving the request, the UDM may obtain the actual subscription data from the UDR. In addition, the AMF may further initiate a user policy control create request (UEPolicyControl_Create) and an access management policy control create request (AMPolicyControl_Create) to the PCF, to obtain a UE policy and an access control policy respectively. In this process, the PCF returns the access control policy to the AMF, and the AMF provides the UE policy to the UE.

A general session establishment process can be simply described as follows: The UE sends a session establishment request to the AMF by using the RAN, the AMF selects the SMF for the session to provide a service for a session, stores a correspondence between the SMF and the PDU session, and sends the session establishment request to the SMF, and the SMF selects a corresponding UPF for the UE, establishes a user plane transmission path, and allocates an IP address to the UE. In this process, the SMF further initiates a policy control session establishment request to the PCF, to establish a policy control session between the SMF and the PCF. During the policy control session establishment, the SMF stores a correspondence between the policy control session and the PDU session. In the roaming scenario, the I-SMF and the SMF need to forward control signaling, and the I-UPF needs to forward media data.

It should be noted that the terms "system" and "network" in embodiments of this application may be used interchangeably. "A plurality of" means two or more. In view of this, "a plurality of" may also be understood as "at least two" in embodiments of this application. "At least one" may be understood as one or more, for example, understood as one, two, or more. For example, including at least one means that one, two, or more are included, and which one or ones are included is not limited. For example, if at least one of A, B, and C is included, A, B, C, A and B, A and C, B and C, or A, B, and C may be included. Similarly, understandings of descriptions such as "at least one" are also similar. The term "and/or" describes an association relationship between associated objects and indicates that three relationships may exist. For example, A and/or B may indicate the following three cases: Only A exists, both A and B exist, and only B exists. In addition, unless otherwise specified, the character "/" generally indicates an "or" relationship between the associated objects.

Unless otherwise specified, ordinal numbers such as "first" and "second" mentioned in embodiments of this application are used to distinguish a plurality of objects, and are not used to limit a sequence, a time sequence, a priority, or an importance degree of the plurality of objects. In addition, descriptions of "first" and "second" do not mean that objects are necessarily different.

For ease of description, an A-SMF, an I-SMF, a UPF, an I-UPF, and a ULCL UPF are used as an example below for description in this application. It should be understood that in the following embodiments, each A-SMF may be replaced with an anchor session management function network element (or a session management function network element or a session management function network element at a home location), each I-SMF may be replaced with an intermediate session management function network element (or a session management function network element at a visited location), each PSA UPF may be replaced with an anchor user plane function network element, each I-UPF may be replaced with an intermediate user plane function network element, and each ULCL UPF may be replaced with an uplink classifier user plane function network element.

Embodiment 1

In an existing 3GPP architecture, ULCL UPF selection in a roaming scenario is implemented by an I-SMF, and a ULCL UPF at a home location cannot be selected by using an SMF at the home location in an existing I-UPF scenario. As a result, a service flow of a terminal device cannot be offloaded at the home location after returning to the home location. In addition, after the service flow of the terminal device returns to the home location, because a UPF at the home location is a primary anchor UPF and has no Internet egress (after MEC is deployed on a city, a UPF shared by the city has an Internet egress, but the city where the home UPF at the home location is located has no Internet egress), a requirement of further offloading the service flow of the terminal device after the service flow returns to the home location cannot be satisfied.

To resolve the foregoing problem, Embodiment 1 of this application provides a network access method. In the method, when a terminal device is in a roaming scenario (for example, when a user is out of a campus or is roaming between provinces or within a province), the terminal device can still access a local data network at a home location, and a data flow can be offloaded at a home location after returning to the home location, and the local data network at the home location does not need to access the Internet.

Figure 2:
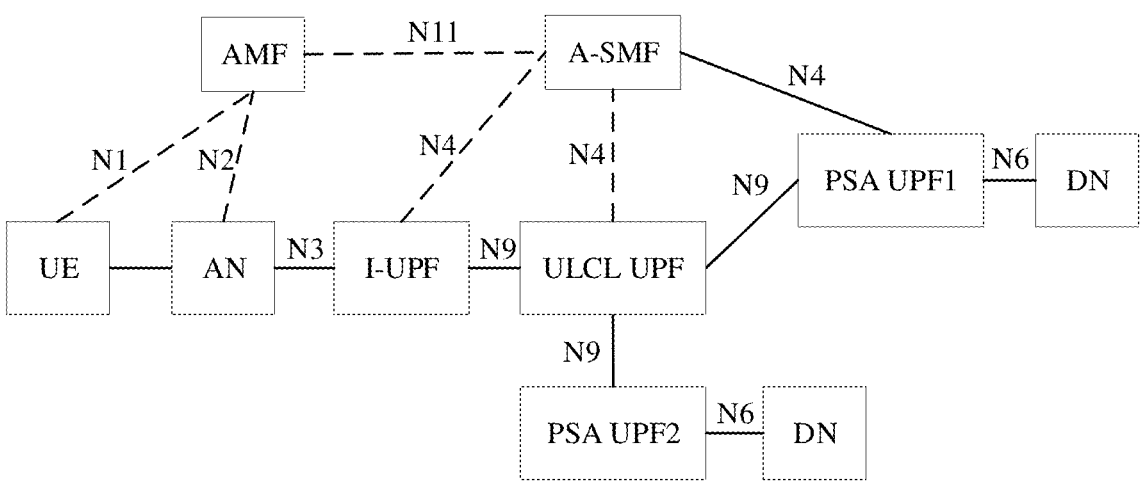
FIG. 2 is a schematic diagram of an intra-province roaming scenario according to Embodiment 1 of this application.
Figure 3:
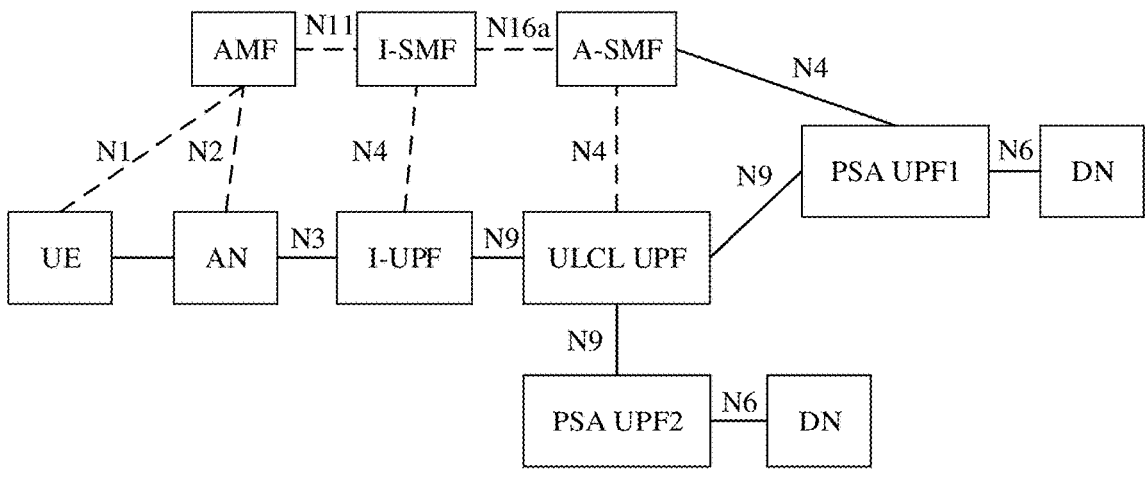
FIG. 3 is a schematic diagram of an inter-province roaming scenario according to Embodiment 1 of this application.

Embodiment 1 of this application may have two possible roaming scenarios shown in FIG. 2 and FIG. 3. For ease of understanding, the two roaming scenarios may be referred to as an intra-province roaming scenario and an inter-province roaming scenario respectively. The intra-province roaming scenario may also be referred to as a cross-city roaming scenario, and the inter-province roaming scenario may also be referred to as a cross-province roaming scenario. This is not limited.

FIG. 2 corresponds to a scenario in which a plurality of UPFs are within a management range of a same SMF (for example, the intra-province roaming scenario), indicating that both an I-UPF at a visited location and a PSA UPF1 at a home location are managed by an A-SMF. The PSA UPF1 at the home location is a primary anchor UPF of the terminal device. This scenario may be understood as follows: The UPF at the home location and the UPF at the visited location are in a management range of a same SMF, and the home location and the visited location share a same SMF but correspond to different UPFs. For example, the home location and the visited location may be different cities in a province, and may be referred to as a home city and a visited city respectively. The SMF in the home city and the SMF in the visited city are a same SMF, that is, both are SMFs in the province. In this scenario, after the terminal device moves from the home location to the visited location, if the location of the terminal device is still in the service area (service area, SA) of the A-SMF at the home location, but is no longer in the service area of the PSA UPF1 (namely, the primary anchor UPF) at the home location. In this case, the A-SMF may choose to insert the I-UPF at the visited location, so as to forward user plane data between the visited location and the home location.

FIG. 3 corresponds to a scenario in which a plurality of UPFs are not within a management range of a same SMF (for example, the inter-province roaming scenario), indicating that an I-UPF at a visited location is managed by an I-SMF at the visited location and both a PSA UPF1 at a home location and a ULCL UPF at the home location are managed by an A-SMF at the home location. The PSA UPF1 at the home location is a primary anchor UPF of the terminal device. This scenario may alternatively be understood as follows: The UPF at the home location and the UPF at the visited location are in management ranges of different SMFs, and the home location and the visited location correspond not only to different SMFs, but also to different UPFs. For example, the home location and the visited location may be different provinces in a country, and may be referred to as a home province and a visited province respectively, where the SMF in the home province and the SMF in the visited province are different SMFs, and the UPF in the home province and the UPF in the visited province are different UPFs. In addition, the UPF in the home province is managed by the SMF in the home province, and the UPF in the visited province is managed by the SMF in the visited province. In this scenario, after the terminal device moves from the home location to the visited location, if the location of the terminal device is not in the service area of the A-SMF at the home location, and is not in the service area of the PSA UPF1 (namely, the primary anchor UPF) at the home location either. In this case, the AMF may choose to insert the I-SMF at the visited location, so as to forward a control plane message or signaling between the visited location and the home location. Then, the I-SMF may select and insert the I-UPF, so as to forward user plane data between the visited location and the home location.

It should be noted that the intra-province roaming scenario and the inter-province roaming scenario mentioned in this application are described based on an administrative division manner in China because a deployment status of an SMF and a UPF is usually related to administrative division in China. For example, one SMF may be deployed for one province, and one UPF is deployed for one city. However, it should be understood that the foregoing description is merely an example, aiming to enable a reader to have a vivid understanding of the roaming scenario and more easily understand a related feature of the roaming scenario. Actually, the two roaming scenarios are distinguished based on deployment statuses of the SMF and the UPF.

For example, in some possible embodiments, the intra-province roaming scenario may refer to: The terminal device moves within a small range, does not leave the service area of the current SMF, but leaves the service area of the current UPF (that is, the UPF at the home location), and moves from the service area of the current UPF (that is, the UPF at the home location) to a service area of another UPF (that is, a UPF at the visited location). The two UPFs are managed by a same SMF, and the SMF may be referred to as an SMF at the home location and may also be referred to as an SMF at the visited location.

The inter-province roaming scenario may refer to: The terminal device moves within a large range, and moves from a service area of a current SMF (that is, an SMF at the home location) to an area of another SMF (that is, an SMF at the visited location). Certainly, the terminal device also moves from a service area of a current UPF (that is, a UPF at the home location) to a service area of another UPF (that is, a UPF at the visited location), and the two UPFs are managed by different SMFs respectively.

Figure 4:
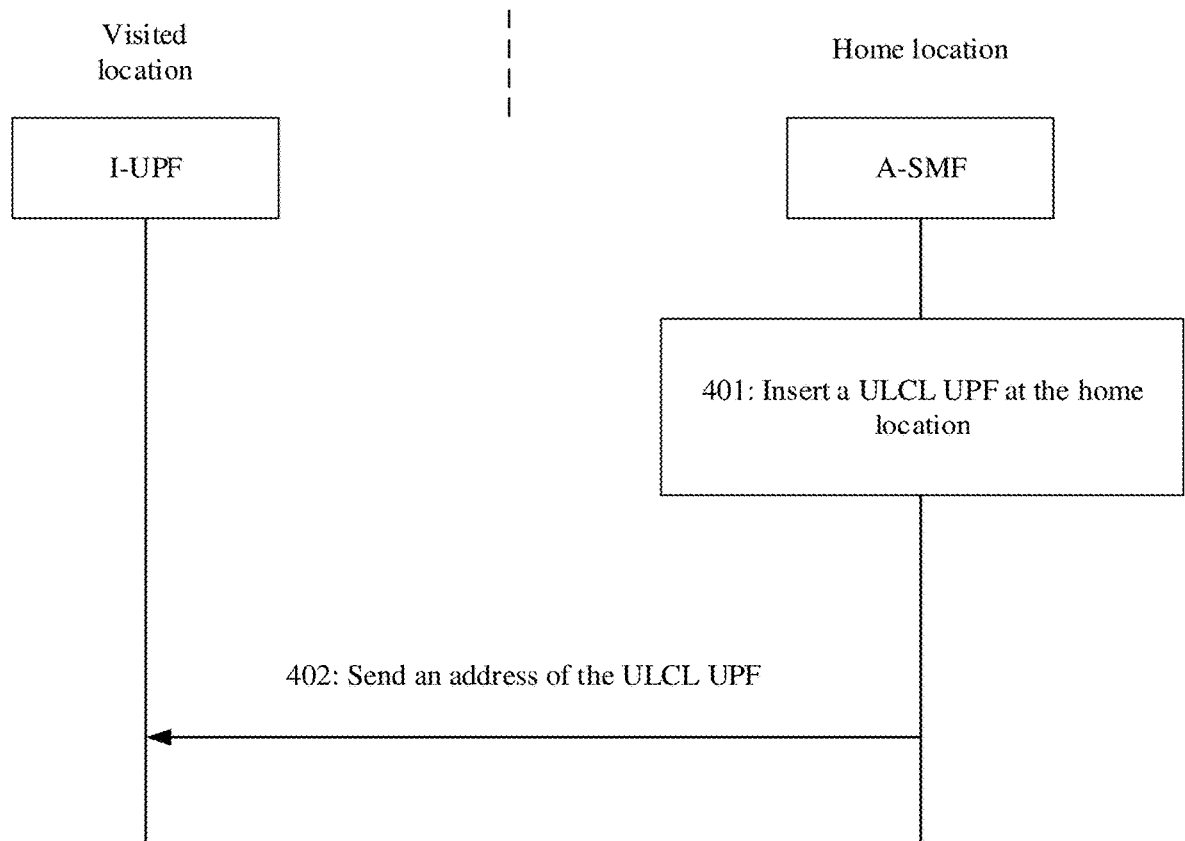
FIG. 4 is a schematic flowchart of a network access method according to Embodiment 1 of this application.

FIG. 4 is a schematic flowchart of a network access method according to Embodiment 1 of this application. The method includes:

Step 401: An A-SMF at a home location inserts a ULCL UPF at the home location, where the ULCL UPF is configured to offload a service flow of a terminal device.

In this embodiment of this application, the ULCL UPF is configured to offload the service flow of the terminal device to a primary anchor UPF and a secondary anchor UPF at the home location. The primary anchor UPF is located in a non-edge area at the home location, and the non-edge area may also be referred to as a non-MEC area, a central area, or a central data plane. The non-edge area may be further connected to the Internet via a core network. Therefore, the terminal device may access the Internet through the primary anchor UPF in the non-edge area at the home location.

The ULCL UPF and the secondary anchor UPF are located in an edge area at the home location, and the edge area may also be referred to as an MEC area. A local data network (for example, an MEC network) at the home location may be deployed in the edge area. Therefore, the terminal device may access the local data network at the home location through the secondary anchor UPF in the edge area at the home location.

In a possible implementation, the A-SMF may insert the ULCL UPF and/or the secondary anchor UPF in the edge area at the home location when the terminal device moves from the non-edge area at the home location to the edge area. For example, the A-SMF may insert the ULCL UPF and/or the secondary anchor UPF based on a data network name (DNN) subscribed to by the terminal device, the A-SMF may insert the ULCL UPF and/or the secondary anchor UPF based on a DNN subscribed to by the terminal device and a location, or the A-SMF may insert the ULCL UPF and/or the secondary anchor UPF based on a DNN subscribed to by the terminal device, a location, a data network access identifier (DNAI), or other information. The DNN may be a dedicated DNN, a dedicated network slice, or the like. This is not limited. Inserting the ULCL UPF and the secondary anchor UPF refers to inserting the ULCL UPF and the secondary anchor UPF into a session of the terminal device, for example, a PDU session.

Further, the A-SMF may obtain a user policy of the terminal device from a PCF when the terminal device moves from the non-edge area at the home location to the edge area, where the user policy indicates that the service flow of the terminal device needs to return to the home location and be offloaded in a roaming scenario; and Then, the A-SMF may insert the ULCL UPF and/or the secondary anchor UPF in the edge area at the home location based on the user policy.

Figure 5A:
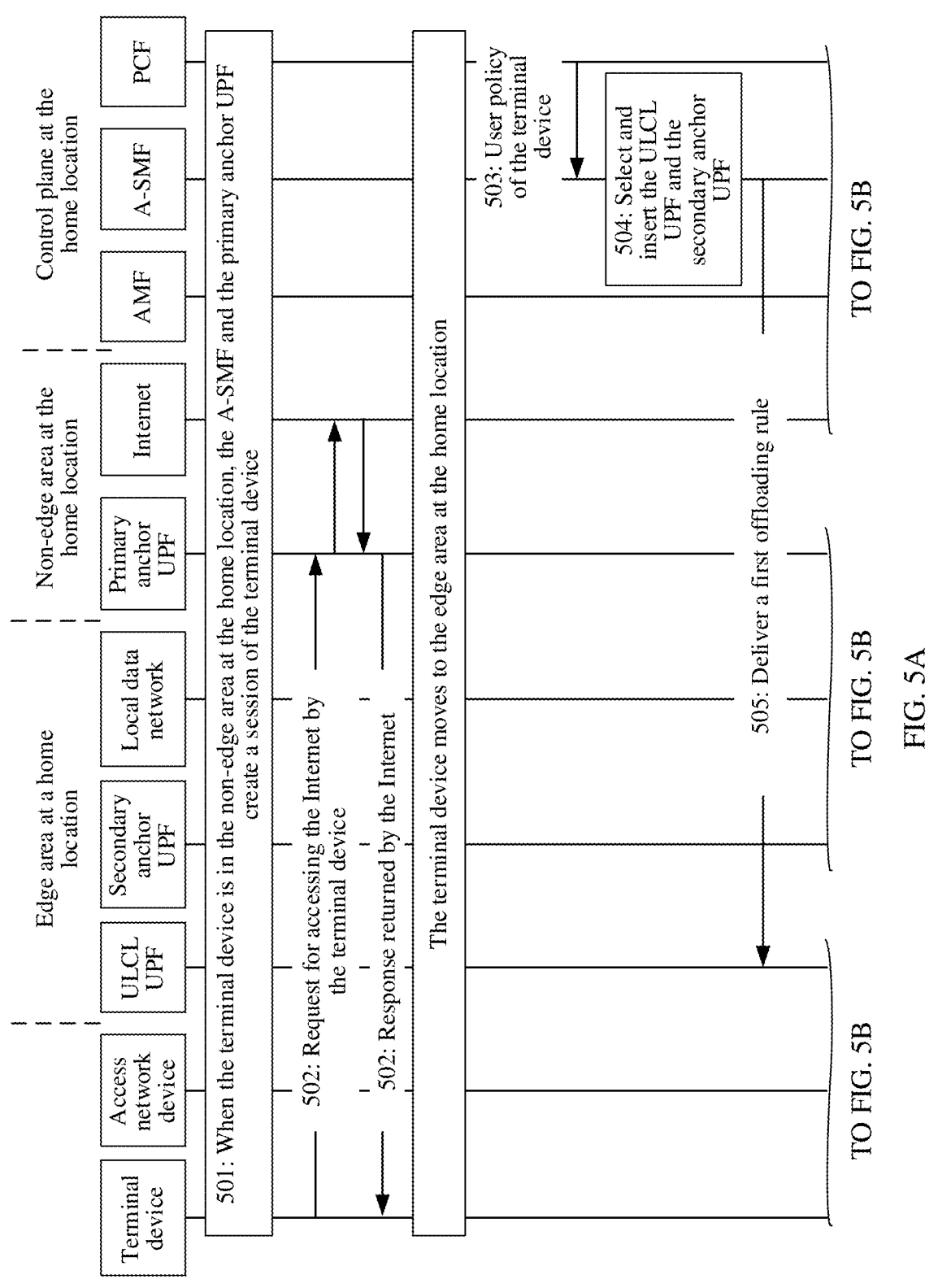
FIG. 5A and FIG. 5B show a related process corresponding to the network access method in Embodiment 1 of this application when a terminal device is at a home location.
Figure 5B:
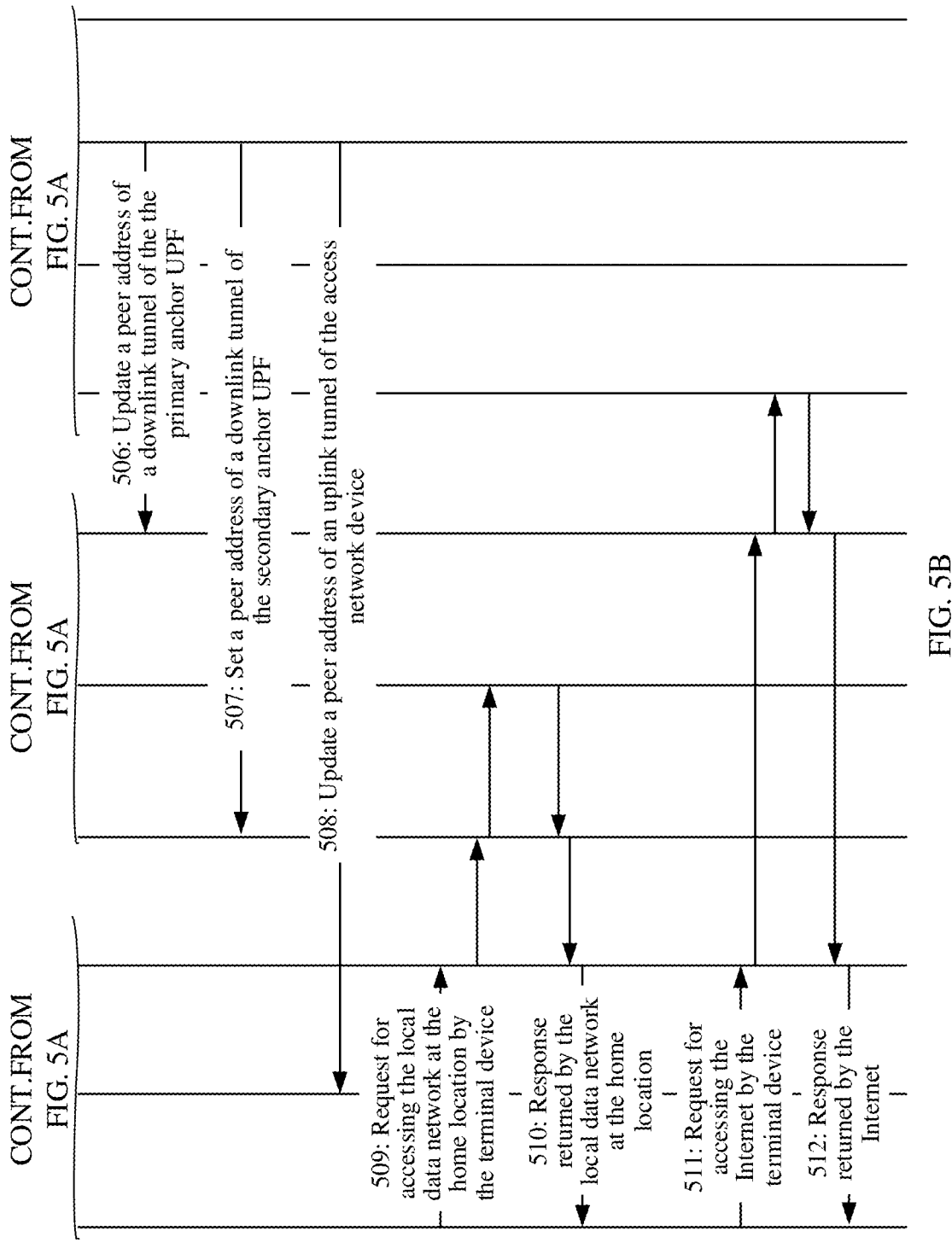

For example, as shown in FIG. 5A and FIG. 5B, when a terminal device is in a non-edge area at a home location, in step 501, an A-SMF and a primary anchor UPF at the home location may create a session of the terminal device, for example, a PDU session. Then, in step 502, the terminal device may access the Internet through the primary anchor UPF. In some embodiments, in an uplink direction, a request for accessing the Internet initiated by the terminal device in the non-edge area at the home location may be sent to the primary anchor UPF through an access network device, and then the primary anchor UPF sends the request to the Internet; and in a downlink direction, a response returned by the Internet to the foregoing request may be sent to the primary anchor UPF, and then the primary anchor UPF returns the response to the terminal device through the access network device.

When the terminal device moves from the non-edge area at the home location to the edge area, in step 503, a PCF may send a user policy of the terminal device to the A-SMF, where the user policy indicates that the service flow of the terminal device needs to return to the home location and be offloaded in a roaming scenario. In step 504, the A-SMF may select and insert a ULCL UPF and/or a secondary anchor UPF based on a DNN subscribed to by the terminal device, a DNAI, a location, or other information. The ULCL UPF is configured to offload the service flow of the terminal device to the primary anchor UPF and the secondary anchor UPF. The primary anchor UPF is connected to the Internet, and may be configured to send the received service flow to the Internet. The secondary anchor UPF is connected to a local data network at the home location, and may be configured to send the received service flow to the local data network at the home location. The ULCL UPF and the secondary anchor UPF may be integrally deployed. This is not limited in this application.

Further, in step 505, the A-SMF may deliver a first offloading rule to the ULCL UPF, where the first offloading rule indicates to send a service flow that matches the first offloading rule to the secondary anchor UPF. Optionally, the first offloading rule may further indicate to send a service flow that does not match the first offloading rule to the primary anchor UPF. For example, the first offloading rule may include a packet filter in a form such as an IP 5-tuple associated with the local data network at the home location. Optionally, the first offloading rule may further include an address of the primary anchor UPF and an address of the secondary anchor UPF.

In step 506, the A-SMF may send an address of the ULCL UPF to the primary anchor UPF, to update a bearer rule of the primary anchor UPF, so as to establish a tunnel between the primary anchor UPF and the ULCL UPF. In some embodiments, the address of the ULCL UPF is used to update a peer address of a downlink tunnel of the primary anchor UPF. That is, the peer address of the downlink tunnel of the primary anchor UPF is updated to the address of the ULCL UPF. For example, the A-SMF may send a first update request to the primary anchor UPF, where the first update request is used to update the bearer rule of the primary anchor UPF, and the first update request includes the address of the ULCL UPF. After receiving the first update request, the primary anchor UPF may update the peer address of the downlink tunnel to the address of the ULCL UPF, and then send a first update response to the A-SMF. The updating the bearer rule may also be understood as refreshing, modifying, or setting the bearer rule, refreshing, modifying, or setting the peer address of the tunnel, refreshing, modifying, or setting a destination address of the tunnel, or another meaning. Details are not described below.

In step 507, the A-SMF may send the address of the ULCL UPF to the secondary anchor UPF, to set a bearer rule of the secondary anchor UPF, so as to establish a tunnel between the secondary anchor UPF and the ULCL UPF. In some embodiments, the address of the ULCL UPF is used to set a peer address of a downlink tunnel of the secondary anchor UPF. That is, the peer address of the downlink tunnel of the secondary anchor UPF is set to the address of the ULCL UPF. For example, the A-SMF may send a second update request to the secondary anchor UPF, where the second update request is used to set the bearer rule of the secondary anchor UPF, and the second update request includes the address of the ULCL UPF. After receiving the second update request, the secondary anchor UPF may set the peer address of the downlink tunnel to the address of the ULCL UPF, and then send a second update response to the A-SMF.

In step 508, the A-SMF may send the address of the ULCL UPF to an access network device at the home location, to update a bearer rule of the access network device, so as to establish a tunnel between the access network device and the ULCL UPF. The access network device is located in the edge area at the home location. In some embodiments, the address of the ULCL UPF is used to update a peer address of an uplink tunnel of the access network device. That is, the peer address of the uplink tunnel of the access network device is updated to the address of the ULCL UPF. For example, the A-SMF may send a third update request to the access network device at the home location, where the third update request is used to update the bearer rule of the access network device, and the third update request includes the address of the ULCL UPF. After receiving the third update request, the access network device may update the peer address of the uplink tunnel to the address of the ULCL UPF, and then send a third update response to the A-SMF.

In this way, after the terminal device moves from the non-edge area at the home location to the edge area, under an offloading function of the ULCL UPF, the terminal device may access the Internet through the primary anchor UPF, and access the local data network at the home location through the secondary anchor UPF.

When the terminal device accesses the local data network at the home location, as shown in step 509 and step 510, in the uplink direction, a request for accessing the local data network at the home location that is initiated by the terminal device in the edge area at the home location may be sent to the ULCL UPF through the access network device; the ULCL UPF determines, based on the first offloading rule, that the request matches the first offloading rule and sends the request to the secondary anchor UPF; and then, the secondary anchor UPF may further send the request to the local data network at the home location. In the downlink direction, a response to the foregoing request that is returned by the local data network at the home location to the terminal device may be first sent to the secondary anchor UPF, sent by the secondary anchor UPF to the ULCL UPF, and then returned by the ULCL UPF to the terminal device through the access network device.

When the terminal device accesses the Internet, as shown in step 510 and step 511, in the uplink direction, a request for accessing the Internet that is initiated by the terminal device in the edge area at the home location may be sent to the ULCL UPF through the access network device; the ULCL UPF determines, based on the first offloading rule, that the request does not match the first offloading rule and then sends the request to the primary anchor UPF; and then, the primary anchor UPF may further send the request to the Internet. In the downlink direction, a response to the foregoing request that is returned by the Internet to the terminal device may be first sent to the primary anchor UPF, sent by the primary anchor UPF to the ULCL UPF, and then returned by the ULCL UPF to the terminal device through the access network device.

Step 402: When the terminal device moves to a visited location, the A-SMF sends an address of the ULCL UPF to an I-UPF at the visited location, to establish a tunnel between the I-UPF and the ULCL UPF.

Correspondingly, the I-UPF receives the address of the ULCL UPF from the A-SMF.

When the terminal device moves from the home location to the visited location, in a case that the location of the terminal device is still within the service area of the A-SMF, the case corresponds to the intra-province roaming scenario shown in FIG. 2. In this scenario, the A-SMF can insert the I-UPF at the visited location, and the I-UPF forwards user plane data between the visited location and the home location. Because the I-UPF is also managed by the A-SMF, the A-SMF may directly send the address of the ULCL UPF to the I-UPF to set the peer address of the uplink tunnel of the I-UPF, and the A-SMF may further send the address of the I-UPF to the ULCL UPF to update the peer address of the downlink tunnel of the ULCL UPF, so as to establish the tunnel between the I-UPF and the ULCL UPF.

Figure 6A:
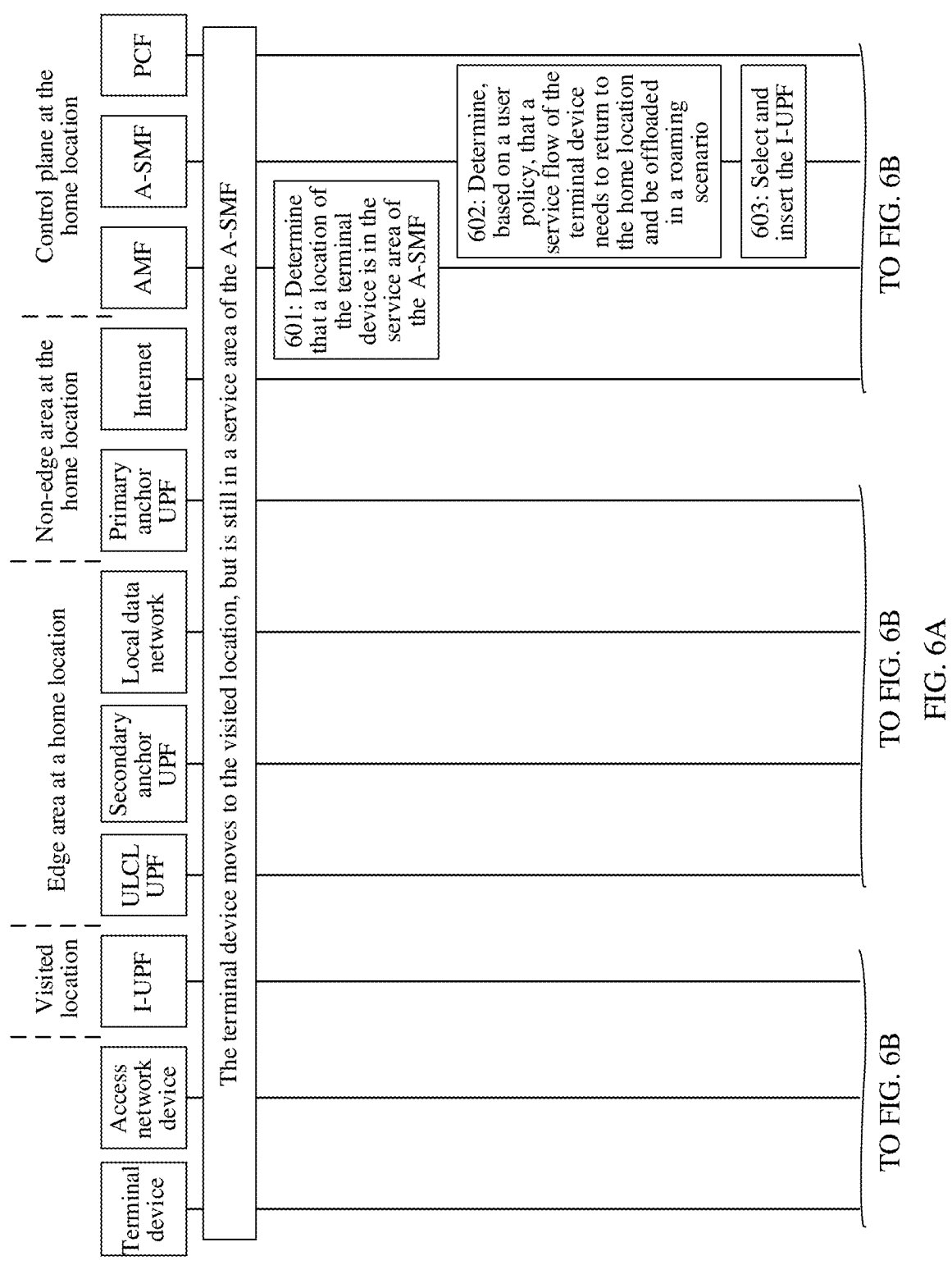
FIG. 6A and FIG. 6B show a related process corresponding to the network access method in Embodiment 1 of this application when a terminal device at a visited location in an intra-province roaming scenario.
Figure 6B:
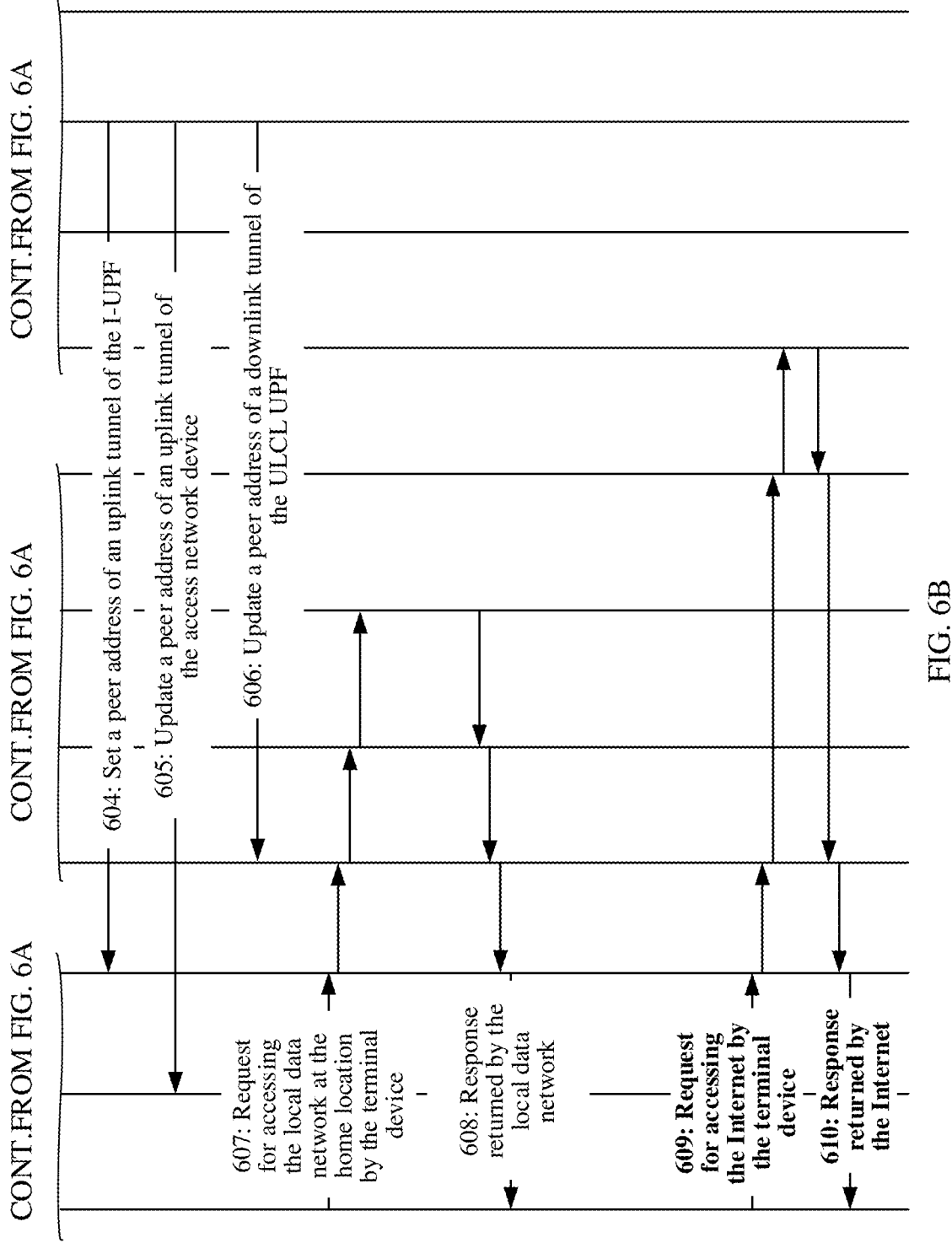

For example, as shown in FIG. 6A and FIG. 6B, in step 601, when a terminal device moves from a home location to a visited location, an AMF may determine that a location of the terminal device is in a service area of an A-SMF. In step 602, the A-SMF may determine, based on a user policy of the terminal device that is previously received from a PCF, that a service flow of the terminal device needs to return to the home location and be offloaded in a roaming scenario. That is, an N9 interface of an I-UPF at the visited location needs to dock with a ULCL UPF at the home location. In step 603, the A-SMF selects and inserts the I-UPF at the visited location based on a DNN subscribed to by the terminal device, a DNAI, a location, or other information.

In step 604, the A-SMF may send the address of the ULCL UPF to the I-UPF, to set a bearer rule of the I-UPF, so as to establish a tunnel between the I-UPF and the ULCL UPF. In some embodiments, the address of the ULCL UPF is used to set a peer address of an uplink tunnel of the I-UPF. That is, the peer address of the uplink tunnel of the I-UPF is set to the address of the ULCL UPF, so that the I-UPF can send an uplink service flow of the terminal device to the ULCL UPF. For example, the A-SMF may send a fourth update request to the I-UPF, where the fourth update request is used to set the bearer rule of the I-UPF, and the fourth update request includes the address of the ULCL UPF. After receiving the fourth update request, the I-UPF may set the peer address of the uplink tunnel to the address of the ULCL UPF, and then send a fourth update response to the A-SMF. Optionally, the A-SMF may send an address of an access network device at the visited location to the I-UPF, to set a bearer rule of the I-UPF, so as to establish a tunnel between the I-UPF and the access network device. In some embodiments, the address of the access network device is used to set a peer address of a downlink tunnel of the I-UPF. That is, the peer address of the downlink tunnel of the I-UPF is set to the address of the access network device, so that the I-UPF can send a downlink service flow of the terminal device to the access network device. For example, the fourth update request further includes the address of the access network device. After receiving the fourth update request, the I-UPF may set the peer address of the uplink tunnel to the address of the ULCL UPF, set the peer address of the downlink tunnel to the address of the access network device, and then send a fourth update response to the A-SMF.

In step 605, the A-SMF may send the address of the I-UPF to an access network device at the visited location, to update a bearer rule of the access network device, so as to establish a tunnel between the access network device and the I-UPF. In some embodiments, the address of the I-UPF is used to update a peer address of an uplink tunnel of the access network device at the visited location. That is, the peer address of the uplink tunnel of the access network device at the visited location is updated to the address of the I-UPF, so that the access network device at the visited location can send an uplink service flow of the terminal device to the I-UPF. For example, the A-SMF may send a fifth update request to the access network device at the visited location, where the fifth update request is used to update the bearer rule of the access network device, and the fifth update request includes the address of the I-UPF. After receiving the fifth update request, the access network device at the visited location may update the peer address of the uplink tunnel to the address of the I-UPF, and then send a fifth update response to the A-SMF.

In step 606, the A-SMF may send the address of the I-UPF to the ULCL UPF, to update a bearer rule of the ULCL UPF, so as to establish a tunnel between the ULCL UPF and the I-UPF. In some embodiments, the address of the I-UPF is used to update a peer address of a downlink tunnel of the ULCL UPF. That is, the peer address of the downlink tunnel of the ULCL UPF is updated to the address of the I-UPF, so that the ULCL UPF can send a downlink service flow of the terminal device to the I-UPF. For example, the A-SMF may send a sixth update request to the ULCL UPF, where the sixth update request is used to update the bearer rule of the ULCL UPF, and the sixth update request includes the address of the I-UPF. After receiving the sixth update request, the ULCL UPF may update the peer address of the downlink tunnel to the address of the I-UPF, and then send a sixth update response to the A-SMF.

In this way, when the terminal device moves to the visited location, a tunnel for bidirectional data exchange between the I-UPF and the ULCL UPF may be established in the foregoing manner, so as to satisfy a service requirement that a service flow of the terminal device returns to the home location and is offloaded in a roaming scenario, and improve security of the local data network at the home location. Then, under the action of data forwarding of the I-UPF and offloading of the ULCL UPF, the terminal device may access the Internet through the primary anchor UPF, and access the local data network at the home location through the secondary anchor UPF.

When the terminal device accesses the local data network at the home location, as shown in step 607 and step 608, in the uplink direction, a request for accessing the local data network at the home location that is initiated by the terminal device at the visited location may be sent to the I-UPF through the access network device and then forwarded by the I-UPF to the ULCL UPF; the ULCL UPF may determine, based on the first offloading rule, that the request matches the first offloading rule and then send the request to the secondary anchor UPF; and then, the secondary anchor UPF may further send the request to the local data network at the home location. In the downlink direction, a response to the foregoing request that is returned by the local data network at the home location to the terminal device may be first sent to the secondary anchor UPF, sent by the secondary anchor UPF to the ULCL UPF, then forwarded by the ULCL UPF to the I-UPF, and finally returned to the terminal device through the access network device.

When the terminal device accesses the Internet, as shown in step 609 and step 610, in the uplink direction, a request for accessing the Internet that is initiated by the terminal device at the visited location may be sent to the I-UPF through the access network device and then forwarded by the I-UPF to the ULCL UPF; the ULCL UPF may determine, based on the first offloading rule, that the request does not match the first offloading rule and then send the request to the primary anchor UPF; and then, the primary anchor UPF may further send the request to the Internet. In the downlink direction, a response to the foregoing request that is returned by the Internet to the terminal device may be first sent to the primary anchor UPF, sent by the primary anchor UPF to the ULCL UPF, then forwarded by the ULCL UPF to the I-UPF, and finally returned to the terminal device through the access network device.

When the terminal device moves from the home location to the visited location, in a case that the location of the terminal device has left the service area of the A-SMF, the case corresponds to the inter-province roaming scenario shown in FIG. 3. In this scenario, the AMF can insert the I-SMF at the visited location, and the I-SMF forwards user plane data between the visited location and the home location. Then, the I-SMF can insert the I-UPF at the visited location, and the I-UPF forwards user plane data between the visited location and the home location. Because the I-UPF is managed by the I-SMF, the A-SMF may send the address of the ULCL UPF to the I-UPF through the I-SMF, so as to update the peer address of the uplink tunnel of the I-UPF. In addition, the A-SMF may further receive the address of the I-UPF from the I-SMF, so as to update the peer address of the downlink tunnel of the ULCL UPF.

Figure 7A:
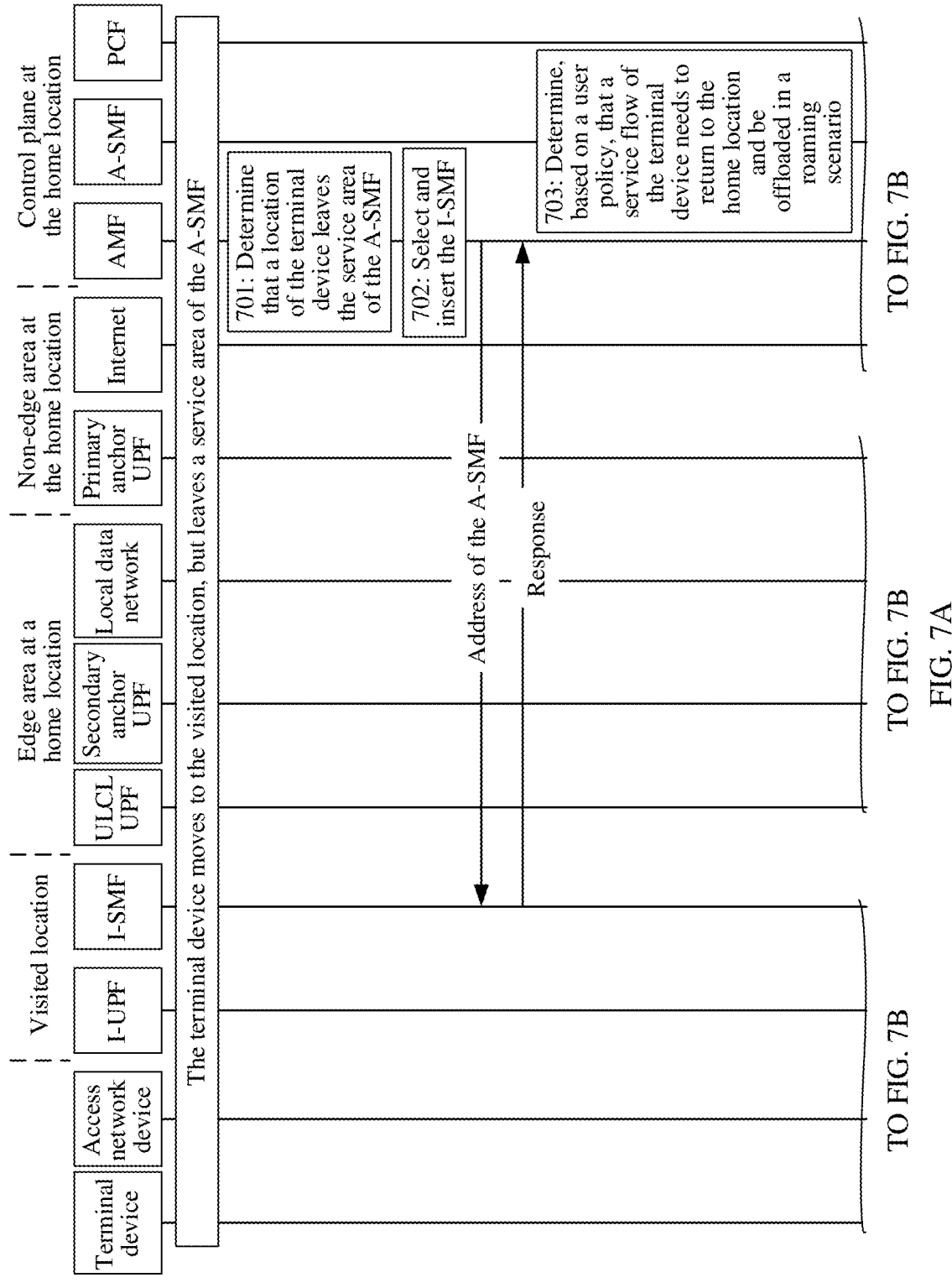
FIG. 7A, FIG. 7B, and FIG. 7C show a related process corresponding to the network access method in Embodiment 1 of this application when a terminal device at a visited location in an inter-province roaming scenario.
Figure 7B:
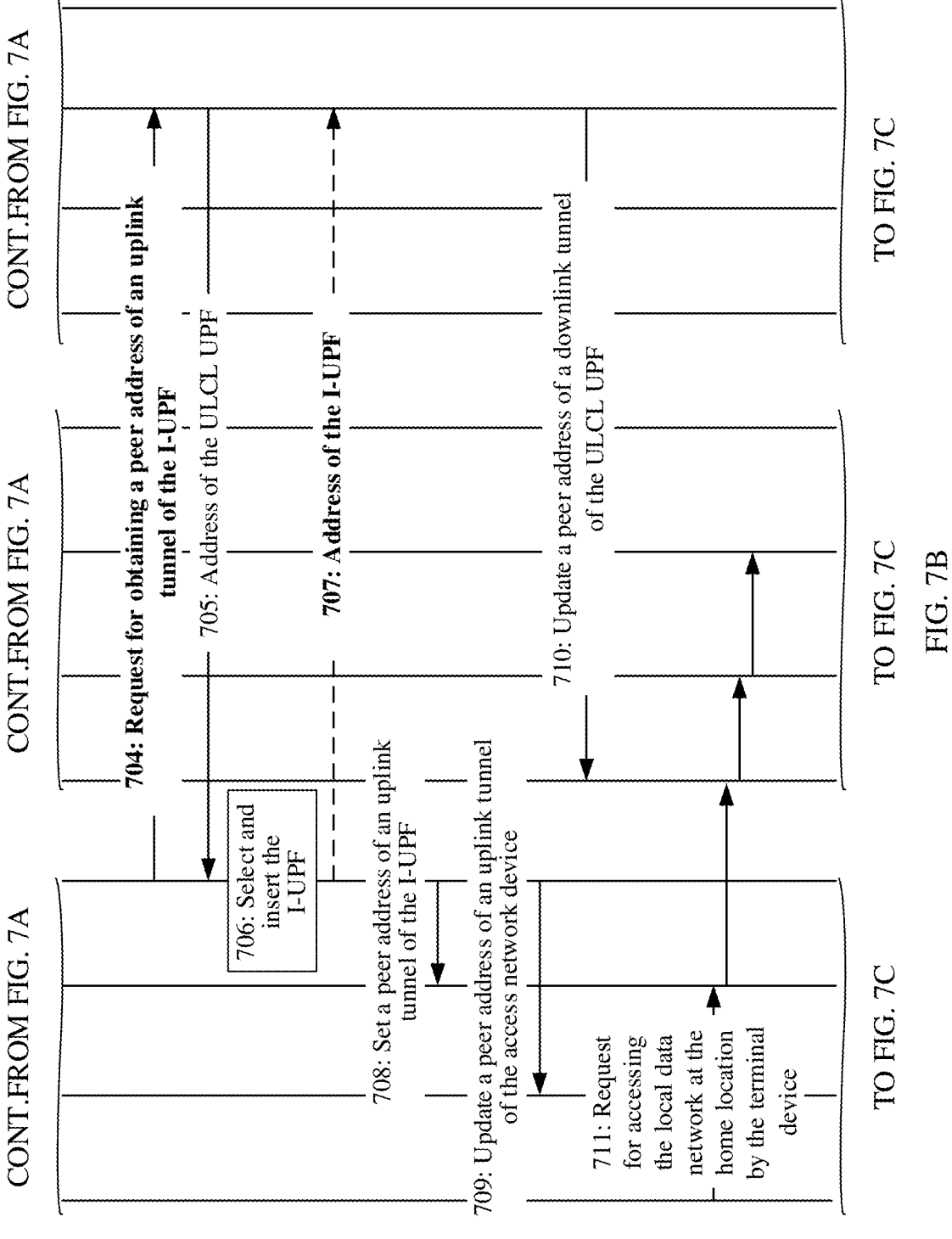
Figure 7C:
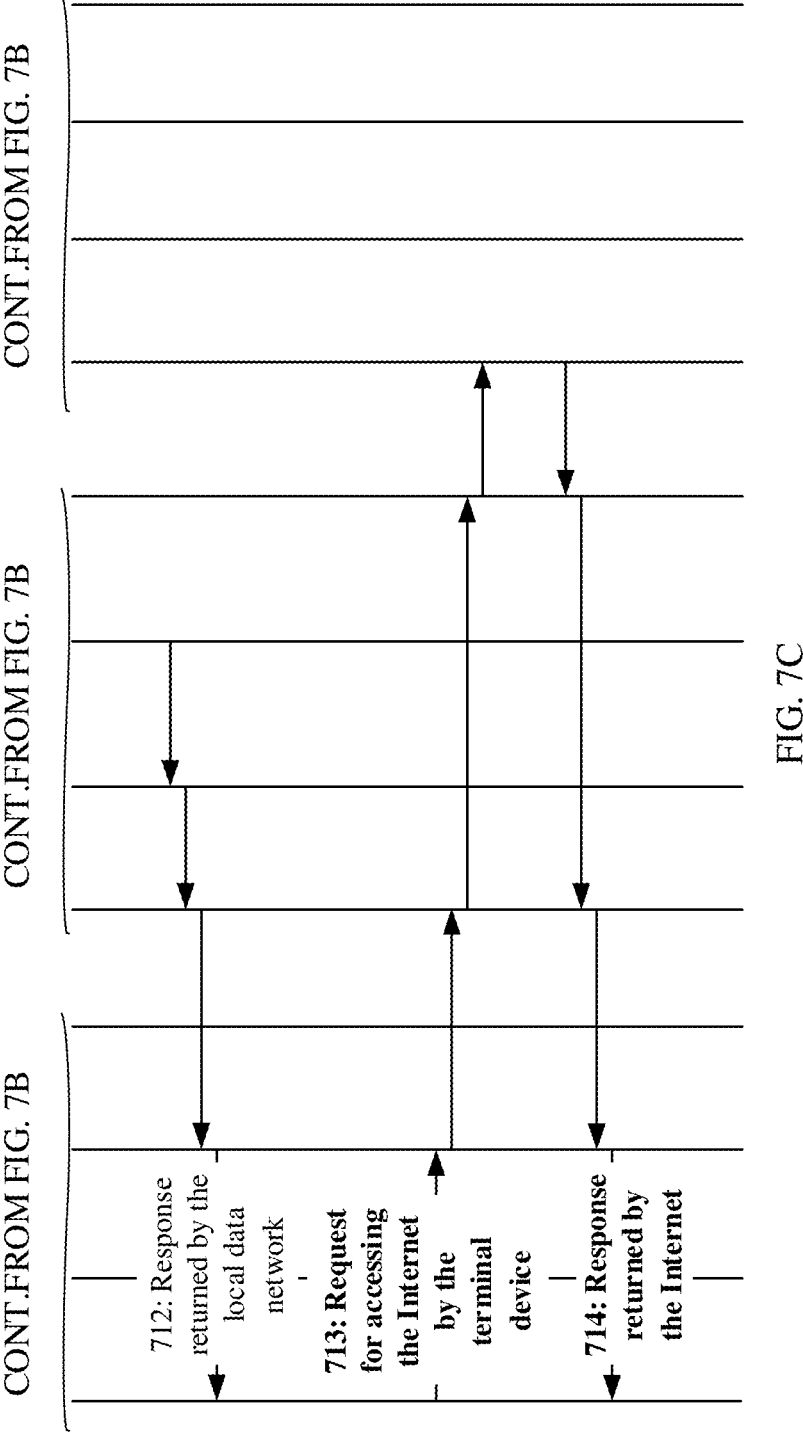
Figures 1, 8A:
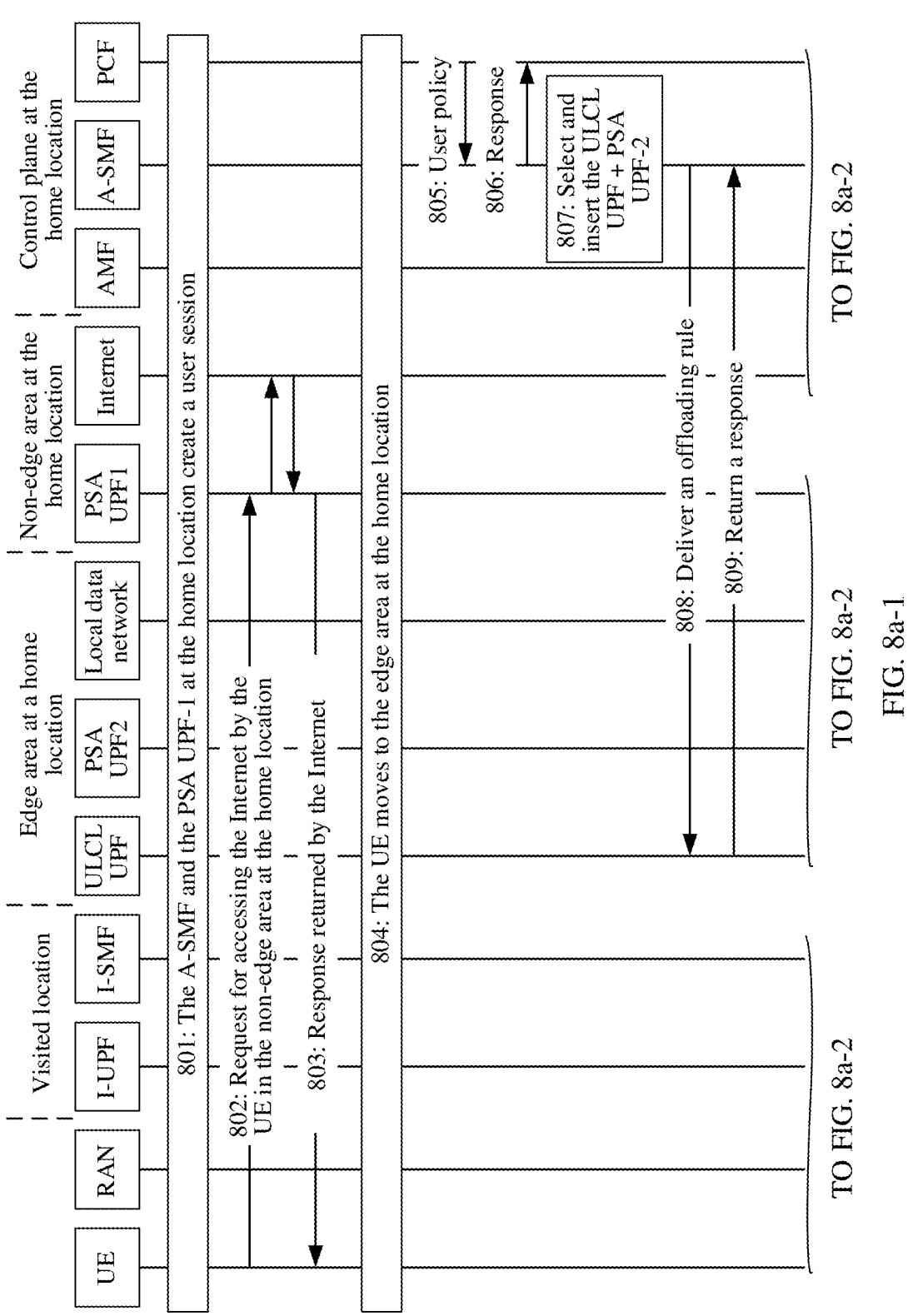
Figures 2, 8A:
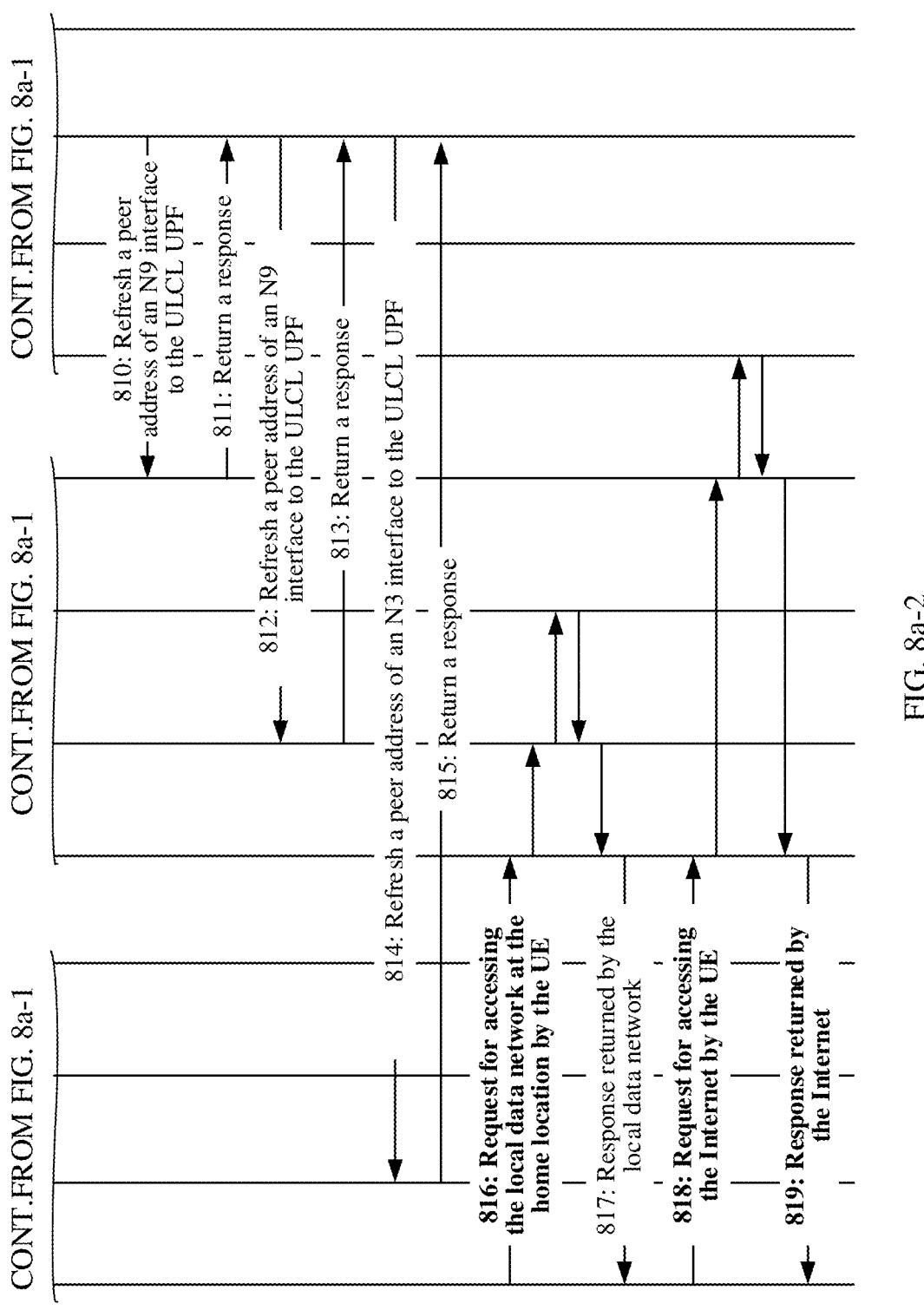
Figures 1, 8B:
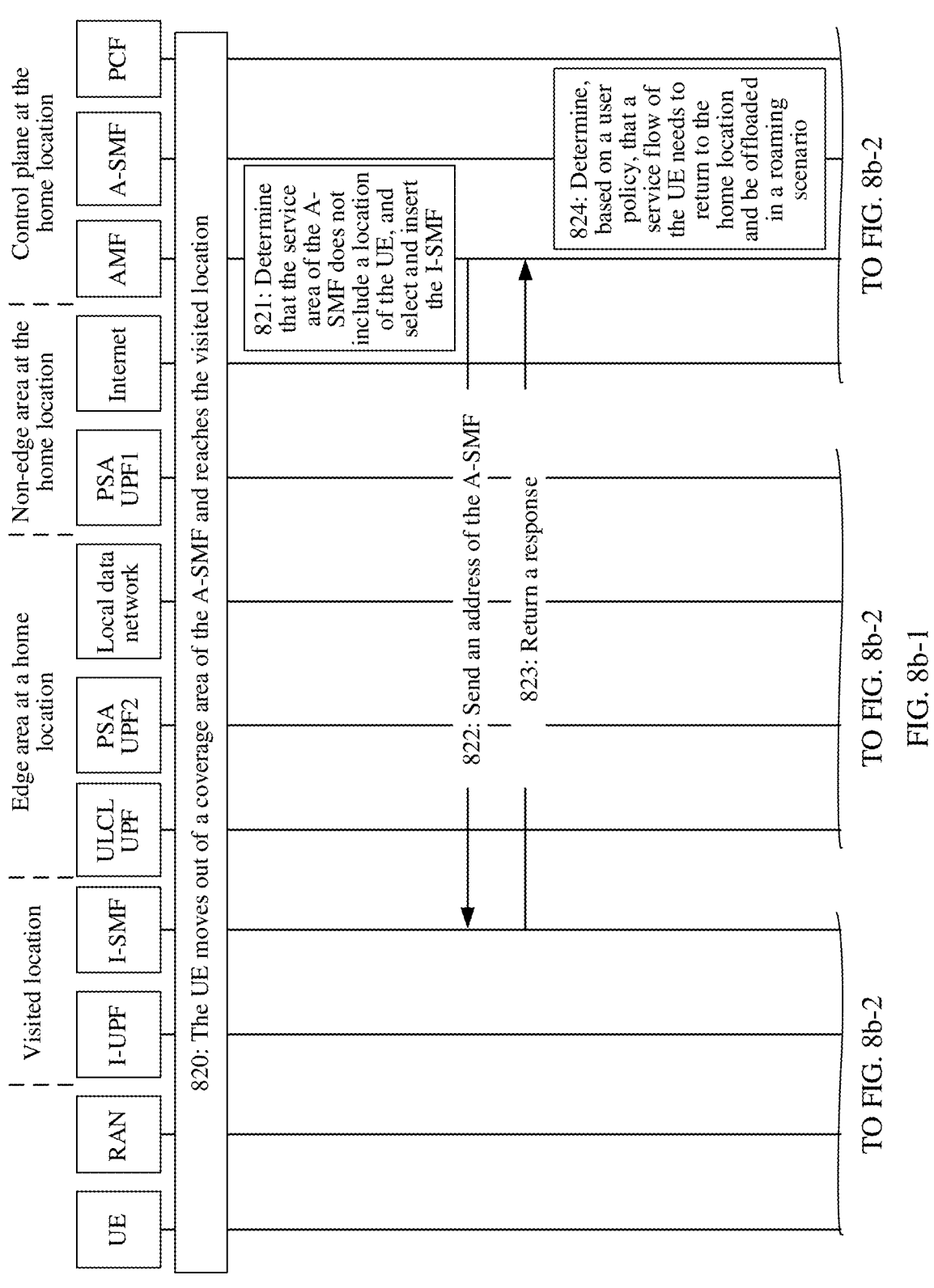
Figures 2, 8B:
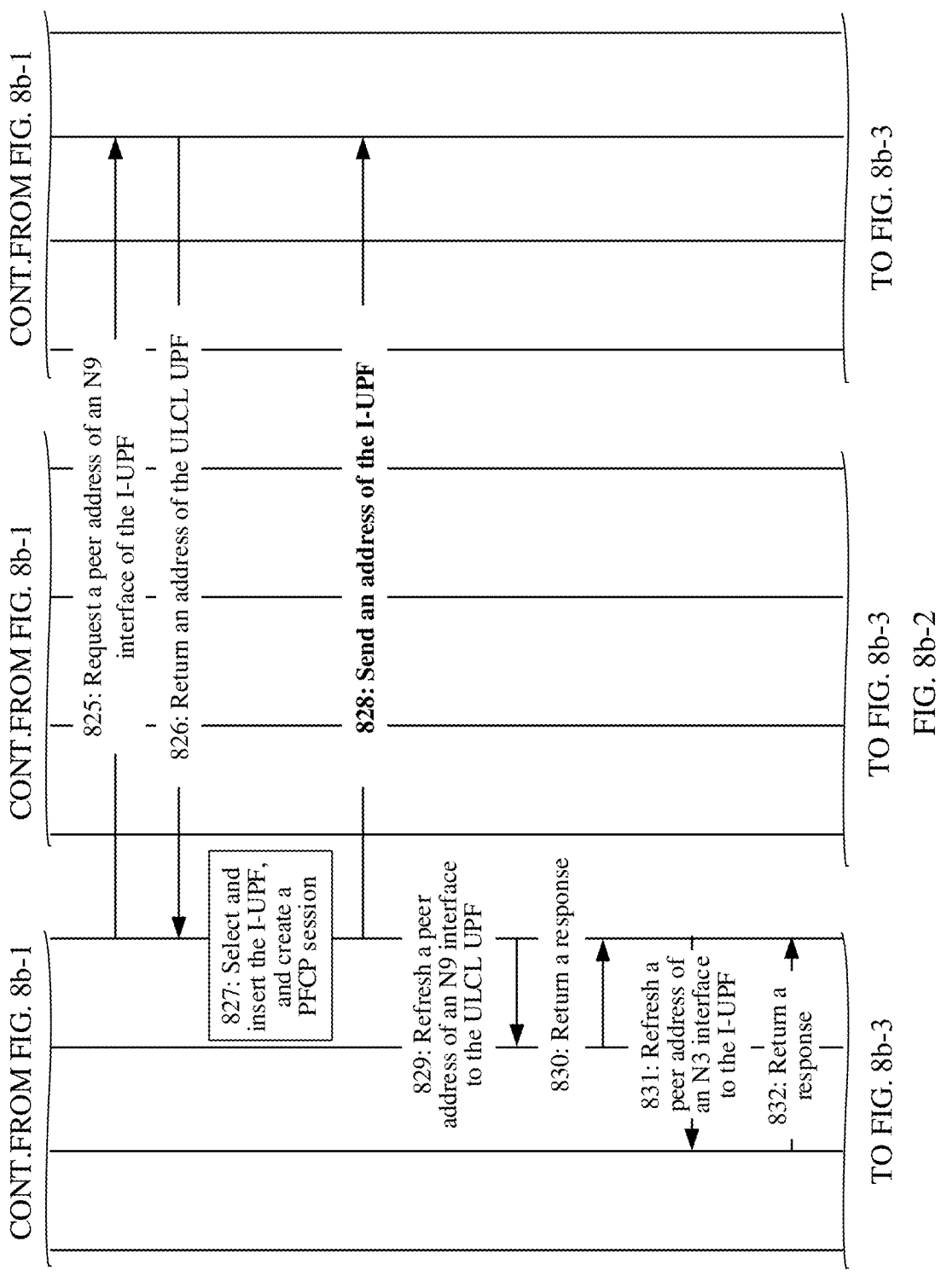
Figures 3, 8B:
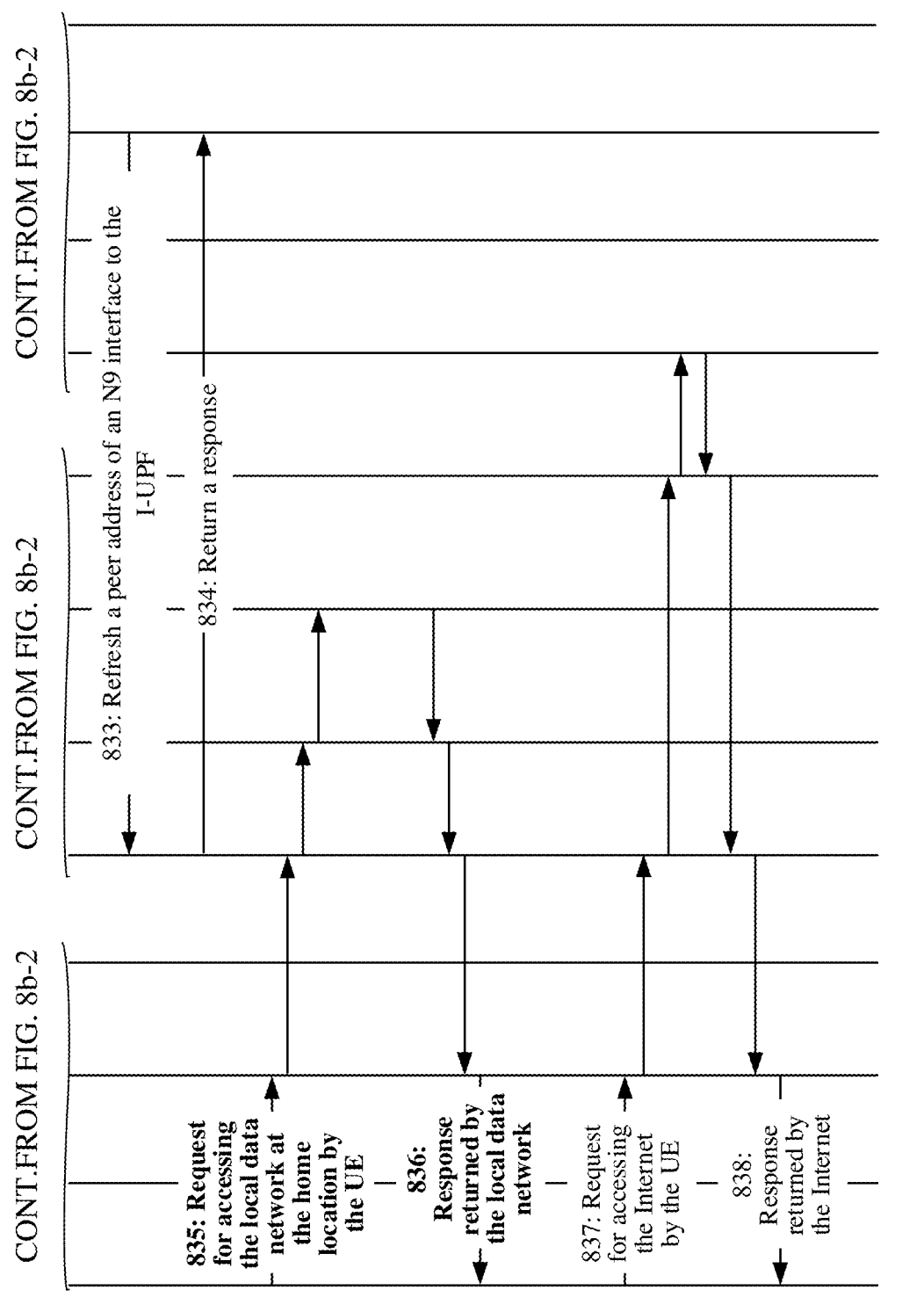

For example, as shown in FIG. 7A, FIG. 7B, and FIG. 7C, in step 701, when a terminal device moves from a home location to a visited location, an AMF may determine that a location of the terminal device leaves a service area of an A-SMF. In step 702, the AMF may select and insert the I-SMF at the visited location based on a DNN subscribed to by the terminal device, a DNAI, a location, or other information. Further, the AMF may further send an address of the A-SMF to the I-SMF and receive a response from the I-SMF, so that the I-SMF and the A-SMF exchange information. In step 703, the A-SMF may determine, based on a user policy of the terminal device that is previously received from a PCF, that a data flow of the terminal device needs to return to the home location and be offloaded in a roaming scenario. That is, an N9 interface of an I-UPF at the visited location needs to dock with a ULCL UPF at the home location. In step 704, the I-SMF may send a request for obtaining a peer address of an uplink tunnel of the I-UPF to the A-SMF. In step 705, in response to the request of the I-SMF, the A-SMF may send an address of the ULCL UPF to the I-SMF, so that the I-SMF sends the address of the ULCL UPF to the I-UPF. In step 706, the I-SMF may select and insert the I-UPF at the visited location based on a DNN subscribed to by the terminal device, a DNAI, a location, or other information. In step 707, the I-SMF may send an address of the I-UPF to the A-SMF. Step 707 is optional. For example, if step 706 is performed before step 704, the I-SMF may alternatively carry the address of the I-UPF in the request for obtaining the peer address of the uplink tunnel of the I-UPF.

In step 708, the I-SMF may send the address of the ULCL UPF to the I-UPF, to set a bearer rule of the I-UPF, so as to establish a tunnel between the I-UPF and the ULCL UPF. In some embodiments, the address of the ULCL UPF is used to set a peer address of an uplink tunnel of the I-UPF. That is, the peer address of the uplink tunnel of the I-UPF is set to the address of the ULCL UPF, so that the I-UPF can send an uplink service flow of the terminal device to the ULCL UPF. For example, the A-SMF may send a seventh update request to the I-UPF, where the seventh update request is used to set the bearer rule of the I-UPF, and the seventh update request includes the address of the ULCL UPF. After receiving the seventh update request, the I-UPF may set the peer address of the uplink tunnel to the address of the ULCL UPF, and then send a seventh update response to the I-SMF. Optionally, the I-SMF may send an address of an access network device at the visited location to the I-UPF, to set a bearer rule of the I-UPF, so as to establish a tunnel between the I-UPF and the access network device. In some embodiments, the address of the access network device is used to set a peer address of a downlink tunnel of the I-UPF. That is, the peer address of the downlink tunnel of the I-UPF is set to the address of the access network device, so that the I-UPF can send a downlink service flow of the terminal device to the access network device. For example, the seventh update request further includes the address of the access network device. After receiving the seventh update request, the I-UPF may set the peer address of the uplink tunnel to the address of the ULCL UPF, set the peer address of the downlink tunnel to the address of the access network device, and then send a seventh update response to the I-SMF.

In step 709, the I-SMF may send the address of the I-UPF to an access network device at the visited location, to update a bearer rule of the access network device, so as to establish a tunnel between the access network device and the I-UPF. In some embodiments, the address of the I-UPF is used to update a peer address of an uplink tunnel of the access network device at the visited location. That is, the peer address of the uplink tunnel of the access network device at the visited location is updated to the address of the I-UPF, so that the access network device at the visited location can send an uplink service flow of the terminal device to the I-UPF. For example, the A-SMF may send an eighth update request to the access network device at the visited location, where the eighth update request is used to update the bearer rule of the access network device, and the eighth update request includes the address of the I-UPF. After receiving the eighth update request, the access network device at the visited location may update the peer address of the uplink tunnel to the address of the I-UPF, and then send an eighth update response to the A-SMF.

In step 710, the A-SMF may send the address of the I-UPF to the ULCL UPF, to update a bearer rule of the ULCL UPF, so as to establish a tunnel between the ULCL UPF and the I-UPF. In some embodiments, the address of the I-UPF is used to update a peer address of a downlink tunnel of the ULCL UPF. That is, the peer address of the downlink tunnel of the ULCL UPF is updated to the address of the I-UPF, so that the ULCL UPF can send a downlink service flow of the terminal device to the I-UPF. For example, the A-SMF may send a ninth update request to the ULCL UPF, where the ninth update request is used to update the bearer rule of the ULCL UPF, and the ninth update request includes the address of the I-UPF. After receiving the ninth update request, the ULCL UPF may update the peer address of the downlink tunnel to the address of the I-UPF, and then send a ninth update response to the A-SMF.

In this way, when the terminal device moves to the visited location, a tunnel for bidirectional data exchange between the I-UPF and the ULCL UPF may be established in the foregoing manner, so that the N9 interface of the I-UPF docks with the ULCL UPF at the home location, so as to satisfy a service requirement that a data flow of the terminal device returns to the home location and is offloaded in a roaming scenario, and improve security of the local data network at the home location. Then, under the action of data forwarding of the I-UPF and offloading of the ULCL UPF, the terminal device may access the Internet through the primary anchor UPF, and access the local data network at the home location through the secondary anchor UPF.

When the terminal device accesses the local data network at the home location, as shown in step 711 and step 712, in the uplink direction, a request for accessing the local data network at the home location that is initiated by the terminal device at the visited location may be sent to the I-UPF through the access network device and then forwarded by the I-UPF to the ULCL UPF; the ULCL UPF may determine, based on the first offloading rule, that the request matches the first offloading rule and then send the request to the secondary anchor UPF; and then, the secondary anchor UPF may further send the request to the local data network at the home location. In the downlink direction, a response to the foregoing request that is returned by the local data network at the home location to the terminal device may be first sent to the secondary anchor UPF, sent by the secondary anchor UPF to the ULCL UPF, then forwarded by the ULCL UPF to the I-UPF, and finally returned to the terminal device through the access network device.

When the terminal device accesses the Internet, as shown in step 713 and step 714, in the uplink direction, a request for accessing the Internet that is initiated by the terminal device at the visited location may be sent to the I-UPF through the access network device and then forwarded by the I-UPF to the ULCL UPF; the ULCL UPF may determine, based on the first offloading rule, that the request does not match the first offloading rule and then send the request to the primary anchor UPF; and then, the primary anchor UPF may further send the request to the Internet. In the downlink direction, a response to the foregoing request that is returned by the Internet to the terminal device may be first sent to the primary anchor UPF, sent by the primary anchor UPF to the ULCL UPF, then forwarded by the ULCL UPF to the I-UPF, and finally returned to the terminal device through the access network device.

The following describes in detail a service process related to Embodiment 1 of this application by using an inter-province roaming scenario as an example. As shown in FIG. 8*a*-1, FIG. 8*a*-2, FIG. 8*b*-1, FIG. 8*b*-2, and FIG. 8*b*-3, the service process includes the following steps.

Step 801: An A-SMF and a PSA UPF1 at a home location create a session, where the PSA UPF1 is a primary anchor UPF at the home location connected to a UE, and the PSA UPF1 may be a shared UPF that is in a non-edge area at the home location and that is selected based on a subscribed DNN of the UE.

Step 802: The UE accesses the Internet in the non-edge area at the home location through the PSA UPF1. A request for accessing the Internet initiated by the UE in the non-edge area at the home location is first sent to the PSA UPF1 through a RAN, and then forwarded by the PSA UPF1 to the Internet.

Step 803: First send a response returned by the Internet to the UE to the PSA UPF1, and then the PSA UPF1 forwards the response to the UE through the RAN.

Step 804: The UE moves to an edge area at the home location.

Step 805: After the UE moves to the edge area at the home location, trigger a PCF to deliver a user policy of the UE to the A-SMF. For example, the PCF may deliver the user policy to the A-SMF through a session management policy update request message.

Step 806: After receiving the user policy of the UE, the A-SMF replies to the PCF with a response. For example, the A-SMF may reply to the A-SMF with a response through a session management policy update response message.

Step 807: The A-SMF selects ULCL UPF+PSA UPF2 based on the user policy, and inserts the ULCL UPF+PSA UPF2 into the user session. The PSA UPF2 is a secondary anchor UPF connected to a terminal device, and the ULCL UPF and the PSA UPF2 may be local UPFs in the edge region at the home location that are selected based on a DNN subscribed to by the UE, a DNAI, a location (for example, a tracking area code (TAC)), or other information, and may be integrally deployed.

Step 808: The A-SMF delivers an offloading rule to the ULCL UPF. For example, the A-SMF may deliver the offloading rule to the ULCL UPF through a PDU session establishment request message.

Step 809: The ULCL UPF returns a response to the A-SMF. For example, the ULCL UPF may return the response to the A-SMF through a PDU session establishment response message.

Step 810: The A-SMF refreshes a bearer rule of the PSA UPF1, and refreshes a peer address of an N9 interface (namely, a peer end of the N9 interface) of the PSA UPF1 to the ULCL UPF.

Step 811: The PSA UPF1 returns a response to the A-SMF.

Step 812: The A-SMF refreshes a bearer rule of the PSA UPF2, and refreshes a peer address of an N9 interface (namely, a peer end of the N9 interface) of the PSA UPF2 to the ULCL UPF.

Step 813: The PSA UPF2 returns a response to the A-SMF.

Step 814: The A-SMF refreshes a bearer rule of the RAN, and refreshes a peer address of an N3 interface (namely, a peer end of the N3 interface) of the RAN to the ULCL UPF.

Step 815: The RAN replies to the A-SMF with a response.

For the foregoing steps 810 to 815, refer to content about adding a PDU session anchor, an offloading point, or a ULCL in 3GPP 23502.

Step 816: After the A-SMF at the home location selects the ULCL UPF+PSA UPF2 and inserts the ULCL UPF+PSA UPF2 into the user session, the UE may access a local data network at the home location through the ULCL UPF+PSA UPF2 in the edge area at the home location. A request for accessing the local data network at the home location initiated by the UE in the edge area at the home location is first sent to the ULCL UPF through the RAN, then forwarded by the ULCL UPF to the PSA UPF2, and then forwarded by the PSA UPF2 to the local data network at the home location.

Step 817: Return, based on the foregoing original path, a response returned by the local data network at the home location.

Step 818: The UE accesses the Internet in the edge area at the home location by performing forwarding to the PSA UPF1 through the N9 interface of the ULCL UPF. A request for accessing the Internet initiated by the UE in the edge area at the home location is first sent to the ULCL UPF through the RAN, then forwarded by the ULCL UPF to the PSA UPF1, and then forwarded by the PSA UPF1 to the Internet.

Step 819: Return, based on the foregoing original path, a response returned by the Internet.

Step 820: The UE moves out of a service area of the A-SMF and reaches a visited location.

Step 821: The AMF determines that the service area of the A-SMF at the home location does not include a location of the UE, and therefore selects and inserts an I-SMF, where the I-SMF is at the visited location.

Step 822: The AMF sends an address of the A-SMF to the I-SMF. For example, the AMF may send the address of the A-SMF to the I-SMF through a PDU session context creation request message.

Step 823: The I-SMF returns a response to the AMF. For example, the I-SMF may return the response to the AMF through a PDU session context creation response message.

Step 824: The A-SMF determines, based on the user policy of the UE, that a service flow of the UE needs to return to the home location and needs to be offloaded in a roaming scenario, that is, determines that an N9 interface of an I-UPF at the visited location docks with the ULCL UPF at the home location.

Optionally, the SMF at the home location may predefine, through a specific policy and charging control rule (PCC) delivered by the PCF, a rule corresponding to a configuration on the SMF, to identify that a service flow of the user needs to return to the home location and needs to be offloaded in a roaming scenario. The offloading rule may be determined based on an IP 5-tuple.

Step 825: The I-SMF requests to obtain a peer address of the N9 interface of the I-UPF from the A-SMF. For example, the I-SMF may request to obtain the peer address of the N9 interface of the I-UPF through a PDU session creation request message.

Step 826: The A-SMF may return an address of the ULCL UPF to the I-SMF. For example, the A-SMF may return the address of the ULCL UPF to the I-SMF through a PDU session establishment response message.

Step 827: The I-SMF selects and inserts the I-UPF, and creates a packet forwarding control protocol (PFCP) session.

Step 828: The I-SMF returns an address of the I-UPF to the A-SMF.

Step 829: The I-SMF updates a bearer rule of the I-UPF, and refreshes the peer address of the N9 interface of the I-UPF to the address of the ULCL UPF.

Step 830: The I-UPF returns a response to the I-SMF.

Step 831: The I-SMF updates the bearer rule of the RAN, and refreshes the peer address of the N3 interface of the RAN to the I-UPF.

Step 832: The RAN returns a response to the I-SMF.

Step 833: The A-SMF updates a bearer rule of the ULCL UPF, and refreshes a peer address of the N9 interface of the ULCL UPF to the I-UPF. For this step, refer to content about changing a PDU session anchor or ULCL in 3GPP 23502.

Step 834: The ULCL UPF returns a response to the A-SMF.

Step 835: The UE docks with the ULCL+PSA UPF2 at the home location through the N9 interface of the I-UPF at the visited location, and accesses the local data network at the home location.

Step 836: Return, based on the foregoing original path, a response returned by the local data network at the home location.

Step 837: The UE docks with the ULCL UPF at the home location through the N9 interface of the I-UPF at the visited location, then connects to the PSA UPF1 through the N9 interface of the ULCL UPF, and accesses the Internet.

Step 838: Return, based on the foregoing original path, a response returned by the Internet.

A service process in an intra-province roaming scenario is similar to the service process in the inter-province roaming scenario shown in FIG. 8*b*-1, FIG. 8*b*-2, and FIG. 8*b*-3, and a main difference lies in that only one SMF (namely, A-SMF) is involved in the intra-province roaming scenario. Therefore, the SMF may have functions of both the A-SMF at the home location and the I-SMF at the visited location in the service process in the inter-province roaming scenario, and the AMF does not need to insert the I-SMF at the visited location based on user subscription and a current location.

It can be learned that, in the solution of Embodiment 1, if all service traffic of the terminal device needs to return to the home location and be offloaded at the home location, the SMF at the home location may select and insert the ULCL UPF and the secondary anchor UPF at the home location based on the DNN subscribed to by the terminal device and the location; the SMF at the visited location may select and insert the I-UPF at the visited location based on the DNN subscribed to by the terminal device and location; and this application supports a case that a forwarding object of the N9 interface of the I-UPF is set to the ULCL UPF. In this way, in the foregoing solution, provided that a user uses one DNN in a roaming scenario, all service traffic (including a service flow accessing the Internet) can return to a home location and be offloaded at the home location, thereby improving security of a campus network, and making it convenient for a high-security enterprise to perform traffic monitoring on the user. The foregoing technical solution can satisfy a security requirement of an education network.

Embodiment 2

An existing 3GPP architecture cannot support a requirement that, in a roaming scenario, a terminal device uses one DNN, some traffic returns to a home location and is offloaded, and other traffic is offloaded at a visited location. Therefore, this application provides another network access method. Through a user-defined ULCL UPF offloading rule, a data flow of a terminal device is offloaded at a visited location in a roaming scenario, a data flow that accesses a local data network at a home location returns to the home location, and other data flows (for example, a data flow accessing the Internet) are directly offloaded at the visited location.

Figure 9:
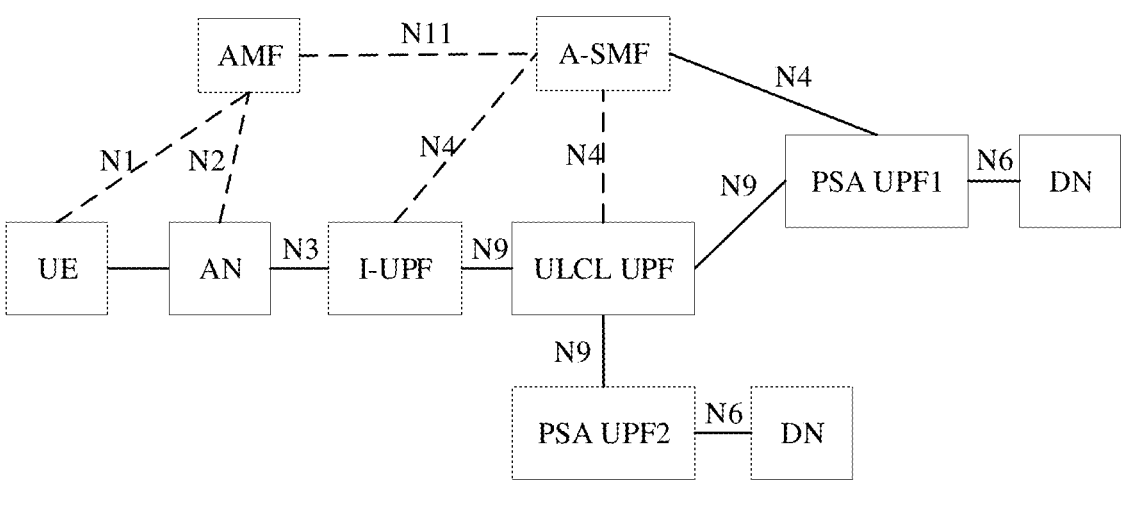
FIG. 9 is a schematic diagram of an intra-province roaming scenario according to Embodiment 2 of this application.
Figure 10:
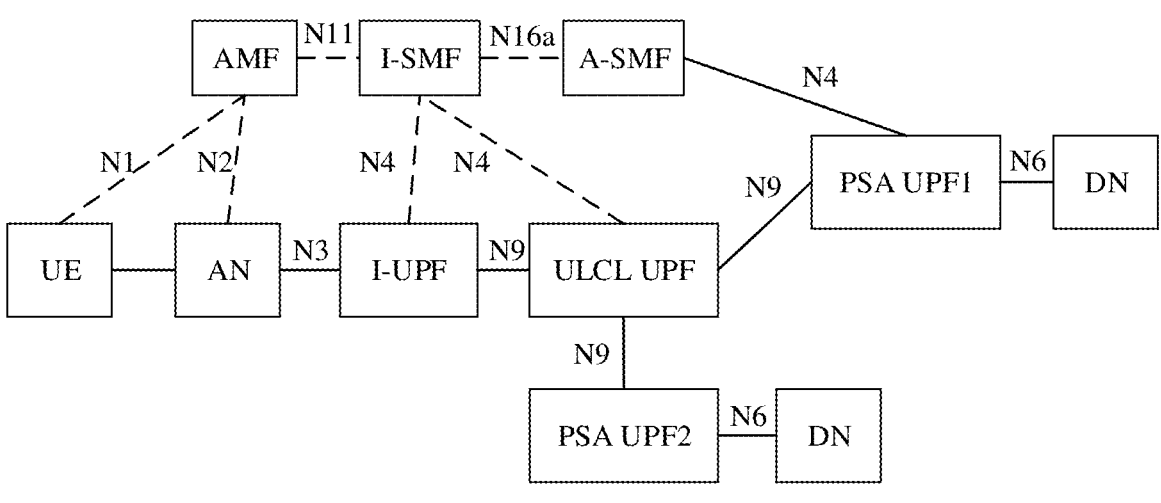
FIG. 10 is a schematic diagram of an inter-province roaming scenario according to Embodiment 2 of this application.

Embodiment 2 of this application may have two possible roaming scenarios shown in FIG. 9 and FIG. 10. For ease of understanding, the two roaming scenarios may be referred to as an intra-province roaming scenario and an inter-province roaming scenario respectively.

FIG. 9 corresponds to a scenario in which a plurality of UPFs are within a management range of a same SMF (for example, the intra-province roaming scenario), indicating that both an I-UPF at a visited location and a PSA UPF1 at a home location are managed by an A-SMF. The PSA UPF1 at the home location is a primary anchor UPF of the terminal device. This scenario is similar to the scenario shown in FIG. 2, and details are not described again.

FIG. 10 corresponds to a scenario in which a plurality of UPFs are not within a management range of a same SMF (for example, the inter-province roaming scenario), indicating that both an I-UPF at a visited location and a ULCL UPF at the visited location are managed by an I-SMF at the visited location and a PSA UPF1 at a home location is managed by an A-SMF at the home location. The PSA UPF1 at the home location is a primary anchor UPF of the terminal device. A main difference between this scenario and the scenario shown in FIG. 3 lies in that the ULCL UPF is at the visited location.

Figure 11:
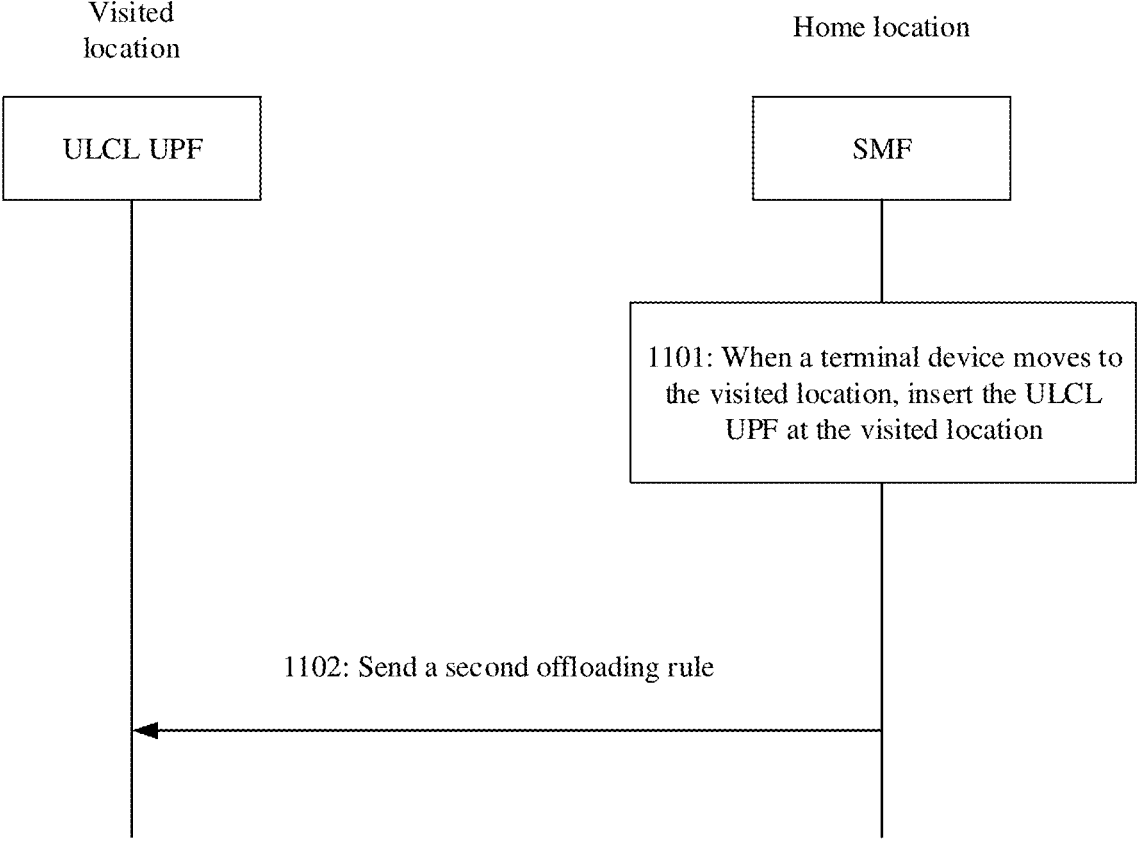
FIG. 11 is a schematic flowchart of a network access method according to Embodiment 2 of this application.

FIG. 11 is a schematic flowchart of another network access method according to Embodiment 2 of this application. The method includes:

Step 1101: When a terminal device moves to a visited location, an SMF at the visited location inserts a ULCL UPF at the visited location, where the ULCL UPF is configured to offload a service flow of the terminal device.

In this embodiment of this application, the ULCL UPF is configured to offload the service flow of the terminal device to a primary anchor UPF and a secondary anchor UPF. The primary anchor UPF is at a home location, and the primary anchor UPF may be configured to send the service flow of the terminal device to a local data network at the home location. The secondary anchor UPF is at the visited location, and the secondary anchor UPF may be configured to send the service flow of the terminal device to the Internet.

In a possible implementation, when the terminal device moves from the home location to the visited location, the SMF at the visited location may insert the ULCL UPF and/or the secondary anchor UPF at the visited location. For example, the SMF at the visited location may insert the ULCL UPF and/or the secondary anchor UPF based on a DNN subscribed to by the terminal device, the SMF at the visited location may insert the ULCL UPF and/or the secondary anchor UPF based on a DNN subscribed to by the terminal device and a location, or the SMF at the visited location may insert the ULCL UPF and/or the secondary anchor UPF based on a DNN subscribed to by the terminal device, a location, a data network access identifier (DNAI), or other information.

Step 1102: The SMF at the visited location sends a second offloading rule to the ULCL UPF, where the second offloading rule indicates to send a service flow that matches the second offloading rule to the primary anchor UPF.

Correspondingly, the ULCL UPF receives the second offloading rule from the SMF at the visited location.

Optionally, the second offloading rule indicates to send a service flow that does not match the second offloading rule to the secondary anchor UPF.

In this embodiment of this application, the SMF at the visited location determines, based on a user policy of the terminal device, that in the roaming scenario, the data flow of the terminal device needs to be offloaded at the visited location, the data flow that accesses the local data network at the home location returns to the home location, and the data flow that accesses the Internet is offloaded at the visited location, and then sends the second offloading rule to the ULCL UPF.

For example, in a case that the SMF at the visited location is the same as the SMF at the home location, this case corresponds to the intra-province roaming scenario shown in FIG. 9 above, indicating that after the terminal device moves to the visited location, the terminal device is still in the service area of the A-SMF at the home location. In this case, both the SMF at the visited location and the SMF at the home location are the A-SMF. In this scenario, the A-SMF may determine, based on the user policy of the terminal device that is previously received from the PCF, that in the roaming scenario, the service flow of the terminal device needs to be offloaded at the visited location, the data flow that accesses the local data network at the home location needs to return to the home location, and the data flow that accesses the Internet is offloaded at the visited location. Then, the A-SMF may insert the ULCL UPF and/or the secondary anchor UPF at the visited location, and deliver the second offloading rule to the ULCL UPF. Further, the A-SMF may further update a bearer rule of the primary anchor UPF and an access network device at the visited location based on an address of the ULCL UPF.

Figure 12A:
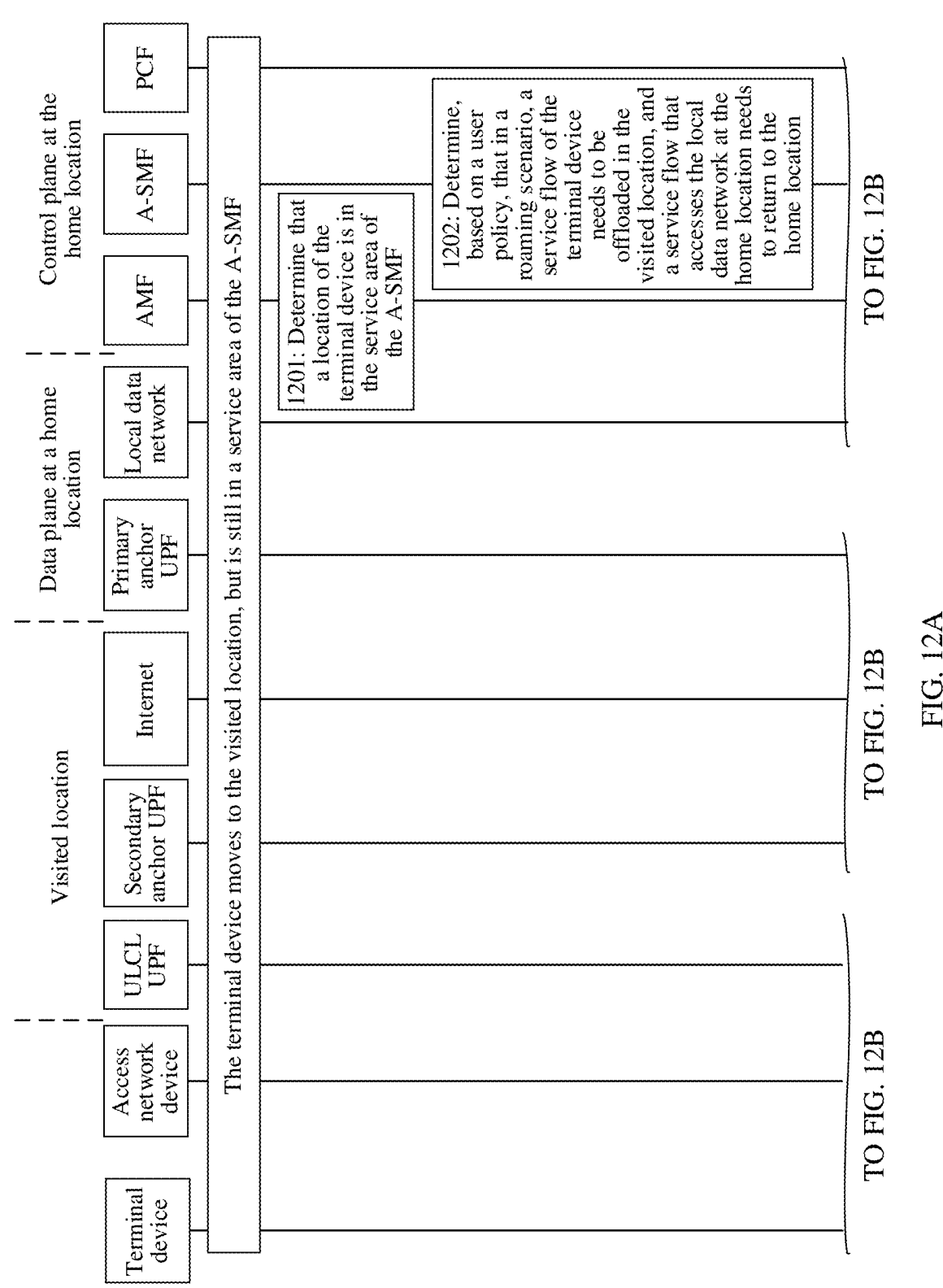
FIG. 12A and FIG. 12B show a related process corresponding to the network access method in Embodiment 2 of this application when a terminal device at a visited location in an intra-province roaming scenario.
Figure 12B:
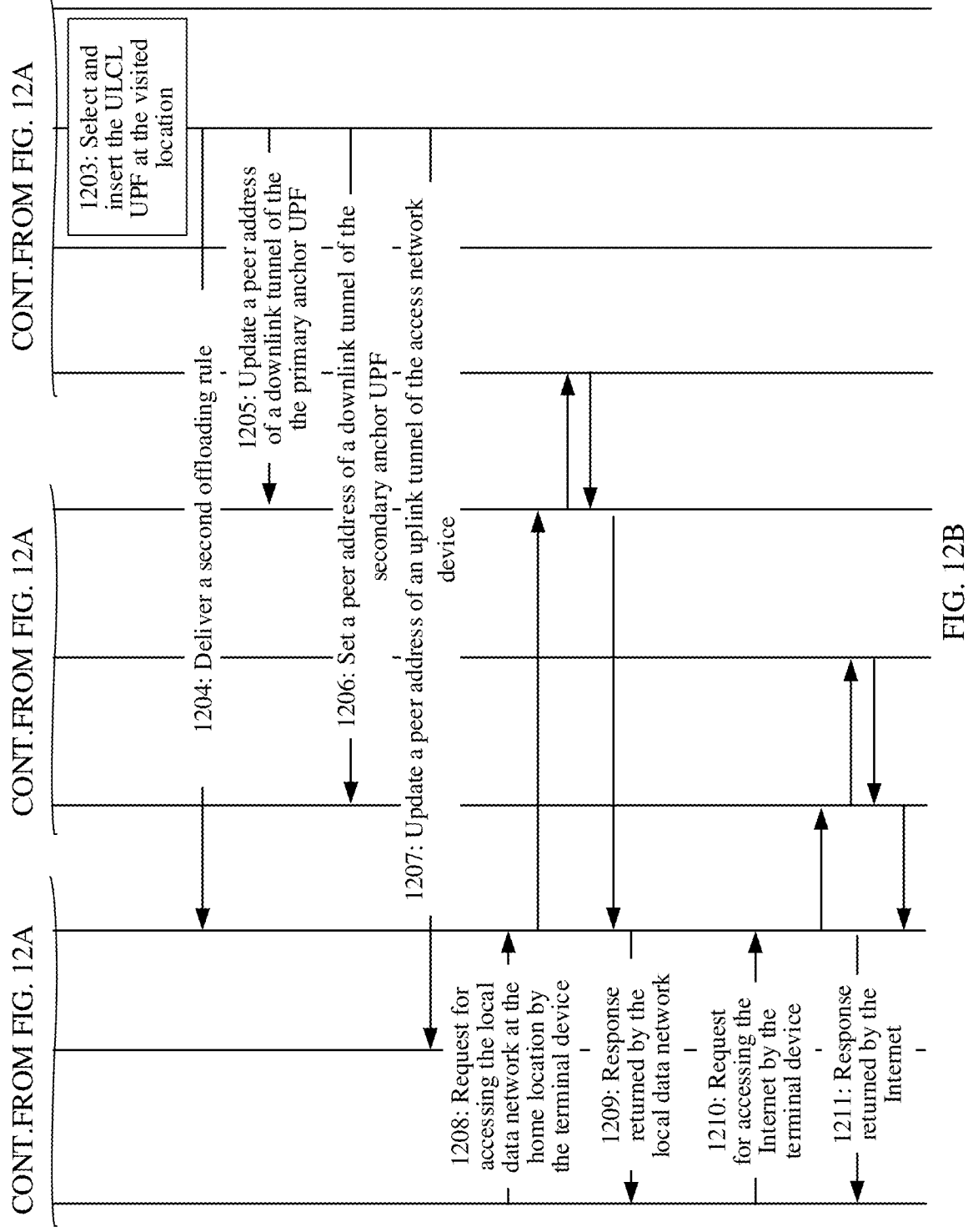

In a possible implementation, as shown in FIG. 12A and FIG. 12B, in step 1201, an AMF may determine that a location of a terminal device is in a service area of an A-SMF. In step 1202, the A-SMF may determine, based on a user policy of the terminal device that is previously received from a PCF, that in a roaming scenario, a service flow of the terminal device needs to be offloaded at a visited location, a service flow that accesses a local data network at a home location returns to the home location, and a service flow that accesses the Internet is offloaded at the visited location, or determine that the terminal device directly accesses the Internet by performing offloading at the visited location, and returns to the home location to access the local data network at the home location. In step 1203, the A-SMF may select and insert a ULCL UPF and/or a secondary anchor UPF at the visited location based on a DNN subscribed to by the terminal device, a DNAI, a location, or other information, and send a second offloading rule to the ULCL UPF in step 1204.

In step 1205, the A-SMF may send an address of the ULCL UPF to the primary anchor UPF, to update a bearer rule of the primary anchor UPF, so as to establish a tunnel between the primary anchor UPF and the ULCL UPF. In some embodiments, the address of the ULCL UPF is used to update a peer address of a downlink tunnel of the primary anchor UPF. That is, the peer address of the downlink tunnel of the primary anchor UPF is updated to the address of the ULCL UPF, so that the primary anchor UPF can send a downlink service flow of the terminal device to the ULCL UPF. For example, the A-SMF may send a tenth update request to the primary anchor UPF, where the tenth update request is used to request to update the bearer rule of the primary anchor UPF, and the tenth update request includes the address of the ULCL UPF. After receiving the tenth update request, the primary anchor UPF may update the peer address of the downlink tunnel to the address of the ULCL UPF, and then send a tenth update response to the A-SMF.

In step 1206, the A-SMF may send the address of the ULCL UPF to the secondary anchor UPF, to set a bearer rule of the secondary anchor UPF, so as to establish a tunnel between the secondary anchor UPF and the ULCL UPF. In some embodiments, the address of the ULCL UPF is used to set a peer address of a downlink tunnel of the secondary anchor UPF. That is, the peer address of the downlink tunnel of the secondary anchor UPF is set to the address of the ULCL UPF, so that the secondary anchor UPF can send a downlink service flow of the terminal device to the ULCL UPF. For example, the A-SMF may send an eleventh update request to the secondary anchor UPF, where the eleventh update request is used to request to set the bearer rule of the secondary anchor UPF, and the eleventh update request includes the address of the ULCL UPF. After receiving the eleventh update request, the secondary anchor UPF may set the peer address of the downlink tunnel to the address of the ULCL UPF, and then send an eleventh update response to the A-SMF.

In step 1207, the A-SMF may send the address of the ULCL UPF to an access network device at the visited location, to update a bearer rule of the access network device, so as to establish a tunnel between the access network device and the ULCL UPF. In some embodiments, the address of the ULCL UPF is used to update a peer address of an uplink tunnel of the access network device. That is, the peer address of the uplink tunnel of the access network device is updated to the address of the ULCL UPF, so that the access network device can send an uplink service flow of the terminal device to the ULCL UPF. For example, the A-SMF may send a twelfth update request to the access network device, where the twelfth update request is used to request to update the bearer rule of the access network device, and the twelfth update request includes the address of the ULCL UPF. After receiving the twelfth update request, the access network device may update the peer address of the uplink tunnel to the address of the ULCL UPF, and then send a twelfth update response to the A-SMF.

Then, under the action of offloading of the ULCL UPF, the terminal device may access the local data network at the home location through the primary anchor UPF, and access the Internet through the secondary anchor UPF.

When the terminal device accesses the local data network at the home location, as shown in step 1208 and step 1209, in the uplink direction, a request for accessing the local data network at the home location that is initiated by the terminal device at the visited location may be sent to the ULCL UPF through the access network device; the ULCL UPF may determine, based on the second offloading rule, that the request matches the second offloading rule and then send the request to the primary anchor UPF; and then, the primary anchor UPF may further send the request to the local data network at the home location. In the downlink direction, a response to the foregoing request that is returned by the local data network at the home location to the terminal device may be first sent to the primary anchor UPF, sent by the primary anchor UPF to the ULCL UPF, and then returned by the ULCL UPF to the terminal device through the access network device.

When the terminal device accesses the Internet, as shown in step 1210 and step 1211, in the uplink direction, a request for accessing the Internet that is initiated by the terminal device at the visited location may be sent to the ULCL UPF through the access network device; the ULCL UPF may determine, based on the second offloading rule, that the request does not match the second offloading rule and then send the request to the secondary anchor UPF; and then, the secondary anchor UPF may further send the request to the Internet. In the downlink direction, a response to the foregoing request that is returned by the Internet to the terminal device may be first sent to the secondary anchor UPF, sent by the secondary anchor UPF to the ULCL UPF, and then returned by the ULCL UPF to the terminal device through the access network device.

In a case that the SMF at the visited location is different from the SMF at the home location, this case corresponds to the inter-province roaming scenario shown in FIG. 10 above, indicating that after the terminal device moves to the visited location, the terminal device leaves the service area of the A-SMF at the home location. In this case, the SMF at the visited location is the I-SMF at the visited location, and the SMF at the home location is the A-SMF at the home location. In this scenario, the A-SMF may send a user policy of the terminal device to the I-SMF, and determine, based on the user policy, that in the roaming scenario, the data flow of the terminal device needs to be offloaded at the visited location, the data flow that accesses the local data network at the home location needs to return to the home location, and the data flow that accesses the Internet is offloaded at the visited location. Optionally, the user policy may refer to an insertion policy of the ULCL UPF and/or the secondary anchor UPF. Then, the I-SMF may select and insert the ULCL UPF and/or the secondary anchor UPF at the visited location, and deliver the second offloading rule to the ULCL UPF; and send the address of the ULCL UPF to the A-SMF, so as to update the bearer rule of the primary anchor UPF at the home location. Further, the I-SMF may further update a bearer of an access network device at the visited location based on an address of the ULCL UPF.

Figure 13A:
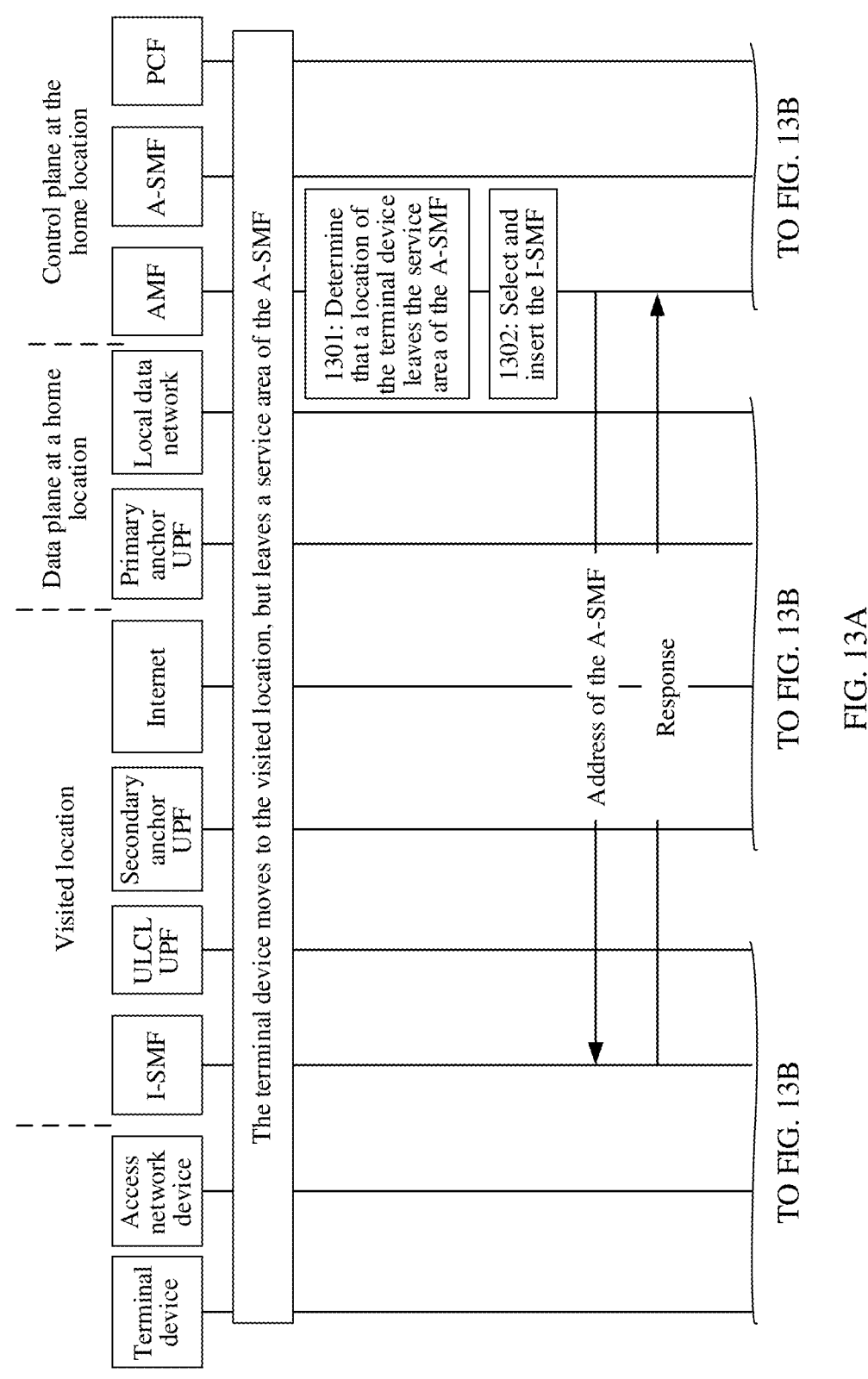
FIG. 13A, FIG. 13B, and FIG. 13C show a related process corresponding to the network access method in Embodiment 2 of this application when a terminal device at a visited location in an inter-province roaming scenario.
Figure 13B:
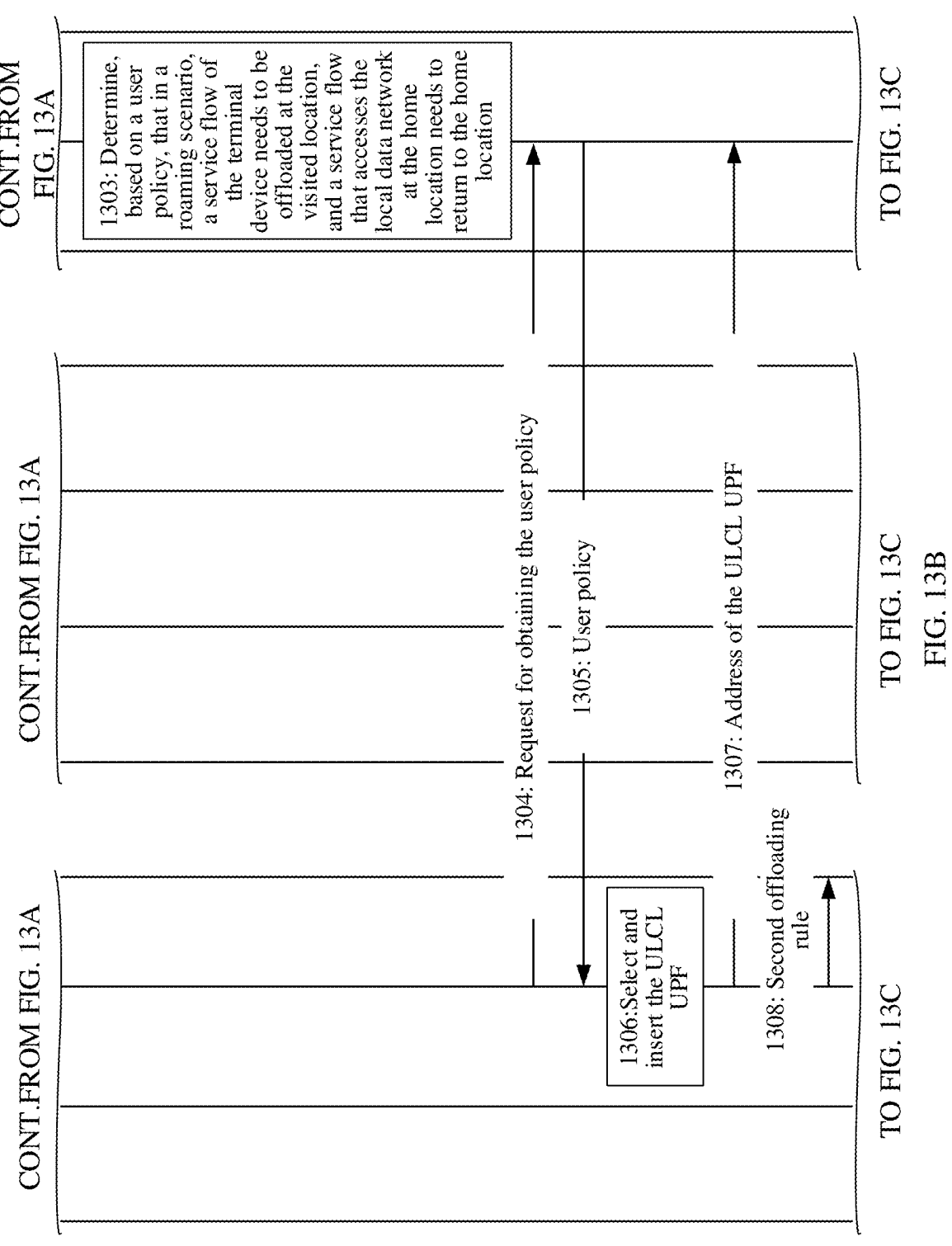
Figure 13C:
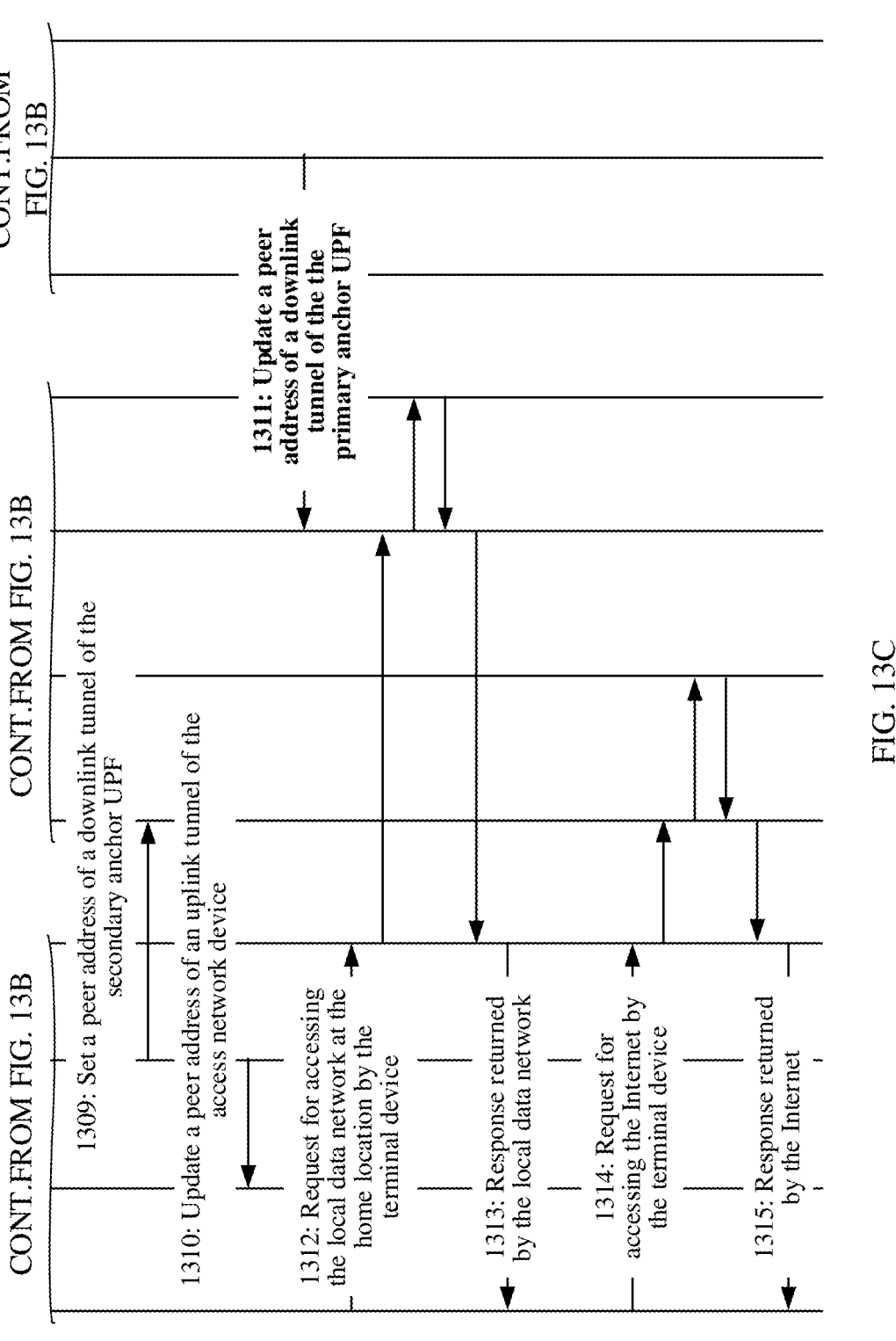

In a possible implementation, as shown in FIG. 13A, FIG. 13B, and FIG. 13C, in step 1301, an AMF may determine that a location of a terminal device leaves a service area of an A-SMF. In step 1302, the AMF may select and insert the I-SMF at a visited location based on a DNN subscribed to by the terminal device, a DNAI, a location, or other information, and the I-SMF forwards user plane data between the visited location and a home location. Further, the AMF may further send an address of the A-SMF to the I-SMF and receive a response from the I-SMF, so that the I-SMF and the A-SMF exchange information. In step 1303, the A-SMF may determine, based on a user policy of the terminal device that is previously received from a PCF, that in a roaming scenario, a data flow of the terminal device needs to be offloaded at a visited location, a data flow that accesses a local data network at a home location returns to the home location, and a data flow that accesses the Internet is offloaded at the visited location, or determine that the terminal device directly accesses the Internet by performing offloading at the visited location, and returns to the home location to access the local data network at the home location. In step 1304, the I-SMF may send, to the A-SMF, a request used to obtain the user policy of the terminal device. The request may also be understood as being used to obtain an insertion policy of a ULCL UPF and/or a secondary anchor UPF. In step 1305, in response to the request of the I-SMF, the I-SMF may send the user policy of the terminal device to the A-SMF. In step 1306, the I-SMF may insert the ULCL UPF and/or the secondary anchor UPF at the visited location based on a DNN subscribed to by the terminal device, a DNAI, a location, or other information. In step 1307, the I-SMF may further send an address of the ULCL UPF to the A-SMF, to update a bearer rule of a primary anchor UPF. In step 1308, the I-SMF may send a second offloading rule to the ULCL UPF, to establish a tunnel between the ULCL UPF and each of the primary anchor UPF and the secondary anchor UPF.

In step 1309, the I-SMF may send the address of the ULCL UPF to the secondary anchor UPF, to set a bearer rule of the secondary anchor UPF, so as to establish a tunnel between the secondary anchor UPF and the ULCL UPF. In some embodiments, the address of the ULCL UPF is used to set a peer address of a downlink tunnel of the secondary anchor UPF. That is, the peer address of the downlink tunnel of the secondary anchor UPF is set to the address of the ULCL UPF, so that the secondary anchor UPF can send a downlink service flow of the terminal device to the ULCL UPF. For example, the I-SMF may send a thirteenth update request to the secondary anchor UPF, where the thirteenth update request is used to set the bearer rule of the secondary anchor UPF, and the thirteenth update request includes the address of the ULCL UPF. After receiving the thirteenth update request, the secondary anchor UPF may set the peer address of the downlink tunnel to the address of the ULCL UPF, and then send a thirteenth update response to the I-SMF.

In step 1310, the I-SMF may send the address of the ULCL UPF to an access network device at the visited location, to update a bearer rule of the access network device, so as to establish a tunnel between the access network device and the ULCL UPF. In some embodiments, the address of the ULCL UPF is used to update a peer address of an uplink tunnel of the access network device. That is, the peer address of the uplink tunnel of the access network device is updated to the address of the ULCL UPF, so that the access network device can send an uplink service flow of the terminal device to the ULCL UPF. For example, the I-SMF may send a fourteenth update request to the access network device, where the fourteenth update request is used to update the bearer rule of the access network device, and the fourteenth update request includes the address of the ULCL UPF. After receiving the fourteenth update request, the access network device may update the peer address of the uplink tunnel to the address of the ULCL UPF, and then send a fourteenth update response to the I-SMF.

In step 1311, the A-SMF may send an address of the ULCL UPF to the primary anchor UPF, to update a bearer rule of the primary anchor UPF, so as to establish a tunnel between the primary anchor UPF and the ULCL UPF. In some embodiments, the address of the ULCL UPF is used to update a peer address of a downlink tunnel of the primary anchor UPF. That is, the peer address of the downlink tunnel of the primary anchor UPF is updated to the address of the ULCL UPF, so that the primary anchor UPF can send a downlink service flow of the terminal device to the ULCL UPF. For example, the A-SMF may send a fifteenth update request to the primary anchor UPF, where the thirteenth update request is used to update the bearer rule of the primary anchor UPF, and the fifteenth update request includes the address of the ULCL UPF. After receiving the fifteenth update request, the primary anchor UPF may update the peer address of the downlink tunnel to the address of the ULCL UPF, and then send a fifteenth update response to the A-SMF.

Then, under the action of offloading of the ULCL UPF, the terminal device may access the local data network at the home location through the primary anchor UPF, and access the Internet through the secondary anchor UPF.

When the terminal device accesses the local data network at the home location, as shown in step 1312 and step 1313, in the uplink direction, a request for accessing the local data network that is initiated by the terminal device at the visited location may be sent to the ULCL UPF through the access network device; the ULCL UPF may determine, based on the second offloading rule, that the request matches the second offloading rule and then send the request to the primary anchor UPF; and then, the primary anchor UPF may further send the request to the local data network at the home location. In the downlink direction, a response to the foregoing request that is returned by the local data network at the home location to the terminal device may be first sent to the primary anchor UPF, sent by the primary anchor UPF to the ULCL UPF, and then returned by the ULCL UPF to the terminal device through the access network device.

When the terminal device accesses the Internet, as shown in step 1314 and step 1315, in the uplink direction, a request for accessing the Internet that is initiated by the terminal device at the visited location may be sent to the ULCL UPF through the access network device; the ULCL UPF may determine, based on the second offloading rule, that the request does not match the second offloading rule and then send the request to the secondary anchor UPF; and then, the secondary anchor UPF may further send the request to the Internet. In the downlink direction, a response to the foregoing request that is returned by the Internet to the terminal device may be first sent to the secondary anchor UPF, sent by the secondary anchor UPF to the ULCL UPF, and then returned by the ULCL UPF to the terminal device through the access network device.

It can be learned that in the foregoing solution, after the ULCL UPF is inserted at the visited location, and the corresponding second offloading rule is configured for the ULCL UPF, under the action of offloading of the ULCL UPF, the terminal device may access the Internet at the visited location through the secondary anchor UPF at the visited location, and access the local data network at the home location through the primary anchor UPF at the home location, so that when the terminal device roams at the visited location, the service flow of the terminal device may be offloaded at the visited location, a service flow that accesses the local data network at the home location returns to the home location through the primary anchor UPF at the home location docking with the ULCL UPF, and other service flows are directly offloaded at the visited location. In this way, network resources can be fully utilized, security of the local data network at the home location can be improved, and a delay of accessing the Internet by a user can be reduced.

Figure 14A:
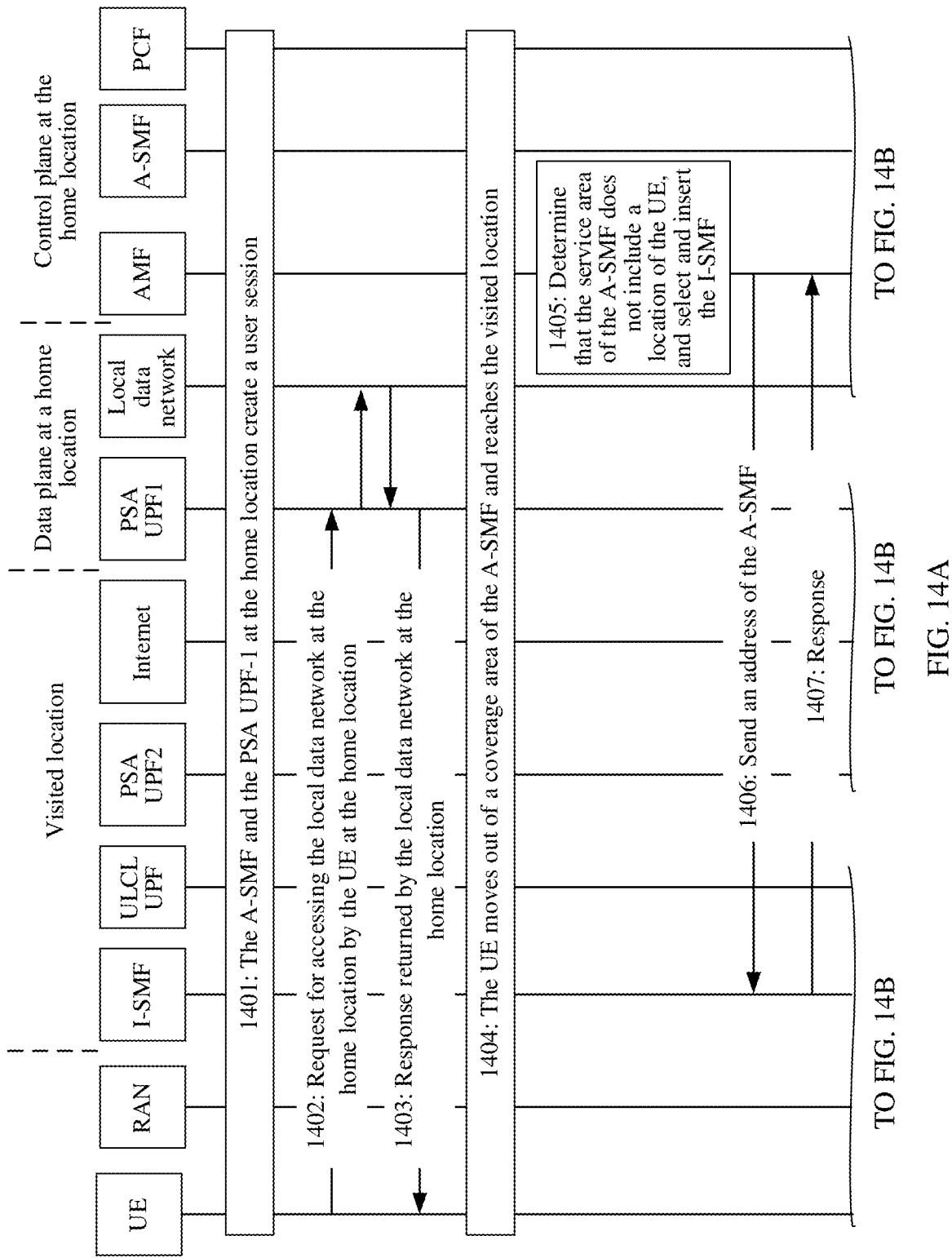
Figure 14C:
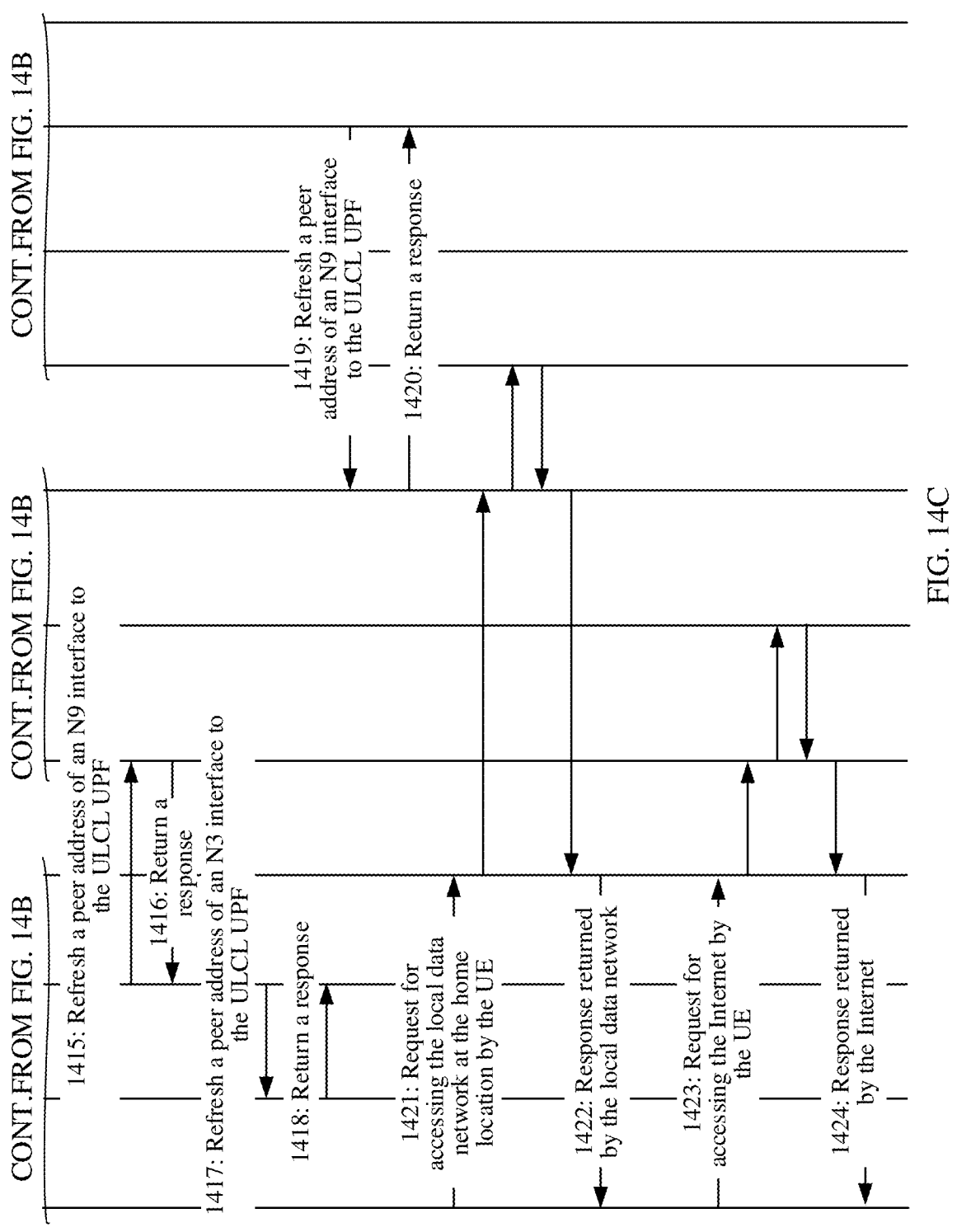

The following describes in detail a service process related to Embodiment 2 of this application by using an inter-province roaming scenario as an example. As shown in FIG. 14A, FIG. 14B, and FIG. 14C, the service process includes the following steps.

Step 1401: A UE subscribes to a special DN, and an A-SMF and a PSA UPF1 at a home location create a user session, where the PSA UPF1 is a primary anchor UPF at the home location connected to the UE, and the PSA UPF1 may be a shared UPF that is in a non-edge area at the home location and that is selected based on a subscribed DNN of the UE.

Step 1402: The UE accesses a local data network at the home location through the PSA UPF1. A request for accessing the local data network at the home location initiated by the UE at the home location is first sent to the PSA UPF1 through a RAN, and then forwarded by the PSA UPF1 to the local data network at the home location.

Step 1403: First send a response returned by the local data network at the home location to the UE to the PSA UPF1, and then the PSA UPF1 forwards the response to the UE through the RAN.

Step 1404: The UE moves out of a service area of the SMF and reaches a visited location.

Step 1405: The AMF determines that the service area of the A-SMF at the home location does not include a location of the UE, and therefore selects and inserts an I-SMF, where the I-SMF is at the visited location.

Step 1406: The AMF sends an address of the A-SMF to the I-SMF. For example, the AMF may send the address of the A-SMF to the I-SMF through a PDU session context creation request message.

Step 1407: The I-SMF replies to the AMF with a response. For example, the I-SMF may return the response to the AMF through a PDU session context creation response message.

Step 1408: The A-SMF determines, based on a user policy of the UE obtained from a PCF, that in a roaming scenario, the UE accesses the Internet by performing offloading at the visited location, and returns to the home location to access the local data network at the home location.

Step 1409: The I-SMF requests to obtain the user policy of the UE from the A-SMF, where the user policy may refer to an insertion policy of a ULCL UPF and/or a PSA UPF2. For example, the I-SMF may request to obtain the user policy of the UE through a PDU session establishment request message.

Step 1410: The A-SMF returns the user policy of the UE to the I-SMF. The user policy may include an offloading rule of the ULCL UPF, and indication information indicating that a service flow matching the offloading rule returns to the PSA UPF1 at the home location and other services are offloaded at the visited location through the PSA UPF2.

Step 1411: The I-SMF selects and inserts the ULCL UPF and/or the PSA UPF2 at the visited location.

Step 1412: The I-SMF sends an address of the ULCL UPF to the A-SMF.

Step 1413: The I-SMF delivers the offloading rule to the ULCL UPF, where the offloading rule indicates that a peer end of a next-hop N9 interface for a service flow matching the offloading rule is the PSA UPF1 and a peer end of a next-hop N9 interface for other service flows is the PSA UPF2.

Step 1414: The ULCL UPF returns a response to the I-SMF.

Step 1415: The I-SMF refreshes a bearer rule of the PSA UPF2, and refreshes a peer address of an N9 interface of the PSA UPF-2 to the address of the ULCL UPF.

Step 1416: The PSA UPF2 returns a response to the I-SMF.

Step 1417: The I-SMF refreshes a bearer rule of the RAN, and refreshes a peer address of an N3 interface of the RAN to the ULCL UPF.

Step 1418: The RAN returns a response to the I-SMF.

Step 1419: The A-SMF refreshes a bearer rule of the PSA UPF1, and refreshes a peer address of an N9 interface of the PSA UPF1 to the ULCL UPF.

Step 1420: The PSA UPF1 returns a response to the A-SMF.

Step 1421: The UE docks with the PSA UPF1 at the home location through an N9 interface of the ULCL UPF at the visited location, and accesses the local data network at the home location.

Step 1422: Return, based on the foregoing original path, a response returned by the local data network at the home location.

Step 1423: The UE docks with the PSA UPF2 at the visited location through the ULCL UPF at the visited location, and accesses the Internet.

Step 1424: Return, based on the foregoing original path, a response returned by the Internet.

A service process in an intra-province roaming scenario is similar to the service process in the inter-province roaming scenario shown in FIG. 14A, FIG. 14B, and FIG. 14C, and a main difference lies in that only one SMF (namely, A-SMF) is involved in the intra-province roaming scenario. Therefore, the SMF may be configured to implement functions of both the A-SMF at the home location and the I-SMF at the visited location in the service process in the inter-province roaming scenario, and the AMF does not need to insert the I-SMF at the visited location based on user subscription and a current location.

It can be learned that, in the technical solution of Embodiment 2, if some service traffic that is of the terminal device and whose rule can be defined needs to return to the home location and other services may be offloaded at the visited location, the SMF at the visited location may select and insert the ULCL UPF and the secondary anchor UPF at the home location based on a DNN subscribed to by the terminal device, a DNAI, a location, or other information; and the SMF at the home location may deliver an offloading rule to the ULCL UPF, to indicate that the ULCL UPF sends a service flow matching the offloading rule to the primary anchor UPF at the home location and sends a service flow not matching the offloading rule to the secondary anchor UPF at the visited location. In this way, in the roaming scenario, a service flow accessing the local data network at the home location by the terminal device can reach the local data network at the home location through the primary anchor UPF at the home location, and other service flows can be offloaded at the visited location through the secondary anchor UPF at the visited location. The foregoing technical solution can satisfy a security requirement of a government network.

In the foregoing technical solution, the UPF at the visited location does not need to send all data flows of the terminal device back to the home location, but sends only data flows that access the local data network at the visited location back to the home location. Therefore, network resources can be fully utilized, and a delay of accessing the Internet by the terminal device can be reduced while ensuring security of the local data network at the home location.

It should be noted that if some services are offloaded at the visited location, some services return to the home location, and the UPF at the visited location supports an I-UPF/ULCL/secondary anchor integration function, the integrated UPF can determine whether to perform offloading over a local N6 interface or through an N9 interface based on a destination address of service access of the user and the like, and the offloading policy is implemented by the SMF and the UPF.

Figure 15:
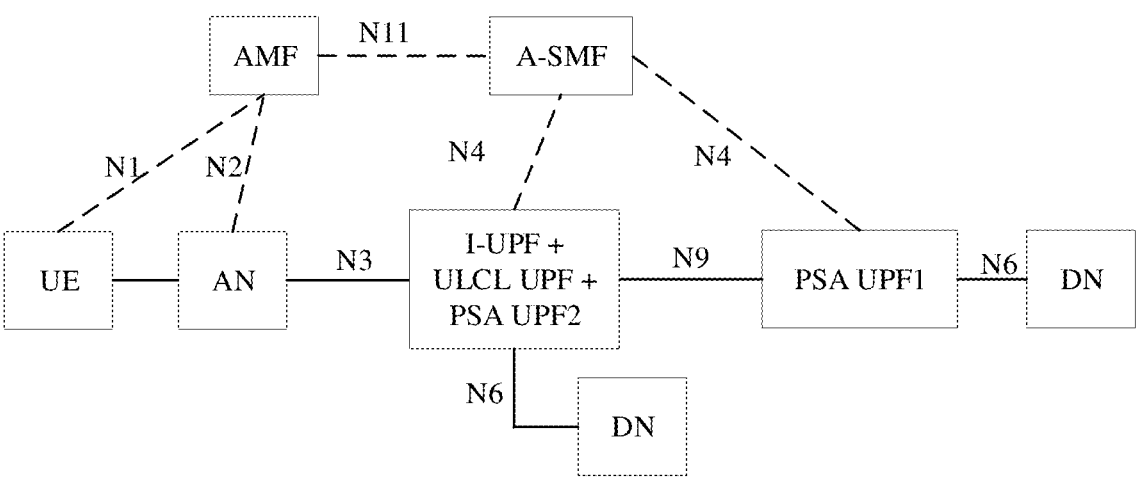
FIG. 15 is a schematic diagram of an intra-province roaming scenario when an integrated UPF is used according to Embodiment 2 of this application.
Figure 16:
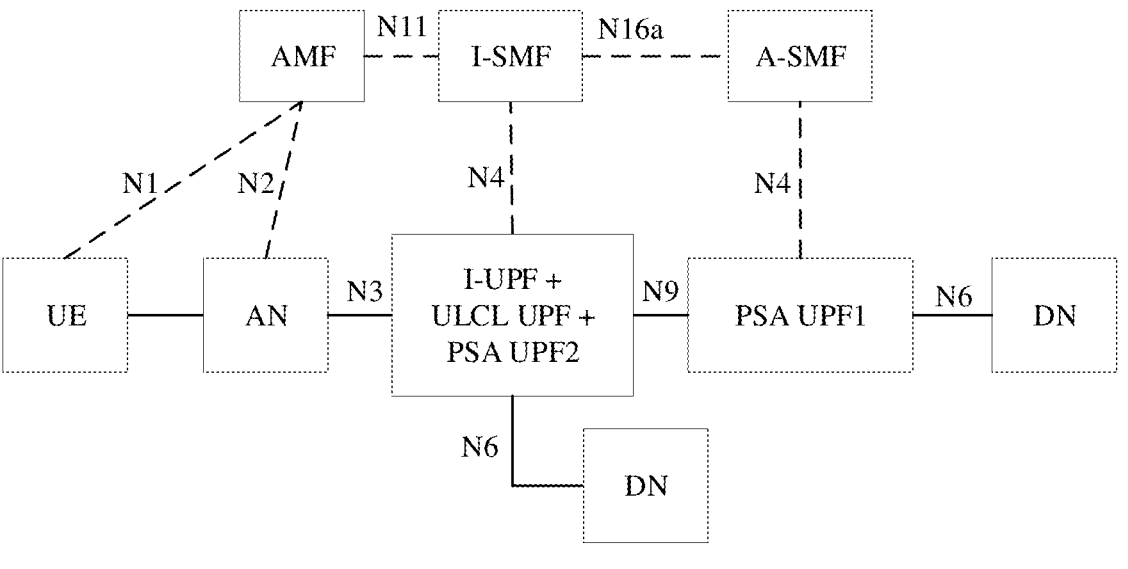
FIG. 16 is a schematic diagram of an inter-province roaming scenario when an integrated UPF is used according to Embodiment 2 of this application.

In the technical solution of using the integrated UPF, the UPF at the visited location supports integral deployment of the I-UPF, the ULCL, and the secondary anchor UPF. The technical solution may also have two possible roaming scenarios, as shown in FIG. 15 and FIG. 16 respectively. FIG. 15 corresponds to a scenario in which a plurality of UPFs are within a management range of a same SMF (for example, an intra-province roaming scenario). FIG. 16 corresponds to a scenario in which a plurality of UPFs are not within a management range of a same SMF (for example, an inter-province roaming scenario). For details, refer to the foregoing related description, and details are not described again.

At the visited location, the offloading policy may be determined based on services accessed by the user. Some services are offloaded through the local N6 interface, and some services are forwarded to the UPF at the home location through the N9 interface. In this way, the user can access both the local data network at the home location and the Internet through a specific DNN. Further, service data whose offloading rule can be defined at the home location returns to the home location, and other traffic is routed out of the Internet through the N6 interface at the visited location.

Figure 17:
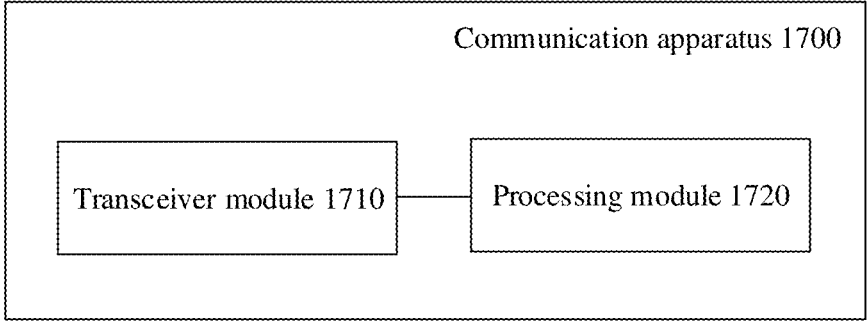
FIG. 17 and FIG. 18 are schematic diagrams of structures of communication apparatuses according to this application.

An embodiment of this application further provides a communication apparatus. FIG. 17 is a schematic diagram of a structure of a communication apparatus according to an embodiment of this application. The communication apparatus 1700 includes: a transceiver module 1710 and a processing module 1720. The communication apparatus may be configured to implement a function of the session management function network element at the home location, the intermediate session management function network element at the visited location, or the session management function network element at the visited location in any one of the foregoing method embodiments. The communication apparatus may be a network device, an apparatus that can support a network device in implementing a corresponding function in the foregoing method embodiments (for example, a chip included in the network device), or the like.

For example, when the communication apparatus performs an operation or a step corresponding to the session management function network element at the home location in the method embodiment shown in FIG. 4, the processing module 1720 is configured to insert an uplink classifier user plane function network element at the home location, where the uplink classifier user plane function network element is configured to offload a service flow of a terminal device; and when the terminal device moves to a visited location, the transceiver module 1710 is configured to send an address of the uplink classifier user plane function network element to an intermediate user plane function network element at the visited location, to establish a tunnel between the intermediate user plane function network element and the uplink classifier user plane function network element.

In a possible design, the processing module 1720 is configured to insert the uplink classifier user plane function network element based on a data network name DNN subscribed to by the terminal device.

In a possible design, the transceiver module 1710 is further configured to receive a user policy of the terminal device from a policy control function network element, where the user policy indicates that the service flow of the terminal device needs to return to the home location and be offloaded in a roaming scenario; and the processing module 1720 is configured to insert the uplink classifier user plane function network element based on the user policy.

In a possible design, the transceiver module 1710 is further configured to send a first offloading rule to the uplink classifier user plane function network element, where the first offloading rule indicates to send a service flow that matches the first offloading rule to a secondary anchor user plane function network element at the home location, and the secondary anchor user plane function network element is connected to a local data network at the home location.

In a possible design, the transceiver module 1710 is further configured to send the address of the uplink classifier user plane function network element to the secondary anchor user plane function network element, to establish a peer address of a downlink tunnel between the secondary anchor user plane function network element and the uplink classifier user plane function network element.

In a possible design, the first offloading rule further indicates to send a service flow that does not match the first offloading rule to a primary anchor user plane function network element at the home location, where the primary anchor user plane function network element is connected to the Internet.

In a possible design, the transceiver module 1710 is further configured to send the address of the uplink classifier user plane function network element to the primary anchor user plane function network element, to establish a tunnel between the primary anchor user plane function network element and the uplink classifier user plane function network element.

In a possible design, the transceiver module 1710 is further configured to send the address of the uplink classifier user plane function network element to an access network device at the home location, to establish a tunnel between the access network device and the uplink classifier user plane function network element.

In a possible design, if the terminal device is still in a service area of the communication apparatus after moving to the visited location, the processing module 1720 is further configured to insert the intermediate user plane function network element at the visited location; and the transceiver module 1710 is further configured to send an address of the intermediate user plane function network element to the uplink classifier user plane function network element, to establish a tunnel between the uplink classifier user plane function network element and the intermediate user plane function network element.

In a possible design, the transceiver module 1710 is further configured to send the address of the intermediate user plane function network element to an access network device at the visited location, to establish a tunnel between the access network device and the intermediate user plane function network element.

In a possible design, if the terminal device leaves a service area of the communication apparatus after moving to the visited location, the transceiver module 1710 is configured to send the address of the uplink classifier user plane function network element to the intermediate user plane function network element by using an intermediate session management function network element at the visited location.

In a possible design, the transceiver module 1710 is further configured to: receive, by using the intermediate session management function network element, an address of the intermediate user plane function network element from the intermediate user plane function network element; and send the address of the intermediate user plane function network element to the uplink classifier user plane function network element, to establish a tunnel between the uplink classifier user plane function network element and the intermediate user plane function network element.

When the communication apparatus performs an operation or a step corresponding to the intermediate session management function network element at the visited location in the method embodiment shown in FIG. 4, the processing module 1720 is configured to: when a terminal device moves to a visited location, insert an intermediate user plane function network element at the visited location; and the transceiver module 1710 is configured to receive an address of an uplink classifier user plane function network element from a session management function network element at a home location, where the uplink classifier user plane function network element is configured to offload a service flow of the terminal device, and the address of the uplink classifier user plane function network element is used to establish a tunnel between the intermediate user plane function network element and the uplink classifier user plane function network element.

In a possible design, the transceiver module 1710 is further configured to send the address of the uplink classifier user plane function network element to the intermediate user plane function network element, to establish a tunnel between the intermediate user plane function network element and the uplink classifier user plane function network element.

In a possible design, the transceiver module 1710 is further configured to send an address of the intermediate user plane function network element to the session management function network element, to establish a tunnel between the uplink classifier user plane function network element and the intermediate user plane function network element.

In a possible design, the transceiver module 1710 is further configured to send the address of the intermediate user plane function network element to an access network device at the visited location, to establish a tunnel between the access network device and the intermediate user plane function network element.

When the communication apparatus performs an operation or a step corresponding to the session management function network element at the visited location in the method embodiment shown in FIG. 11, the processing module 1720 is configured to: when a terminal device moves to a visited location, insert an uplink classifier user plane function network element at the visited location, where the uplink classifier user plane function network element is configured to offload a service flow of the terminal device; and the transceiver module 1710 is configured to send a second offloading rule to the uplink classifier user plane function network element, where the second offloading rule indicates to send a service flow that matches the second offloading rule to a primary anchor user plane function network element at the home location, and the primary anchor user plane function network element is connected to a local data network at the home location.

In a possible design, the processing module 1720 is configured to insert the uplink classifier user plane function network element based on a data network name DNN subscribed to by the terminal device.

In a possible design, the processing module 1720 is configured to insert the uplink classifier user plane function network element based on a user policy of the terminal device, where the user policy indicates that a service flow of the terminal device is to be offloaded at the visited location in a roaming scenario and a service flow that accesses the local data network of the home location returns to the home location.

In a possible design, if the session management function network element at the visited location is the same as a session management function network element at the home location, the transceiver module 1710 is configured to send the address of the uplink classifier user plane function network element to the primary anchor user plane function network element, to establish a tunnel between the primary anchor user plane function network element and the uplink classifier user plane function network element.

In a possible design, if the session management function network element at the visited location is different from a session management function network element at the home location, the transceiver module 1710 is configured to: send, by using the session management function network element at the home location, the address of the uplink classifier user plane function network element to the primary anchor user plane function network element, to establish a tunnel between the primary anchor user plane function network element and the uplink classifier user plane function network element.

In a possible design, the second offloading rule indicates to send a service flow that does not match the second offloading rule to a secondary anchor user plane function network element at the visited location, where the secondary anchor user plane function network element is connected to the Internet.

In a possible design, the transceiver module 1710 is further configured to send the address of the uplink classifier user plane function network element to the secondary anchor user plane function network element, to establish a tunnel between the secondary anchor user plane function network element and the uplink classifier user plane function network element.

In a possible design, the transceiver module 1710 is configured to send the address of the uplink classifier user plane function network element to an access network device at the visited location, to establish a tunnel between the access network device and the uplink classifier user plane function network element.

The processing module 1720 in the communication apparatus may be implemented by at least one processor or a circuit component related to a processor, and the transceiver module 1710 may be implemented by at least one transceiver, a circuit component related to a transceiver, or a communication interface. Operations and/or functions of the modules in the communication apparatus are separately used to implement corresponding procedures of the methods shown in FIG. 4 to FIG. 16. For brevity, details are not described herein again. Optionally, the communication apparatus may further include a storage module. The storage module may be configured to store data and/or instructions. The transceiver module 1710 and/or the processing module 1720 may read the data and/or the instructions in the storage module, to enable the communication apparatus to implement a corresponding method. For example, the storage module may be implemented through at least one memory.

The storage module, the processing module, and the transceiver module may exist separately, or all or some modules may be integrated. For example, the storage module is integrated with the processing module, or the processing module is integrated with the transceiver module.

Figure 18:
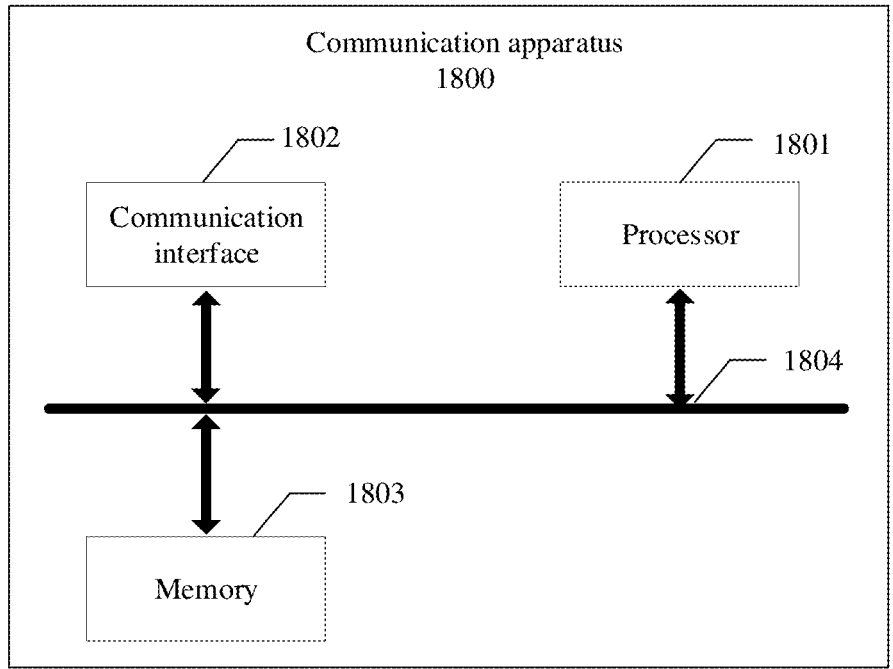

FIG. 18 is a schematic diagram of another structure of a communication apparatus according to an embodiment of this application. The communication apparatus may be configured to implement a function corresponding to the session management function network element at the home location, the intermediate session management function network element at the visited location, or the session management function network element at the visited location in the foregoing method embodiments. The communication apparatus may be a network device, an apparatus that can support a network device in implementing a corresponding function in the foregoing method embodiments (for example, a chip included in the network device), or the like.

The communication apparatus 1800 may include a processor 1801, a communication interface 1802, and a memory 1803. The communication interface 1802 is configured to communicate with another device through a transmission medium. The communication interface 1802 may be a transceiver, or may be an interface circuit such as a transceiver circuit or a transceiver chip. The memory 1803 is configured to store program instructions and/or data, and the processor 1801 is configured to execute the program instructions stored in the memory 1803, to implement the method in the foregoing method embodiments. Optionally, the memory 1803 and the processor 1801 are coupled. The coupling is an indirect coupling or a communication connection between apparatuses, units, or modules, and may be in an electrical, mechanical, or another form, and is used for information exchange between the apparatuses, the units, or the modules.

In an embodiment, the communication interface 1802 may be configured to perform an action of the foregoing transceiver module 1710, and the processor 1801 may be configured to perform an action of the foregoing processing module 1720. Details are not described herein again in this application.

A specific connection medium between the communication interface 1802, the processor 1801, and the memory 1803 is not limited in this embodiment of this application. In this embodiment of this application, in FIG. 18, the memory 1803, the processor 1801, and the communication interface 1802 are connected through a bus 1804, and the bus is represented by a bold line in FIG. 18. A connection manner between other components is merely an example for description, and is not limited thereto. The bus may include an address bus, a data bus, a control bus, and the like. For ease of representation, only one bold line is used to represent the bus in FIG. 18, but this does not mean that there is only one bus or only one type of bus.

An embodiment of this application further provides a chip system, including: a processor, where the processor is coupled to a memory, the memory is configured to store a program or instructions, and when the program or the instructions are executed by the processor, the chip system is enabled to implement a method corresponding to the session management function network element at the home location, the intermediate session management function network element at the visited location, or the session management function network element at the visited location in any one of the foregoing method embodiments.

Optionally, there may be one or more processors in the chip system. The processor may be implemented by using hardware or may be implemented by using software. When implemented by using hardware, the processor may be a logic circuit, an integrated circuit, or the like. When being implemented by using software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory (ROM). The memory and the processor may be integrated on a same chip, or may be separately disposed on different chips. A type of the memory and a manner of disposing the memory and the processor are not specifically limited in this application.

For example, the chip system may be a field programmable gate array (FPGA), may be an application-specific integrated circuit (ASIC), may be a system on chip (SoC), may be a central processing unit (CPU), may be a network processor (NP), may be a digital signal processor (DSP), may be a micro controller unit (MCU), or may be a programmable logic device (PLD) or another integrated chip.

It should be understood that the steps in the foregoing method embodiments may be completed by using an integrated logic circuit of hardware in the processor or an instruction in a form of software. The steps of the method disclosed with reference to embodiments of this application may be directly performed by a hardware processor, or may be performed through a combination of hardware in the processor and a software module.

An embodiment of this application further provides a communication system, where the communication system includes a session management function network element at a home location and/or an intermediate session management function network element at a visited location; and the session management function network element at the home location and the intermediate session management function network element at the visited location collaborate with each other to jointly implement the method in Embodiment 1 of this application.

Optionally, the communication system further includes an uplink classifier user plane function network element, a primary anchor user plane function network element, and a secondary anchor user plane function network element at the home location, and an intermediate user plane function network element at the visited location.

An embodiment of this application further provides another communication system, where the communication system includes a session management function network element at a visited location; and the session management function network element at the visited location is configured to implement the method in Embodiment 2 of this application.

Optionally, the communication system further includes an uplink classifier user plane function network element and a secondary anchor user plane function network element at the visited location, and a primary anchor user plane function network element at a home location.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

It should be understood that the processor mentioned in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor, or the like.

It should be further understood that the memory mentioned in this embodiment of this application may be a volatile memory or a nonvolatile memory, or may include a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitation, many forms of RAMs may be used, for example, a static random access memory (SRAM), a dynamic RAM (DRAM), a synchronous DRAM (SDRAM), a double data rate SDRAM (DDR SDRAM), an enhanced synchronous dynamic random access memory (ESDRAM), a synchronous link DRAM (SLDRAM), and a direct rambus RAM (DR RAM).

It should be noted that when the processor is a general-purpose processor, a DSP, an ASIC, an FPGA or another programmable logic device, a discrete gate or a transistor logic device, or a discrete hardware component, the memory (storage module) is integrated in the processor.

It should be noted that the memory described in this specification aims to include but is not limited to these memories and any memory of another proper type.

It should be understood that various numerical numbers in embodiments of this application are merely distinguished for ease of description, and sequence numbers of the foregoing processes or steps do not mean execution sequences. The execution sequences of the processes or steps should be determined based on functions and internal logic of the processes, and should not be construed as any limitation on implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be offloaded on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

In embodiments of this application, unless otherwise specified or logically conflicting, terms and/or descriptions between different embodiments are consistent and may be mutually referenced, and technical features in different embodiments may be combined to form new embodiments according to internal logical relationships.

Figure 19:
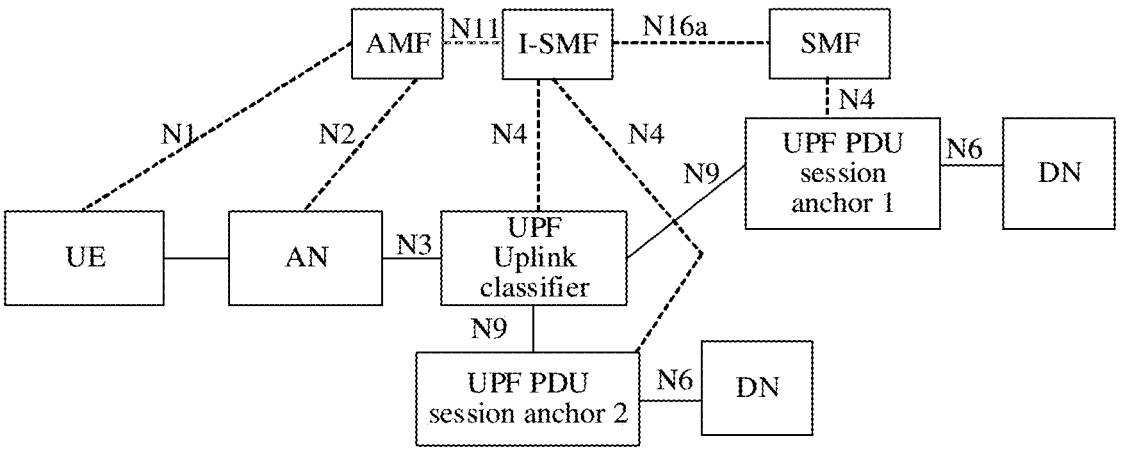
FIG. 19 shows a network architecture of a 5G network applicable to a roaming scenario and defined in a current 3GPP standard.

A network architecture of a 5G network applicable to a roaming scenario and defined in a current 3GPP standard is shown in FIG. 19.

Main functions of network elements/functional entities are as follows:

User plane function (UPF): serves as an interface UPF for a data network and implements functions such as user plane data forwarding, session/flow-level based charging statistics, and bandwidth limiting.

Uplink classifier user plane function (ULCL): is briefly referred to as an uplink classifier, and is a working form of the UPF; and is configured to perform service offloading; and determine a data flow direction based on different destination addresses accessed by a user.

Session management function (SMF): mainly performs functions such as session management, execution of a control policy delivered by a policy control function (PCF), UPF selection, and terminal device (UE) Internet Protocol (IP) address allocation.

Access and mobility management function (access and mobility management function, AMF): mainly performs functions such as mobility management and access authentication/authorization, and is further responsible for transferring a user policy between the UE and the PCF.

Forwarding SMF (I-SMF): is configured to forward a control plane message between a visited location and a home location.

(Radio) access network ((R)AN): corresponds to different access networks in 5G, for example, a plurality of manners such as wired access and wireless base station access.

Protocol data unit (PDU) session: is a session service that implements PDU connectivity between the UE and the data network and that is identified by a PDU session ID (identifier).

PDU session anchor (PSA): is a UPF PDU session anchor in FIG. 1 and may be briefly referred to as an anchor UPF.

The architecture may further include the following:

Forwarding UPF (I-UPF): is configured to forward a data plane message between a visited location and the home location.

Application function (AF): mainly transmits requirements of an application side on a network side, for example, QoS (quality of service) requirements or user status event subscription. The AF may be a third-party functional entity, or may be an application service deployed by an operator, for example, an IMS (IP multimedia subsystem) voice call service.

Unified data management (UDM): is mainly responsible for functions such as subscription data management and user access authorization.

Unified data repository (UDR): is mainly responsible for a function of storing types of data such as subscription data, policy data, and application data.

Policy control function PCF: is mainly responsible for policy control functions such as charging, QoS bandwidth guarantee, mobility management, and UE policy decision based on a session and a service flow level. In this architecture, PCFs connected to the AMF and the SMF respectively correspond to an AM PCF+UE PCF (PCF for Access and Mobility Control/PCF for UE Policy Control) and an SM PCF (PCF for Session Management). In an actual deployment scenario, functions of the AM PCF and the UE PCF are usually provided by a same PCF. However, this PCF and the SM PCF may not be a same PCF entity. For ease of description, the AM PCF may be simply used subsequently to refer to the PCF instance that provides both a UE policy and an AM policy.

Functions of interfaces between network elements in FIG. 19 are as follows:

An N1 interface is an interface between the AMF and the UE, is independent of access, and is configured to transmit a QoS control rule and the like to the UE.

An N2 interface is an interface between the AMF and the RAN, and is configured to transmit radio bearer control information from a core network side to the RAN.

An N3 interface is an interface between the (R)AN and a UPF, and is configured to transmit user plane data between the (R)AN and the UPF.

An N4 interface is an interface between the SMF and a UPF, and is configured to transmit information between a control plane and a user plane, including delivering of a control plane-to-user plane forwarding rule, a QoS control rule, a traffic statistics rule, and the like, and reporting of information about the user plane.

An N6 interface is an interface between the UPF and the DN, and is configured to transmit user plane data between a UPF and the DN.

An N9 interface is an interface between UPFs, for example, an interface between a UPF connected to the DN and a UPF connected to the (R)AN, and is configured to transmit user plane data between the UPFs.

An N11 interface is an interface between the SMF and the AMF, and is configured to transmit PDU session tunnel information between the RAN and a UPF, a control message sent to the UE, radio resource control information sent to the RAN, and the like.

An N16a interface is an interface between the SMF and the I-SMF, and is used by the I-SMF at the visited location to obtain information about a UPF at the home location from the SMF at the home location.

The architecture may further include:

An N5 interface is an interface between the AF and the PCF, and is configured to deliver an application service request and report a network event.

An N7 interface is an interface between the PCF and the SMF, and is configured to deliver PDU session granularity and service data flow granularity control policies.

An N8 interface is an interface between the AMF and the UDM, and is used by the AMF to obtain access and mobility management-related subscription data and authentication data from the UDM, and by the AMF to register current mobility management-related information of the UE with the UDM.

An N10 interface is an interface between the SMF and the UDM, and is used by the SMF to obtain session management-related subscription data from the UDM, and by the SMF to register current session-related information of the UE with the UDM.

An N15 interface is an interface between the PCF and the AMF, and is configured to deliver a UE policy and an access control-related policy.

An N22 interface is an interface between the AMF and a network slice selection function (NSSF), and is used by the AMF to query the NSSF for information such as allowed network slice selection assistance information (NSSAI) and configured NSSAI configured by a home network on the UE.

An N35 interface is an interface between the UDM and the UDR, and is used by the UDM to obtain user subscription data information from the UDR.

An N36 interface is an interface between the PCF and the UDR, and is used by the PCF to obtain policy-related subscription data and application data-related information from the UDR.

A general user registration process can be simply described as follows: The UE sends a registration request to the AMF through the RAN, the AMF obtains subscription data from the specified UDM based on a user identifier, and after receiving the request, the UDM may obtain the actual subscription data from the UDR. In addition, the AMF may further initiate a user policy control create request (UEPolicyControl_Create) and an access management policy control create request (AMPolicyControl_Create) to the PCF, to obtain a UE policy and an access control policy respectively. In this process, the PCF returns the access control policy to the AMF, and the AMF provides the UE policy to the UE.

A general session establishment process can be simply described as follows: The UE sends a session establishment request to the AMF by using the RAN, the AMF selects the SMF for the session to provide a service for a session, stores a correspondence between the SMF and the PDU session, and sends the session establishment request to the SMF, and the SMF selects a corresponding UPF for the UE, establishes a user plane transmission path, and allocates an IP address to the UE. In this process, the SMF further initiates a policy control session establishment request to the PCF, to establish a policy control session between the SMF and the PCF. During the policy control session establishment, the SMF stores a correspondence between the policy control session and the PDU session. For a roaming user, in the roaming scenario, the I-SMF and the SMF need to forward control signaling, and the I-UPF needs to forward media data.

The primary anchor UPF mentioned in this embodiment of this application is a UPF that is connected to the UE when the UE is initially activated to create a session, and is configured to allocate an IP address to the UE.

The secondary anchor UPF is a UPF inserted after the session of the UE is created, and is configured to neither create a session nor allocate an IP address.

In an existing 3GPP architecture, ULCL UPF selection in a roaming scenario is implemented by an I-SMF, and a ULCL UPF at a home location cannot be selected by using an SMF at the home location. As a result, a requirement of returning all service flows to the home location when a campus user is roaming cannot be satisfied, to pose a security risk to a campus network. In addition, after a service flow of the campus user returns to the home location, because a UPF at the home location is a primary anchor UPF and has no Internet egress (a UPF shared by a city has an Internet egress, but the city where the home UPF at the home location is located has no Internet egress), a requirement of further offloading the service flow of the campus user based on the ULCL UPF after the service flow returns to the home location cannot be satisfied.

To resolve the foregoing problem, this application provides a campus network access method. In the method, when a user is in a roaming scenario, for example, when a user leaves a campus or roams between provinces or within a province, the user can still access a campus network without requiring the campus network to access the Internet.

It should be understood that in the roaming scenario involved in this application, a home location and a visited location are distinguished. A campus network may be deployed at the home location. The campus network may also be referred to as an enterprise network, an enterprise private network, or a local network, or has another name, which is not limited. The visited location may also be referred to as a roaming location.

A technical solution in Embodiment 3 of this application is as follows:

When a user is in a roaming scenario, a ULCL UPF is selected in dependence on a data network name (DNN) subscribed to by the user and a location of the user. The user subscription may include a dedicated DNN, a dedicated slice, or the like.

If all service traffic of the user needs to return to a home location and needs to be offloaded at the home location, an SMF at the home location can select (allocate or insert) a ULCL UPF and insert the ULCL UPF at the home location based on the user subscription and the current location of the user; an SMF at a visited location may insert an I-UPF at the visited location based on the user subscription and the current location of the user; and a forwarding object of an N9 interface supported by the I-UPF needs to be the ULCL UPF, so that a destination address of the N9 interface of the I-UPF can be set to the ULCL UPF.

Embodiment 3 may include three possible access scenarios that are respectively: a campus access scenario, an intra-province roaming scenario, and an inter-province roaming scenario.

Figure 20:
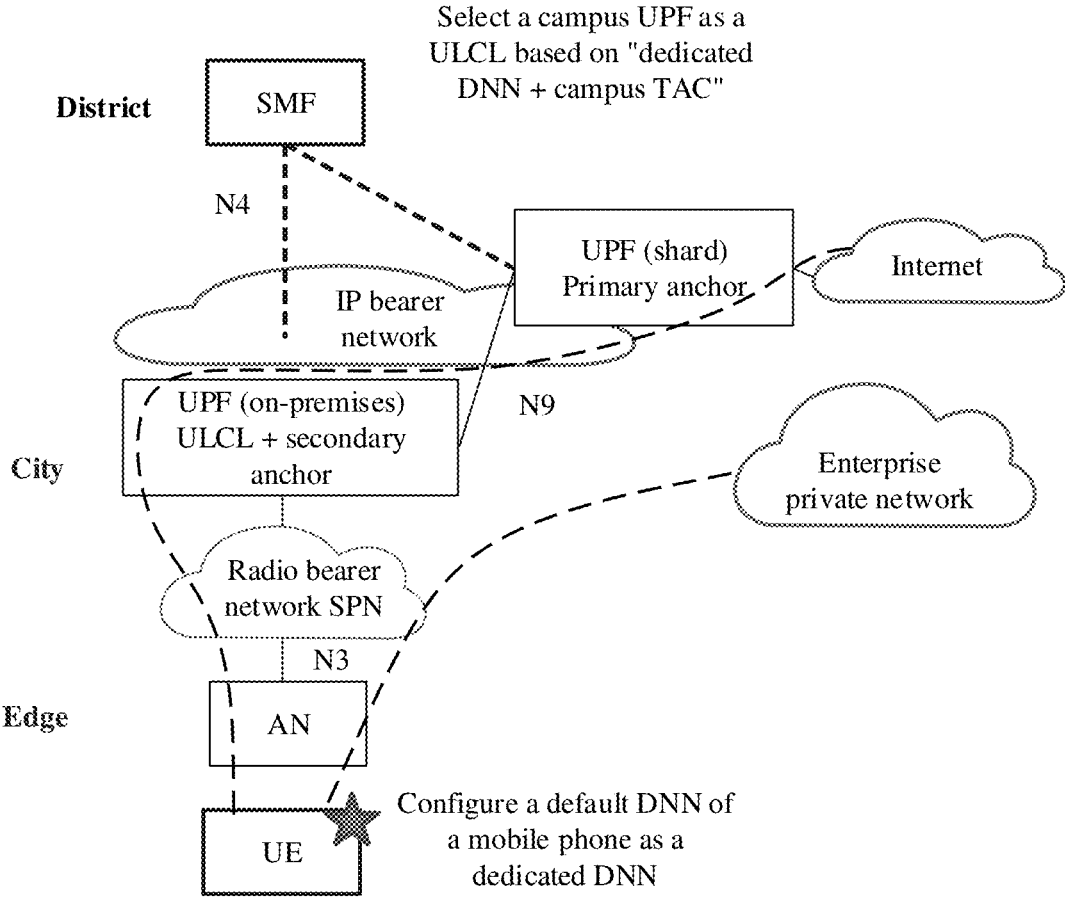
FIG. 20 is a schematic diagram of a campus access scenario according to Embodiment 3 of this application.

The campus access scenario may be shown in FIG. 20. This scenario is a non-roaming scenario.

Prerequisites for this scenario may include: (1) A default DNN of a user is configured as a dedicated DNN. (2) The user performs subscription at a PCF, so that a campus UPF can be enabled for the user to serve as a ULCL UPF when the user is roaming subsequently within a province or between provinces.

The selecting the UPF in this scenario may include: (1) An SMF may select a primary anchor UPF for the user based on the "dedicated DNN" subscribed to by the user, for example, may select a shared UPF as the primary anchor UPF. (2) The SMF may select a campus UPF as a ULCL UPF or a secondary anchor UPF based on a tracking area code (TAC) of the user.

Figure 21:
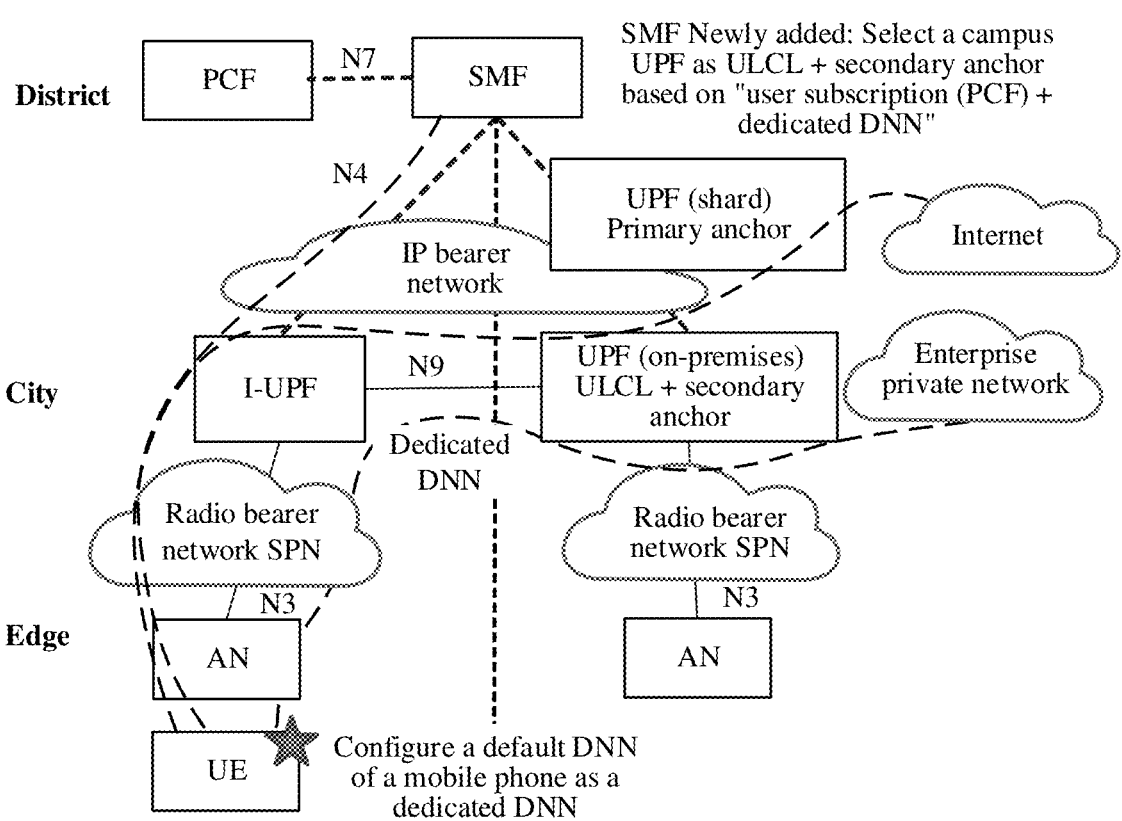
FIG. 21 is a schematic diagram of an intra-province roaming scenario according to Embodiment 3 of this application.
Figure 24A:
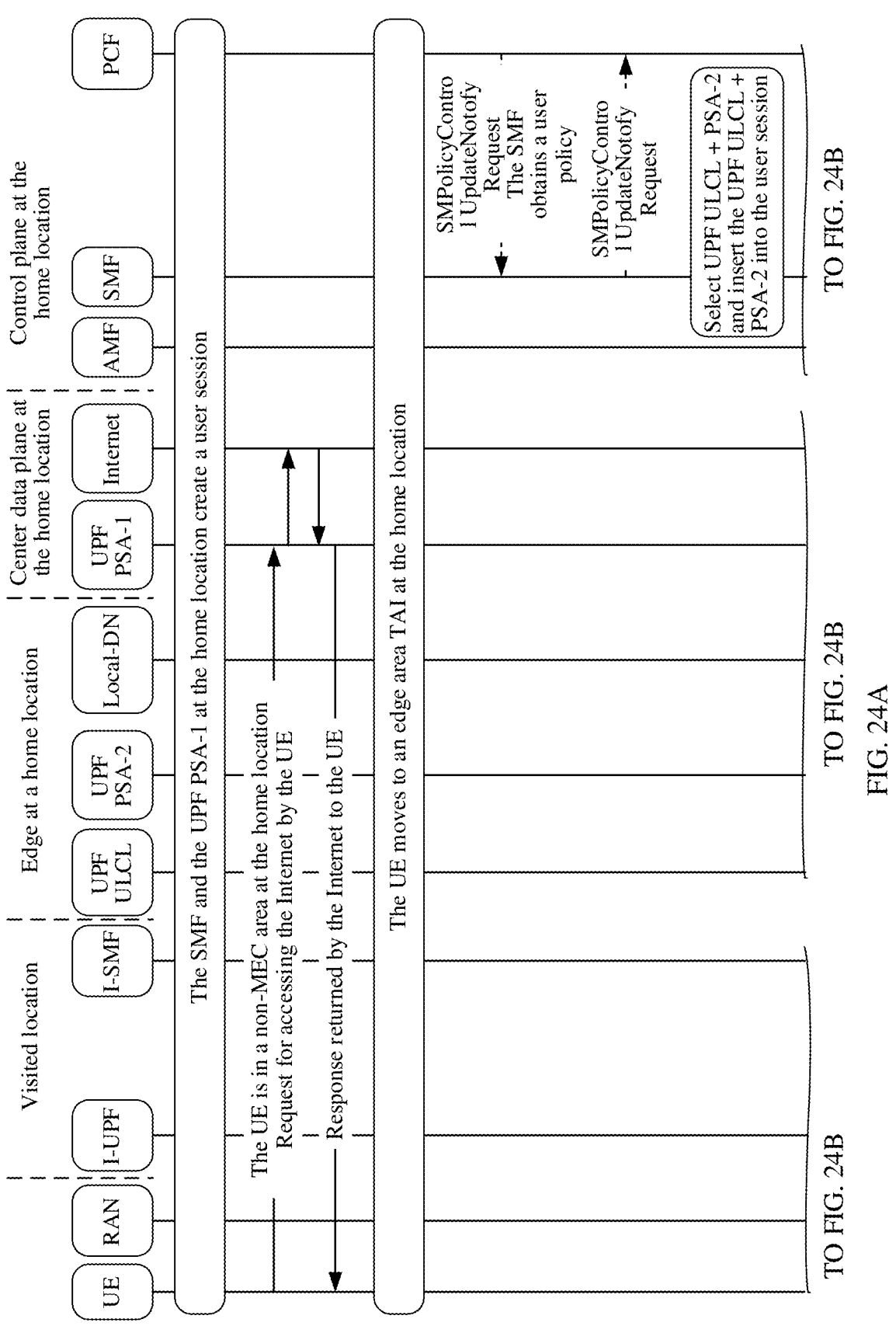
FIG. 24A, FIG. 24B, FIG. 24C, and FIG. 24D are a schematic diagram of a service process according to Embodiment 3 of this application.
Figure 24B:
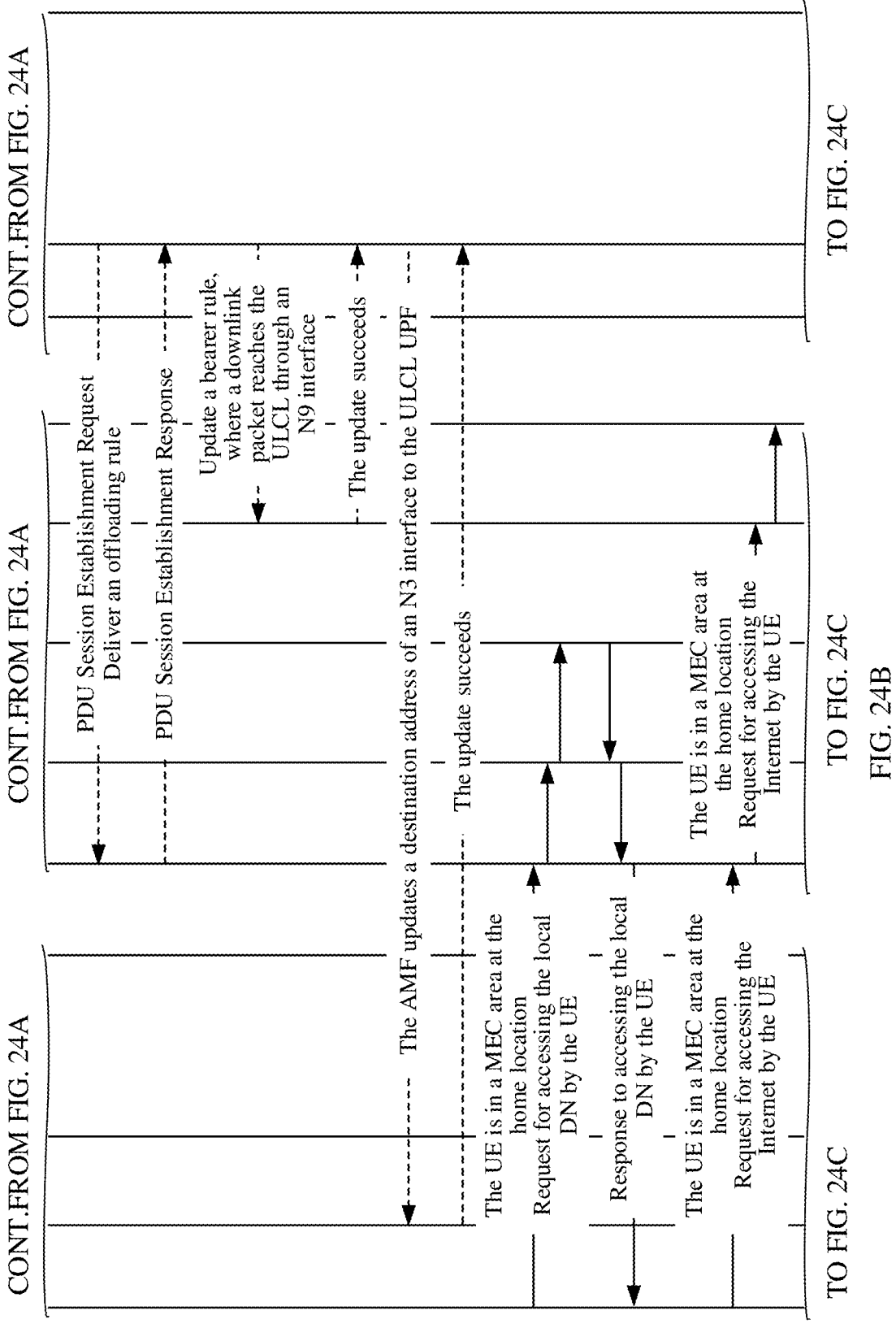
Figure 24C:
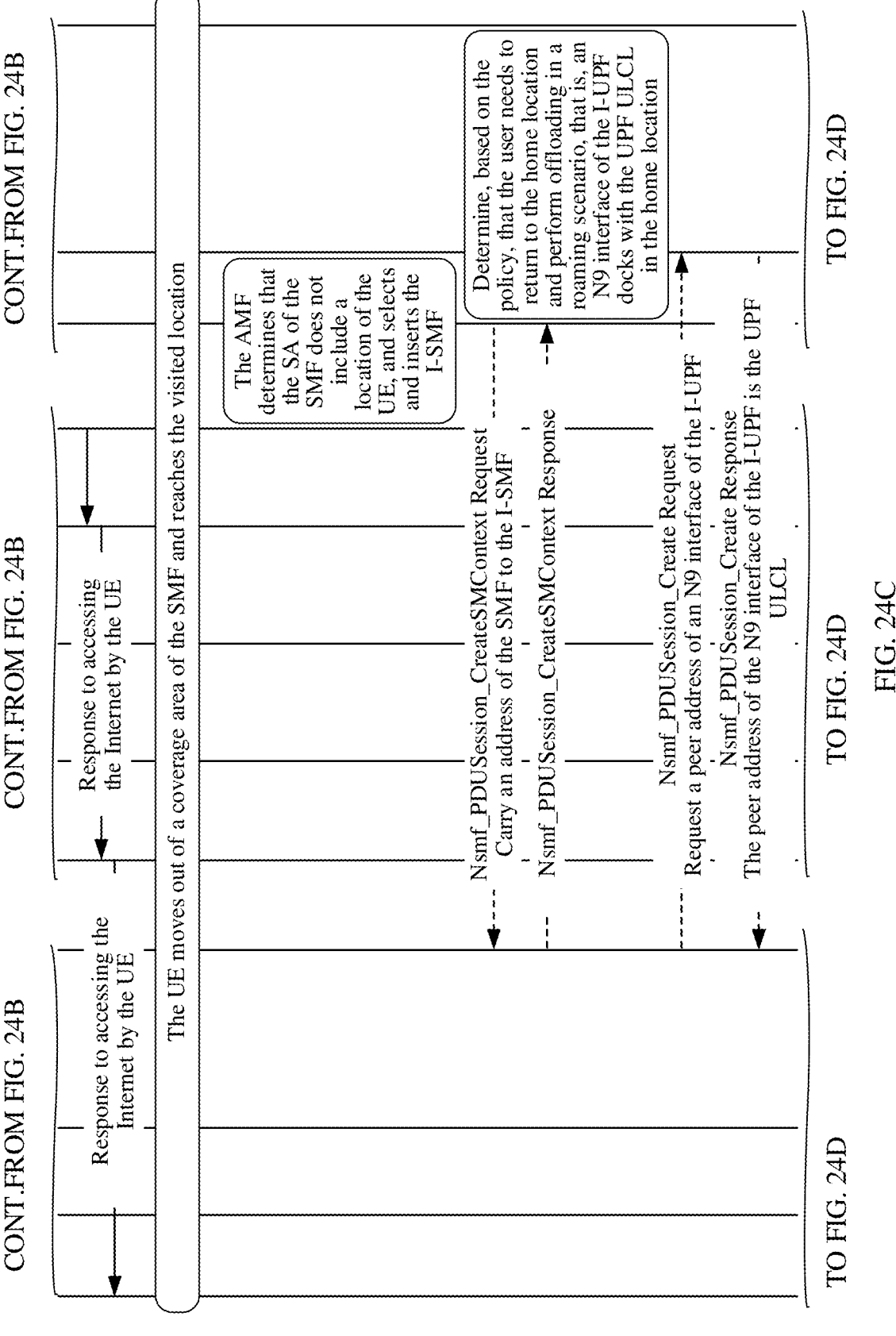
Figure 24D:
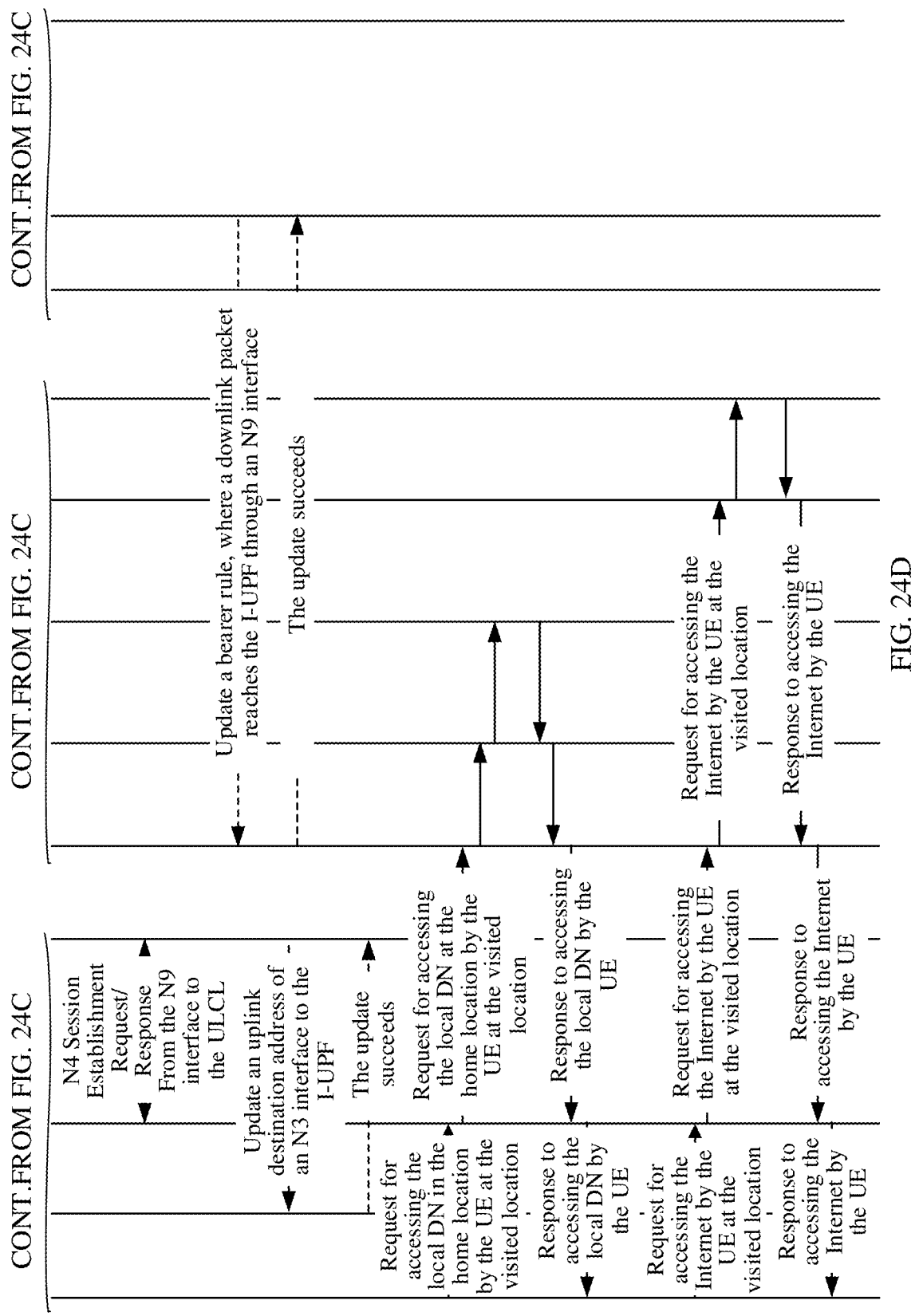

The intra-province roaming scenario may be shown in FIG. 21. The scenario may also be referred to as an inter-city roaming scenario or an inter-city roaming scenario.

In this scenario, the home location and the visited location may share a same SMF, but respectively correspond to different UPFs. That is, there is one SMF in this scenario. This may be understood as follows: The UPF at the home location and the UPF at the visited location are in a management range of a same SMF, and the management range may also be referred to as a coverage range. For example, the home location and the visited location may be different cities in a province, and may be referred to as a home city and a visited city respectively. The SMF may be considered as an SMF in a home province, or may be an SMF at the home location/city or an SMF at the visited location/city.

Prerequisites for this scenario may include: (1) A default DNN of a user is configured as a dedicated DNN. (2) The user performs subscription at a PCF, so that a campus UPF can be enabled for the user to serve as a ULCL UPF when the user is roaming subsequently within a province or between provinces.

The selecting the UPF in this scenario may include: (1) The SMF determines that the user is a campus user and the location of the user is not in the campus; and the SMF may select a primary anchor UPF for the user, for example, may select a shared UPF as the primary anchor UPF. (2) The SMF may select a campus UPF as a ULCL UPF or a secondary anchor UPF based on user subscription. (3) The SMF may insert an I-UPF based on the current location of the user and notify the I-UPF of the address of the ULCL UPF.

The inter-province roaming scenario may be shown in FIG. 22. The scenario may also be referred to as an inter-province roaming scenario.

In this scenario, the home location and the visited location correspond to different SMFs, and respectively correspond to different UPFs. That is, both an SMF at the home location and an SMF at the visited location exist in this scenario. This may be understood as follows: The UPF at the home location and the UPF at the visited location are in management ranges of different SMFs, and the management range may also be referred to as a coverage range. For example, the home location and the visited location may be different provinces in a country that may be referred to as a home province and a visited province respectively. The SMF at the home location may be an SMF in the home province, and the SMF at the visited location may be an SMF in the visited province.

Prerequisites for this scenario may include: (1) A default DNN of a user is configured as a dedicated DNN. (2) A DNN dedicated to the roaming province is configured for a first-level network repository function (NRF). (3) The user performs subscription at a PCF, so that a campus UPF can be enabled for the user to serve as a ULCL UPF when the user is roaming subsequently within a province or between provinces.

The selecting the UPF in this scenario may include: (1) The SMF at the visited location determines not to support the dedicated DNN of the user, and then queries the NRF for the SMF corresponding to the DNN. (2) If the SMF at the home location determines that the user is a campus user, the campus UPF is selected for the user to serve as the ULCL UPF or the secondary anchor UPF. The SMF at the visited location interacts with the UPF at the home location to allocate the address to the UE and return the address of the ULCL UPF to the I-SMF/I-UPF. (3) The SMF at the visited location inserts the I-UPF based on the current location of the user.

A network architecture to which Embodiment 3 is applicable may be shown in FIG. 23. A scenario 1 in FIG. 23 corresponds to an intra-province roaming scenario. A scenario 2 in FIG. 23 corresponds to an inter-province roaming scenario.

It should be noted that the intra-province roaming scenario and the inter-province roaming scenario mentioned in this application are obtained by dividing roaming scenarios based on characteristics of administrative division in China, and are intended to make readers have a vivid understanding of the roaming scenarios. However, it should be noted that this application is not limited thereto. Actually, division of the intra-province roaming scenario and the inter-province roaming scenario in this application may be made based on a deployment status of the SMF and the UPF.

For example, in some embodiments, the intra-province roaming scenario may alternatively refer to: The user moves within a small area range, does not leave the management range of the current SMF (that is, the SMF at the home location), but leaves the service range of the current UPF (that is, the UPF at the home location), and moves from the service range of the current UPF (that is, the UPF at the home location) to a service range of another UPF (that is, a UPF at the visited location). The two UPFs are managed by the same SMF.

The inter-province roaming scenario may alternatively refer to: The user moves within a large area range, and moves from a management range of a current SMF (that is, an SMF at the home location) to a management range of another SMF (that is, an SMF at the visited location). Certainly, the user also moves from a service range of a current UPF (that is, a UPF at the home location) to a service range of another UPF (that is, a UPF at the visited location). The two UPFs are managed by different SMFs.

The foregoing descriptions of the intra-province roaming scenario and the inter-province roaming scenario are applicable to Embodiments 3, 4, and 5 of this application. Details are not described below.

A service process in Embodiment 3 of this application is described in detail below by using the inter-province roaming scenario (corresponding to the network architecture shown in the scenario 2 in FIG. 23) as an example. As shown in FIG. 24A, FIG. 24B, FIG. 24C, and FIG. 24D, the service process includes the following steps.

Step 2401: An SMF and a UPF PSA-1 at a home location create a user session.

Step 2402: A UE accesses the Internet in a non-MEC area at the home location through the UPF PSA-1.

Step 2403: When the UE moves to an edge area TAI at the home location, trigger a PCF to deliver an offloading policy to the SMF, and the SMF at the home location selects ULCL UPF+PSA-2 based on the offloading policy and inserts the ULCL UPF+PSA-2 into the user session.

Step 2404: The SMF at the home location delivers an offloading rule to the ULCL UPF, updates a bearer rule, and refreshes peer addresses of uplink and downlink data transmission tunnels of an N9 interface of the ULCL UPF to the UPF PSA1 and a RAN. For this step, refer to content about adding a PDU session anchor and an offloading point or a ULCL in 3GPP 23502.

Step 2405: After the SMF at the home location selects the ULCL UPF+PSA2 and inserts the ULCL UPF+PSA2 into the user session, when the UE accesses a local service at the home location in a MEC area at the home location through the ULCL UPF+PSA2, forward a service flow to the UPF PSA1 through the N9 interface of the ULCL UPF to access the Internet.

Step 2406: When the UE moves out of a coverage area of the SMF and reaches a visited location, an AMF determines that a service area (service area, SA) of the SMF at the home location does not include a current location of the UE, and therefore chooses to insert an I-SMF at the visited location and sends an address of the SMF at the home location to the I-SMF at the visited location.

Step 2407: The SMF at the home location determines, based on the offloading policy of a user delivered by the PCF, that when the user is in a roaming scenario, the service flow needs to return to the home location and needs to be offloaded, and determines that an N9 interface of an I-UPF at the visited location docks with the ULCL UPF at the home location. In this way, when the I-SMF requests to obtain a peer address of the N9 interface of the I-UPF from the SMF, the SMF at the home location returns the address of the ULCL UPF at the home location to the I-SMF at the visited location.

The SMF at the home location may predefine, through a specific PCC delivered by the PCF, a rule corresponding to a configuration on the SMF, to identify that a service flow of the user needs to return to the home location and needs to be offloaded in a roaming scenario. The offloading rule may be determined based on an IP 5-tuple.

Step 2408: The I-SMF at the visited location selects the I-UPF based on user subscription and the current location of the UE, creates a packet forwarding control protocol (PFCP) session, and notifies the I-UPF of the peer address of the N9 interface of the I-UPF (that is, the address of the ULCL UPF).

Step 2409: The SMF updates the bearer rule, and refreshes an address of a downlink tunnel of the ULCL UPF to a peer end of the N9 interface, where the peer end is the I-UPF. For this step, refer to content about changing a PDU session anchor or ULCL in 3GPP 23502.

Step 2410: The I-SMF updates a peer address of an uplink tunnel of an N3 interface on a RAN side to the I-UPF. The peer address of the tunnel is a destination address (destination IP address) of the tunnel.

Step 2411: The UE docks with the ULCL UPF+PSA2 at the home location through the N9 interface of the I-UPF at the visited location, and then accesses a local DN at the home location.

Step 2412: The UE docks with the ULCL UPF at the home location through the N9 interface of the I-UPF at the visited location, then connects to the UPF-PSA1 through the N9 interface of the ULCL UPF, and then accesses the Internet.

The service process of the intra-province roaming scenario in Embodiment 3 is similar to the service process of the inter-province roaming scenario shown in FIG. 24A, FIG. 24B, FIG. 24C, and FIG. 24D. A main difference lies in that only one SMF is involved in the intra-province roaming scenario. Therefore, the SMF may have functions of both the SMF at the home location and the I-SMF at the visited location in the service process in the inter-province roaming scenario, and the AMF does not need to insert the I-SMF at the visited location based on user subscription and a current location.

For brevity, steps of the service process in the intra-province roaming scenario are not described one by one in this application. It may be understood that the service process may be implemented by correspondingly modifying the service process shown in FIG. 24A, FIG. 24B, FIG. 24C, and FIG. 24D based on the network architecture in the scenario 1 in FIG. 23.

In the foregoing Embodiment 3, the I-SMF and the I-UPF may be inserted based on "user subscription+current location", and a forwarding object of the I-UPF at the visited location is set to the ULCL UPF. Therefore, provided that the user uses one DNN, all service flows (including the Internet) can return to the campus UPF at the home location and be offloaded at the home location, thereby improving security of a campus network, and making it convenient for a high-security enterprise to perform traffic monitoring on the user. For example, the technical solution in Embodiment 1 can satisfy a security requirement of an education network.

An existing 3GPP architecture still cannot support a requirement that a user uses one DNN, some traffic returns to a home location and is offloaded, and other traffic is offloaded at a visited location. Therefore, this application provides the following Embodiment 4 and Embodiment 5.

A technical solution in Embodiment 4 of this application is as follows:

When a user is in a roaming scenario, a ULCL UPF is selected in dependence on a DNN subscribed to by the user and a location of the user. The user subscription may be a dedicated DNN, a dedicated slice, or the like.

If some services whose rule can be defined return to the home location and other services are offloaded at the visited location, an I-SMF at the visited location can select (allocate or insert) a ULCL UPF and insert the ULCL UPF at the visited location based on the user subscription and the current location; and an SMF at the home location may select a primary anchor UPF.

Embodiment 4 may include three possible access scenarios that are respectively: a campus access scenario, an intra-province roaming scenario, and an inter-province roaming scenario.

Figure 25:
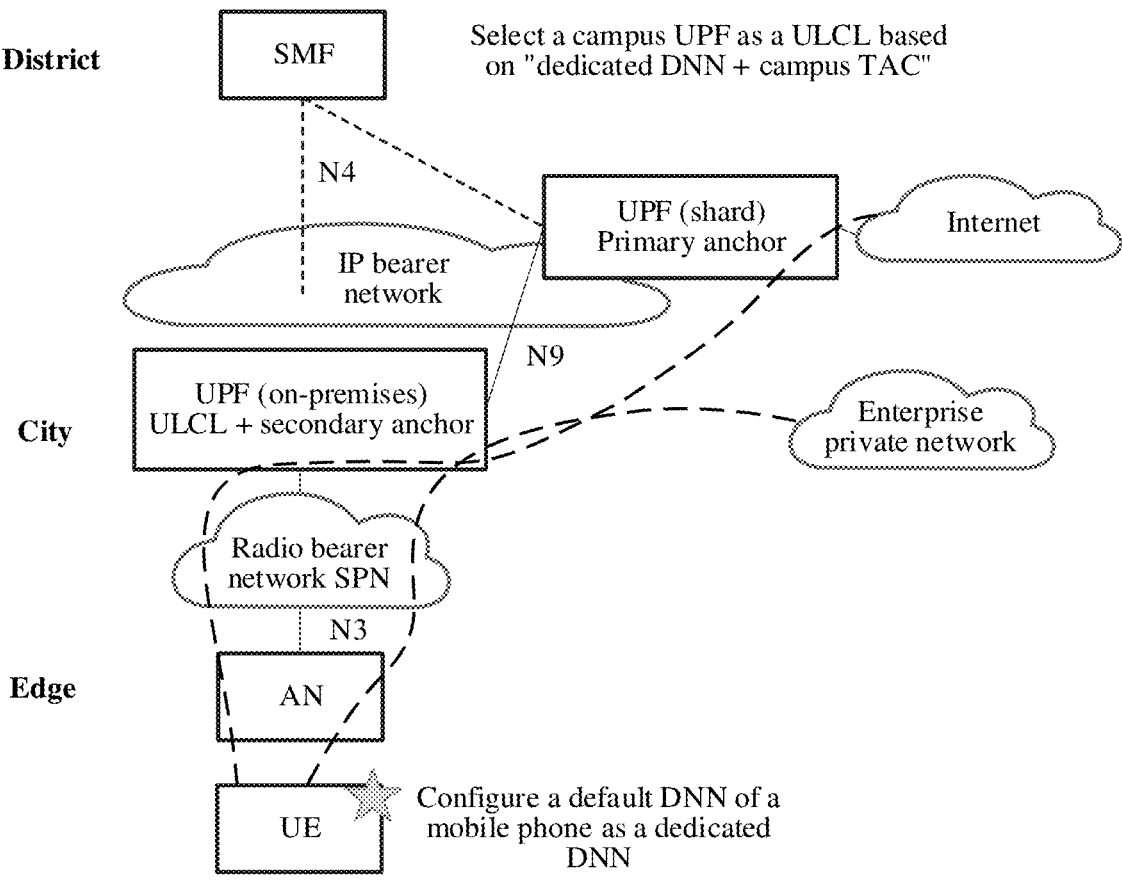
FIG. 25 is a schematic diagram of a campus access scenario according to Embodiment 4 of this application.

The campus access scenario may be shown in FIG. 25. This scenario is a non-roaming scenario.

Prerequisites for this scenario may include: (1) A default DNN of a user is configured as a dedicated DNN. (2) The user performs subscription at a PCF, so that a campus UPF can be enabled for the user to serve as a ULCL UPF when the user is roaming subsequently within a province or between provinces.

The selecting the UPF in this scenario may include: (1) An SMF may select a primary anchor UPF for the user based on the "dedicated DNN" subscribed to by the user, for example, may select a shared UPF as the primary anchor UPF. (2) The SMF may select a campus UPF as a ULCL UPF or a secondary anchor UPF based on a tracking area code (TAC) of the user.

The intra-province roaming scenario may be shown in FIG. 26. The scenario may also be referred to as an inter-city roaming scenario or an inter-city roaming scenario.

In this scenario, the home location and the visited location may share a same SMF, but respectively correspond to different UPFs. That is, there is one SMF in this scenario. This may be understood as follows: The UPF at the home location and the UPF at the visited location are in a management range of a same SMF, and the management range may also be referred to as a coverage range. For example, the home location and the visited location may be different cities in a province, and may be referred to as a home city and a visited city respectively. The SMF may be considered as an SMF in a home province, or may be an SMF at the home location/city or an SMF at the visited location/city.

Prerequisites for this scenario may include: (1) A default DNN of a user is configured as a dedicated DNN. (2) The user performs subscription at a PCF, so that a campus UPF can be enabled for the user to serve as a primary anchor UPF when the user is roaming subsequently within a province or between provinces.

The selecting the UPF in this scenario may include: (1) The SMF determines that the user is a campus user and the location of the user is not in the campus; and selects a primary anchor UPF. (2) The I-SMF selects a ULCL UPF or a secondary anchor UPF based on user subscription. (3) The I-SMF inserts an I-UPF based on the location and notifies the I-UPF of the address of the ULCL UPF. It may be understood that the SMF in this scenario is an SMF in a home province, or may be an SMF at the home location/city or an SMF at the visited location/city.

52

Figure 27:
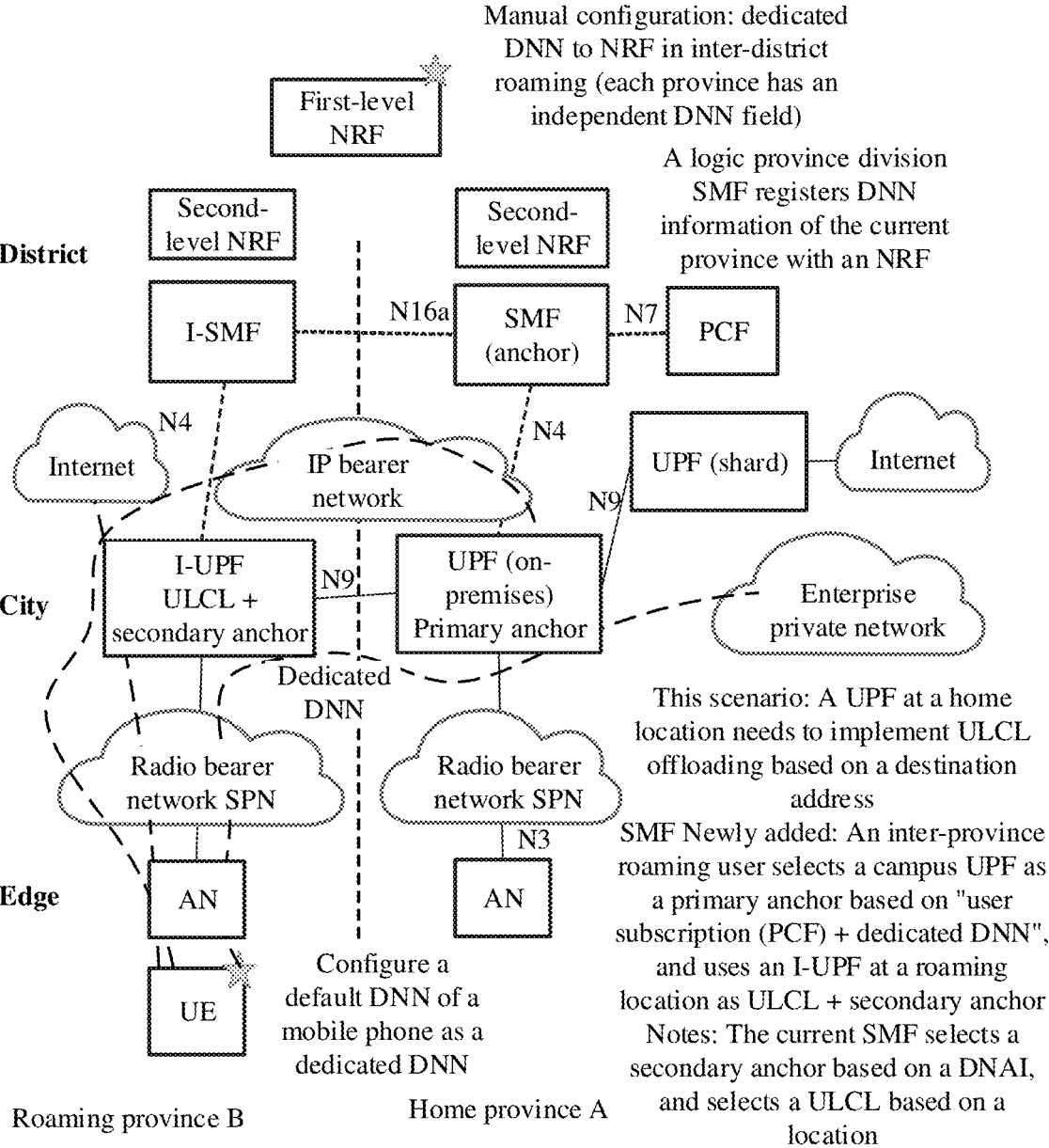
FIG. 27 is a schematic diagram of an inter-province roaming scenario according to Embodiment 4 of this application.

The inter-province roaming scenario may be shown in FIG. 27. The scenario may also be referred to as an inter-province roaming scenario.

In this scenario, the home location and the visited location correspond to different SMFs, and respectively correspond to different UPFs. That is, both an SMF at the home location and an SMF at the visited location exist in this scenario. This may be understood as follows: The UPF at the home location and the UPF at the visited location are in management ranges of different SMFs, and the management range may also be referred to as a coverage range. For example, the home location and the visited location may be different provinces in a country that may be referred to as a home province and a visited province respectively. The SMF at the home location may be an SMF in the home province, and the SMF at the visited location may be an SMF in the visited province.

Prerequisites for this scenario may include: (1) A default DNN of a user is configured as a dedicated DNN. (2) A DNN dedicated to the roaming province is configured for a first-level NRF. (3) The user performs subscription at a PCF, so that a campus UPF can be enabled for the user to serve as a primary anchor UPF when the user is roaming subsequently within a province or between provinces.

The selecting the UPF in this scenario may include: (1) The SMF at the visited location does not support the dedicated DNN, and queries the NRF for the SMF corresponding to the DNN. (2) If the SMF at the home location determines that the user is a campus user, the campus UPF is selected to serve as the primary anchor UPF. The SMF at the home location interacts with the UPF at the home location to allocate the address to the UE. (3) The SMF in the roaming location inserts the ULCL UPF of the I-UPF based on the current location of the user. It may be understood that the SMF in the home province in this scenario may be an SMF at the home location, and the SMF in the visited province/roaming province may be an SMF at the visited location.

A network architecture to which Embodiment 4 is applicable is shown in FIG. 28. A scenario 1 in FIG. 28 corresponds to an intra-province roaming scenario. A scenario 2 in FIG. 28 corresponds to an inter-province roaming scenario. In the foregoing architectural figure, an I-UPF and a ULCL are generally integrated. That is, a ULCL can also serve as an I-UPF to implement an N3 interface capability during roaming; and is usually uniformly referred to as a ULCL UPF.

Figure 29A:
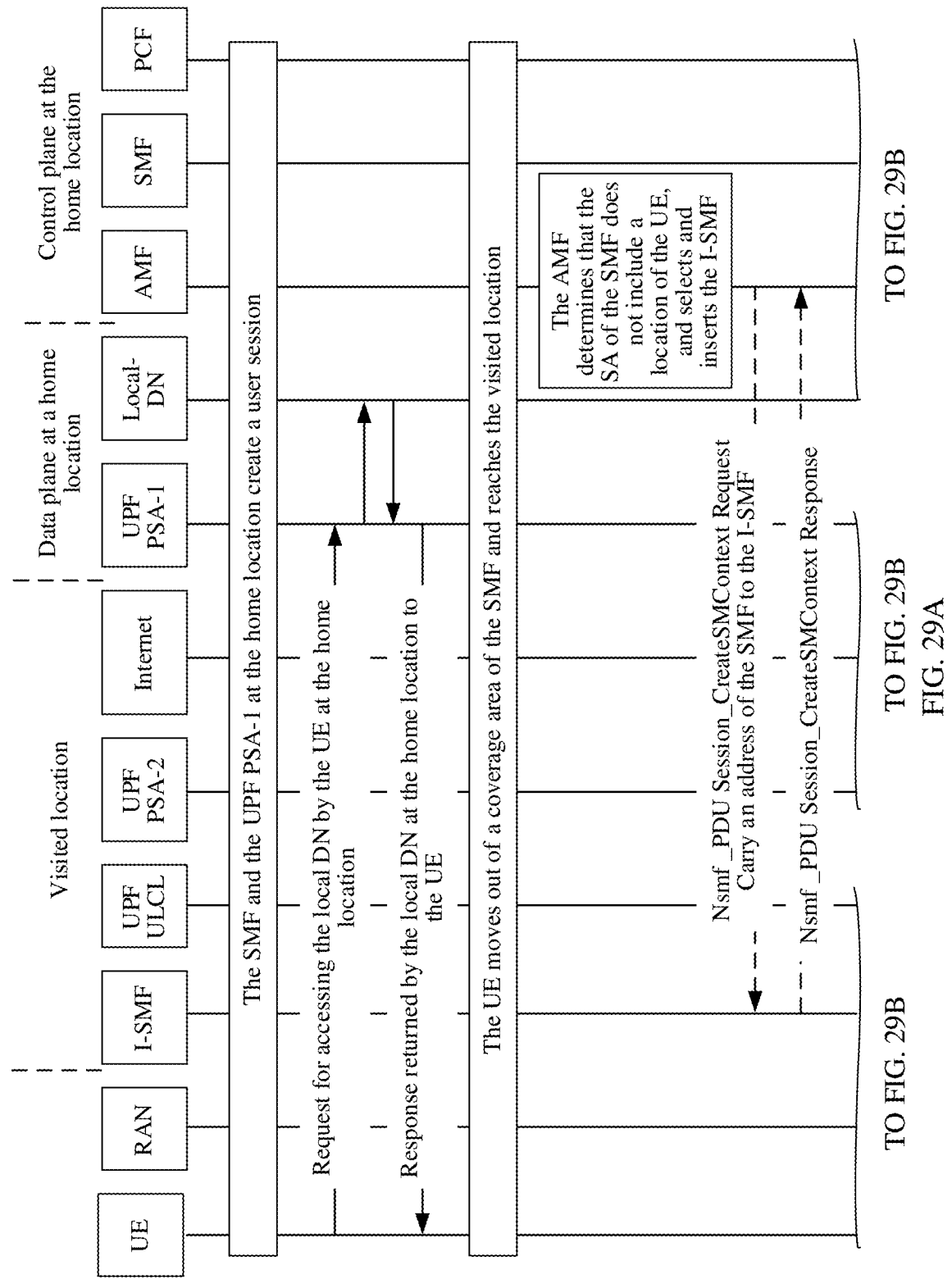
FIG. 29A, FIG. 29B, and FIG. 29C are a schematic diagram of a service process according to Embodiment 4 of this application.
Figure 29B:
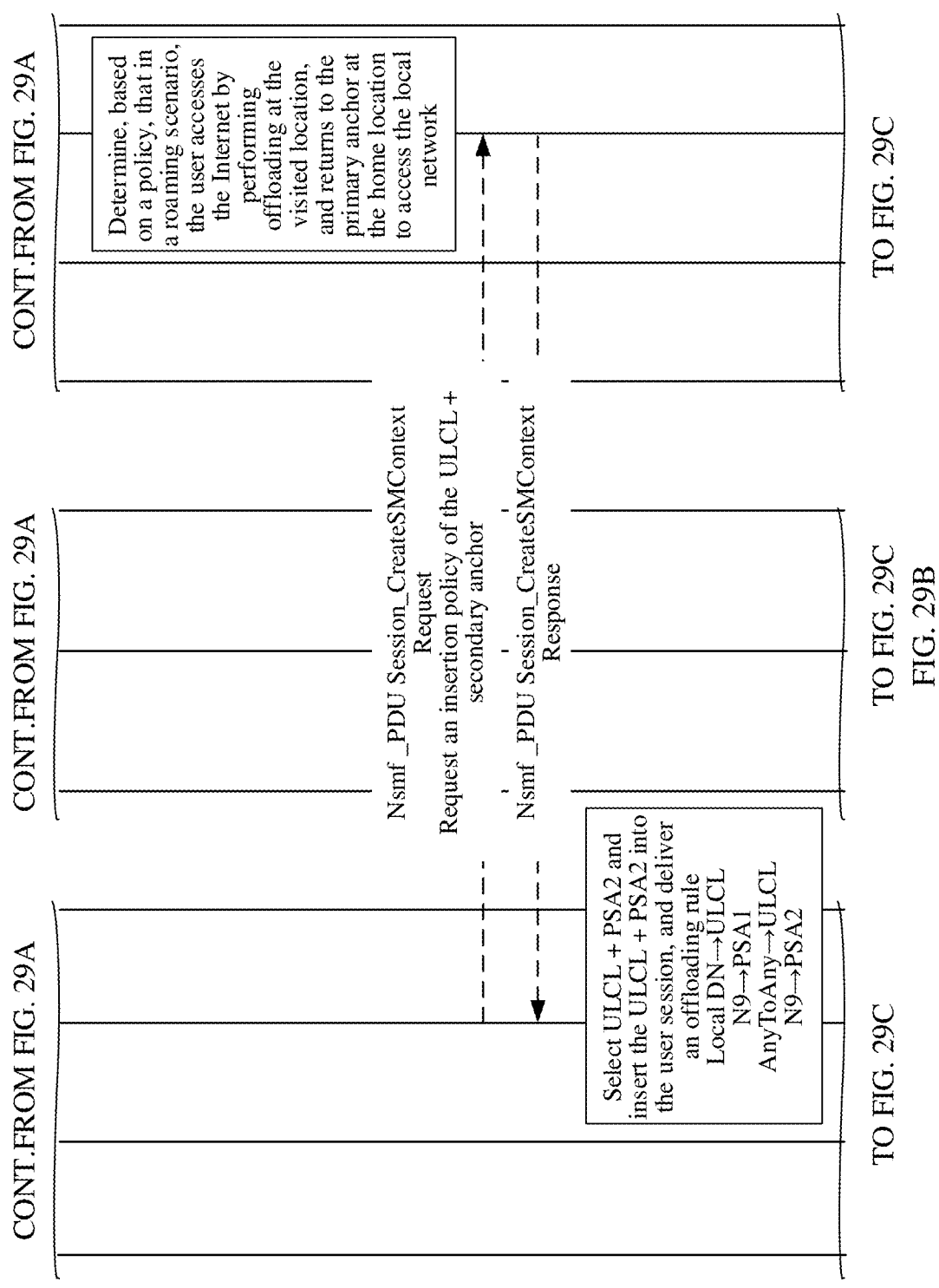
Figure 29C:
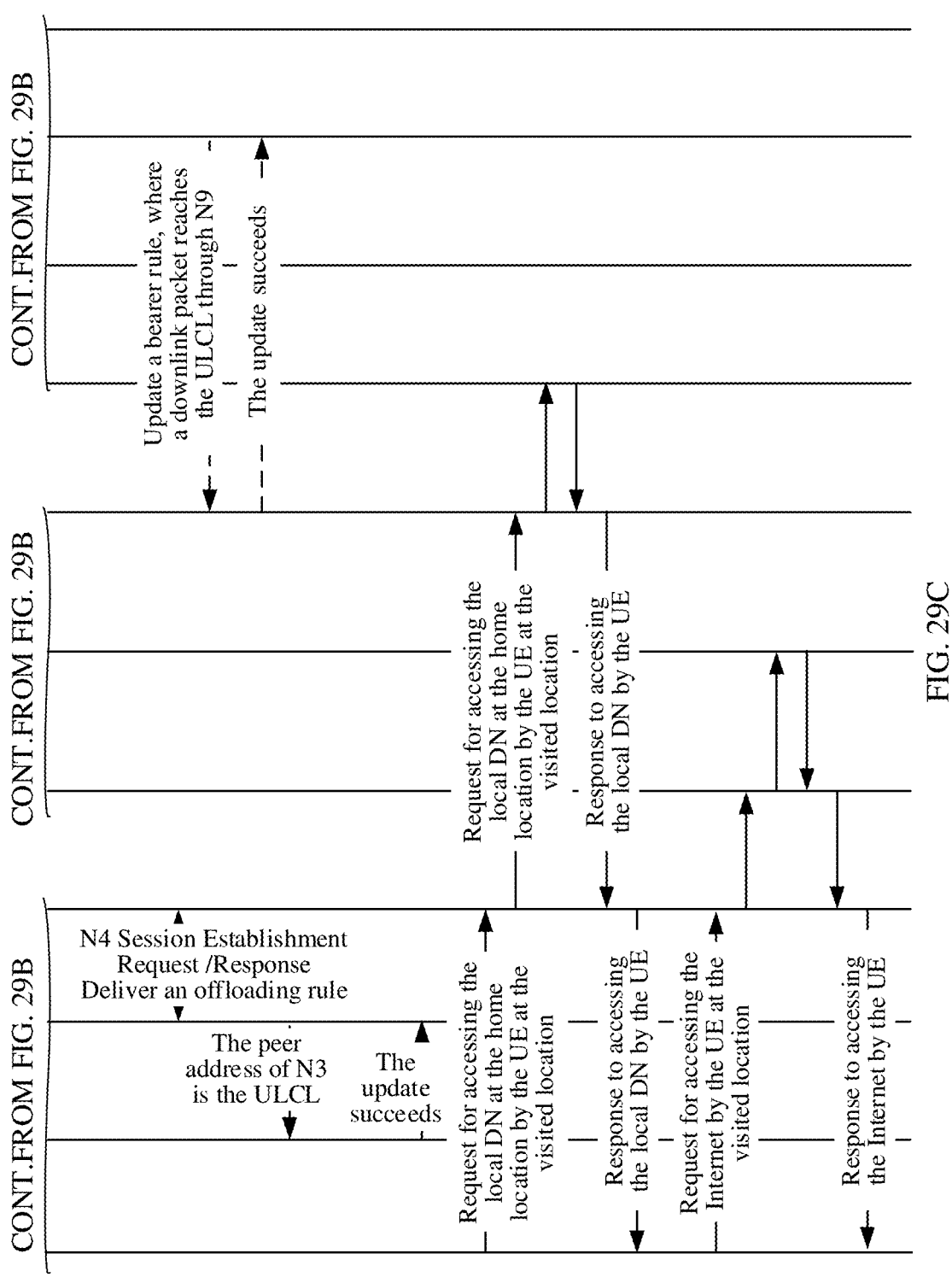

A service process in Embodiment 4 of this application is described in detail below by using the inter-province roaming scenario (corresponding to the network architecture shown in the scenario 2 in FIG. 28) as an example. As shown in FIG. 29A, FIG. 29B, and FIG. 29C, the service process includes the following steps.

Step 2901: A UE subscribes to a special DN, and an SMF and a UPF PSA-1 at a home location create a user session.

Step 2902: The UE accesses a local DN at the home location through the UPF PSA-1.

Step 2903: When the UE moves out of a coverage area of the SMF and reaches a visited location, an AMF determines that a service area SA of the SMF at the home location does not include a location of the UE, and therefore chooses to insert an I-SMF at the visited location and sends an address of the SMF at the home location to the I-SMF.

Step 2904: If the SMF at the home location determines, based on an offloading policy of a user delivered by a PCF, that the user performs offloading and accesses the Internet at the visited location in a roaming scenario, and returns to the home location to access the local network, when the I-SMF at the visited location requests to obtain a ULCL insertion rule and the offloading policy from the SMF at the home location, the SMF at the home location transfers an offloading rule of the local DN at the home location to the I-SMF at the visited location, and indicates that a service flow matching the rule returns to the home location and other service flows are offloaded at the visited location.

Step 2905: The I-SMF at the visited location selects ULCL UPF+PSA2 and inserts the ULCL UPF+PSA2 into the user session, and delivers the offloading rule to the ULCL UPF, where the offloading rule indicates that a peer end of a next-hop N9 interface for a service flow matching the rule of the local DN at the home location is the UPF PSA-1 and a peer end of a next-hop N9 interface for other service flows is the UPF PSA-2.

Step 2906: The SMF at the home location updates a bearer rule, and refreshes a downlink tunnel of the UPF PSA-1 to a peer end of the N9 interface, where the peer end is the ULCL UPF.

Step 2907: The I-SMF at the visited location updates a destination address of an uplink N3 tunnel interface on a RAN side to the ULCL UPF.

Step 2908: The UE docks with the UPF PSA-1 at the home location through an N9 interface of the ULCL UPF at the visited location, and accesses the local DN at the home location.

Step 2909: The UE accesses the Internet at the visited location through the ULCL UPF+PSA2.

The service process of the intra-province roaming scenario in Embodiment 4 is similar to the service process of the inter-province roaming scenario shown in FIG. 29A, FIG. 29B, and FIG. 29C. A main difference lies in that only one SMF is involved in the intra-province roaming scenario. Therefore, the SMF may be configured to implement functions of both the SMF at the home location and the I-SMF at the visited location in the service process in the inter-province roaming scenario, and the AMF does not need to insert the I-SMF at the visited location based on user subscription and a current location.

For brevity, steps of the service process in the intra-province roaming scenario are not described one by one in this application. It may be understood that the service process may be implemented by correspondingly modifying the service process shown in FIG. 29A, FIG. 29B, and FIG. 29C based on the network architecture in the scenario 1 in FIG. 28.

In the foregoing Embodiment 4, the SMF at the home location may send the offloading rule in the local network at the home location to the I-SMF, and indicate the service flow matching the offloading rule to return to the home location and other service flows to be offloaded at the visited location. The SMF at the visited location may insert the ULCL UPF based on "user subscription+current location", and deliver the offloading rule to the ULCL UPF. Therefore, the user can use one DNN to access both the campus network and the Internet. Further, the foregoing offloading rule may be determined based on services accessed by the user. For example, a service of accessing the Internet by the user may be offloaded at the visited location, and a service of accessing the local network at the home location may return to the home location. For example, the technical solution in Embodiment 4 can satisfy a requirement of a government network.

A technical solution in Embodiment 5 of this application is as follows:

When a user is in a roaming scenario, a ULCL UPF is selected in dependence on a DNN subscribed to by the user and a location of the user. The user subscription may include a dedicated DNN, a dedicated slice, or the like.

If some services are offloaded locally, some services return to the home location, and the UPF at the visited location supports an I-UPF/ULCL/secondary anchor integration function, the integrated UPF needs to determine whether to perform offloading over a local N6 interface or through an N9 interface based on a destination address of service access of the user and the like, and the offloading policy is implemented by the SMF and the UPF.

A network architecture to which Embodiment 5 is applicable is shown in FIG. 30. A difference between the network architecture and the network architecture shown in FIG. 10 lies in that the UPF at the visited location supports integral deployment of the I-UPF, the ULCL, and the secondary anchor UPF.

A service process in Embodiment 3 is similar to that shown in FIG. 29A, FIG. 29B, and FIG. 29C. A difference lies in that a UPF deployed integrally at a visited location may have functions of the I-UPF, the ULCL, and the secondary anchor UPF at the visited location in the foregoing service process.

In the foregoing Embodiment 3, the SMF at the visited location selects I-UPF/ULCL UPF based on "user subscription+current location", performs traffic offloading locally through the secondary anchor, and sends a campus service (which may be determined based on a destination address of access of the user) to the UPF at the home location, and finally the campus service is sent to a server on the campus network.

At the visited location, the offloading policy may be determined based on services accessed by the user. Some services are offloaded through the local N6 interface, and some services are forwarded to a UPF (namely, the UPF at the home location) at an ingress on the campus network through the N9 interface. Therefore, the user can use one specific DNN to access both the campus network and the Internet. Further, service data whose offloading rule can be defined at the home location returns to the home location, and other traffic is routed out of the Internet through the N6 interface at the visited location.

Based on the foregoing technical solutions provided in embodiments of this application, the user can securely access a service of a campus network on a specific UPF uniformly both inside and outside the campus, and the campus network does not need to deploy an Internet egress, thereby improving security of the campus network.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

Sequence numbers do not mean execution sequences in various embodiments of this application. The execution sequences of the processes should be determined based on functions and internal logic of the processes, and should not be construed as any limitation on the implementation processes of embodiments of this application.

In addition, the term "and/or" in this specification is merely an association relationship for describing associated objects, and indicates that three relationships may exist. For example, A and/or B may indicate the following three cases: Only A exists, both A and B exist, and only B exists. In addition, the character "/" in this specification generally indicates an "or" relationship between the associated objects.

It should be noted that in embodiments of this application, terms such as "first" and "second" are merely used for distinguishing descriptions, and cannot be understood as indicating or implying relative importance, and cannot be understood as indicating or implying a sequence. The features defined with "first" and "second" may explicitly or implicitly include one or more of the features. In the descriptions of embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" is intended to present a relative concept in a specific manner.

In conclusion, the foregoing descriptions are merely examples of embodiments of the technical solutions of this application, but are not intended to limit the protection range of this application. Any modification, equivalent replacement, or improvement made within the principle of this application should fall within the protection scope of this application.

What is claimed is:

1. An apparatus, comprising:

a processor; and a memory having instructions stored thereon that, when executed by the processor, cause the apparatus to:

insert an uplink classifier user plane function network element at a home location, wherein the uplink classifier user plane function network element is configured to offload a service flow of a terminal device;

in response to determining the terminal device moved to a visited location, send an address of the uplink classifier user plane function network element to an intermediate user plane function network element at the visited location to establish a tunnel between the intermediate user plane function network element and the uplink classifier user plane function network element; and send an offloading rule to the uplink classifier user plane function network element, wherein the offloading rule indicates to send a service flow that matches the offloading rule to a secondary anchor user plane function network element at the home location, and the secondary anchor user plane function network element is connected to a local data network at the home location.

2. The apparatus according to claim 1, wherein the apparatus is further caused to:

insert the uplink classifier user plane function network element based on a data network name (DNN) subscribed to by the terminal device.

3. The apparatus according to claim 1, wherein the apparatus is further caused to:

receive a user policy of the terminal device from a policy control function network element, wherein the user policy indicates that the service flow of the terminal device needs to return to the home location and be offloaded in a roaming scenario; and insert the uplink classifier user plane function network element based on the user policy.

4. The apparatus according to claim 1, wherein the apparatus is further caused to:

send the address of the uplink classifier user plane function network element to the secondary anchor user plane function network element to establish a tunnel between the secondary anchor user plane function network element and the uplink classifier user plane function network element.

5. The apparatus according to claim 1, wherein the offloading rule further indicates to send a service flow that does not match the offloading rule to a primary anchor user plane function network element at the home location, and the primary anchor user plane function network element is connected to the Internet.

6. The apparatus according to claim 5, wherein the apparatus is further caused to:

send the address of the uplink classifier user plane function network element to the primary anchor user plane function network element to establish a tunnel between the primary anchor user plane function network element and the uplink classifier user plane function network element.

7. The apparatus according to claim 1, wherein the apparatus is further caused to:

send the address of the uplink classifier user plane function network element to an access network device at the home location to establish a tunnel between the access network device and the uplink classifier user plane function network element.

8. The apparatus according to claim 1, wherein the apparatus is further caused to:

in response to determining the terminal device is in a service area of a session management function network element at the home location after determining the terminal device moved to the visited location, insert the intermediate user plane function network element at the visited location; and send an address of the intermediate user plane function network element to the uplink classifier user plane function network element to establish a tunnel between the uplink classifier user plane function network element and the intermediate user plane function network element.

9. The apparatus according to claim 8, wherein the apparatus is further caused to:

send the address of the intermediate user plane function network element to an access network device at the visited location to establish a tunnel between the access network device and the intermediate user plane function network element.

10. The apparatus according to claim 1, wherein the apparatus is further caused to:

in response to determining the terminal device left a service area of a session management function network element at the home location after moving to the visited location, send the address of the uplink classifier user plane function network element to the intermediate user plane function network element by using an intermediate session management function network element at the visited location.

11. The apparatus according to claim 10, wherein the apparatus is further caused to:

receive, through the intermediate session management function network element, an address of the intermediate user plane function network element from the intermediate user plane function network element; and send the address of the intermediate user plane function network element to the uplink classifier user plane function network element to establish a tunnel between the uplink classifier user plane function network element and the intermediate user plane function network element.

12. An apparatus, comprising:

a processor; and a memory having instructions stored thereon that, when executed by the processor, cause the apparatus to:

in response to determining a terminal device moved to a visited location, insert an intermediate user plane function network element at the visited location;

receive an address of an uplink classifier user plane function network element from a session management function network element at a home location, wherein the uplink classifier user plane function network element is configured to offload a service flow of the terminal device and send an offloading rule to the uplink classifier user plane function network element, wherein the offloading rule indicates to send a service flow that matches the offloading rule to a secondary anchor user plane function network element at the home location, and the secondary anchor user plane function network element is connected to a local data network at the home location.

13. The apparatus according to claim 12, wherein the apparatus is further caused to:

send the address of the uplink classifier user plane function network element to the intermediate user plane function network element, to establish a tunnel between the intermediate user plane function network element and the uplink classifier user plane function network element.

14. The apparatus according to claim 12, wherein the apparatus is further caused to:

send an address of the intermediate user plane function network element to the session management function network element to establish a tunnel between the uplink classifier user plane function network element and the intermediate user plane function network element.

15. The apparatus according to claim 12, wherein the apparatus is further caused to:

send the address of the intermediate user plane function network element to an access network device at the visited location to establish a tunnel between the access network device and the intermediate user plane function network element.

16. An apparatus, comprising:

a processor; and a memory having instructions stored thereon that, when executed by the processor, cause the apparatus to:

in response to determining a terminal device moved to a visited location, insert an uplink classifier user plane function network element at the visited location, wherein the uplink classifier user plane function network element is configured to offload a service flow of the terminal device; and send an offloading rule to the uplink classifier user plane function network element, wherein the offloading rule indicates to send a service flow that matches the offloading rule to a primary anchor user plane function network element at a home location, and the primary anchor user plane function network element is connected to a local data network at the home location.

17. The apparatus according to claim 16, wherein the apparatus is further caused to:

cause a session management function network element at the visited location to insert the uplink classifier user plane function network element based on a data network name (DNN) subscribed to by the terminal device.

18. The apparatus according to claim 16, wherein the apparatus is further caused to:

insert the uplink classifier user plane function network element based on a user policy of the terminal device, wherein the user policy indicates that a service flow of the terminal device is to be offloaded at the visited location in a roaming scenario and a service flow that accesses the local data network of the home location returns to the home location.

19. The apparatus according to claim 16, wherein the apparatus is further caused to:

in response to determining a session management function network element at the visited location is the same as a session management function network element at the home location, cause the session management function network element at the visited location to send an address of the uplink classifier user plane function network element to the primary anchor user plane function network element, to establish a tunnel between the primary anchor user plane function network element and the uplink classifier user plane function network element.

* * * * *